(12) United States Patent
Ashkenazi et al.

(10) Patent No.: US 7,710,654 B2
(45) Date of Patent: May 4, 2010

(54) METHOD AND SYSTEM FOR IMPROVING AUDIOVISUAL COMMUNICATION

(75) Inventors: Asaf Ashkenazi, Pardes Hana (IL); Yoram Shmuely, Haifa (IL)

(73) Assignee: Elbit Systems Ltd. (IL)

( * ) Notice: Subject to any disclaimer, the term of this patent is extended or adjusted under 35 U.S.C. 154(b) by 317 days.

(21) Appl. No.: 10/556,322

(22) PCT Filed: May 11, 2004

(86) PCT No.: PCT/IL2004/000398

§ 371 (c)(1),
(2), (4) Date: Nov. 10, 2005

(87) PCT Pub. No.: WO2004/099851

PCT Pub. Date: Nov. 18, 2004

(65) Prior Publication Data
US 2006/0238877 A1    Oct. 26, 2006

Related U.S. Application Data

(60) Provisional application No. 60/469,637, filed on May 12, 2003.

(51) Int. Cl.
*G02B 27/14* (2006.01)
*G09G 5/00* (2006.01)
(52) U.S. Cl. .......................... 359/630; 345/7
(58) Field of Classification Search ......... 359/630–634; 345/7–9
See application file for complete search history.

(56) References Cited

U.S. PATENT DOCUMENTS

| | | | |
|---|---|---|---|
| 5,422,653 A | 6/1995 | Maguire, Jr. | 345/9 |
| 5,682,172 A | 10/1997 | Travers et al. | 345/8 |
| 5,861,994 A | 1/1999 | Kelly | 359/630 |
| 5,936,663 A * | 8/1999 | Tabata et al. | 348/51 |
| 6,160,666 A | 12/2000 | Rallison et al. | 359/630 |
| 6,349,001 B1 | 2/2002 | Spitzer | 359/618 |
| 6,384,982 B1 | 5/2002 | Spitzer | 359/630 |
| 6,421,031 B1 | 7/2002 | Ronzani et al. | 345/8 |
| 6,456,438 B1 | 9/2002 | Lee et al. | 359/630 |
| 6,847,336 B1 * | 1/2005 | Lemelson et al. | 345/8 |
| 7,050,078 B2 * | 5/2006 | Dempski | 345/8 |
| 2002/0075286 A1 | 6/2002 | Youezawn et al. | 345/679 |
| 2004/0129478 A1 * | 7/2004 | Breed et al. | 180/273 |
| 2005/0134479 A1 * | 6/2005 | Isaji et al. | 340/901 |

OTHER PUBLICATIONS

International Preliminary Report on Patentability, PCT/IL2004/000398, dated Jan. 16, 2006.

* cited by examiner

*Primary Examiner*—Alicia M Harrington
(74) *Attorney, Agent, or Firm*—Cantor Colburn LLP

(57) ABSTRACT

System for improving audiovisual communication, the system including a line of sight determining system for determining a user line of sight of the eyes of a user, and an image display system coupled with the line of sight determining system, the image display system displaying a supplementary image for the eyes, and controlling a property of the supplementary image and of a scene image, according to the determined user line of sight.

24 Claims, 45 Drawing Sheets

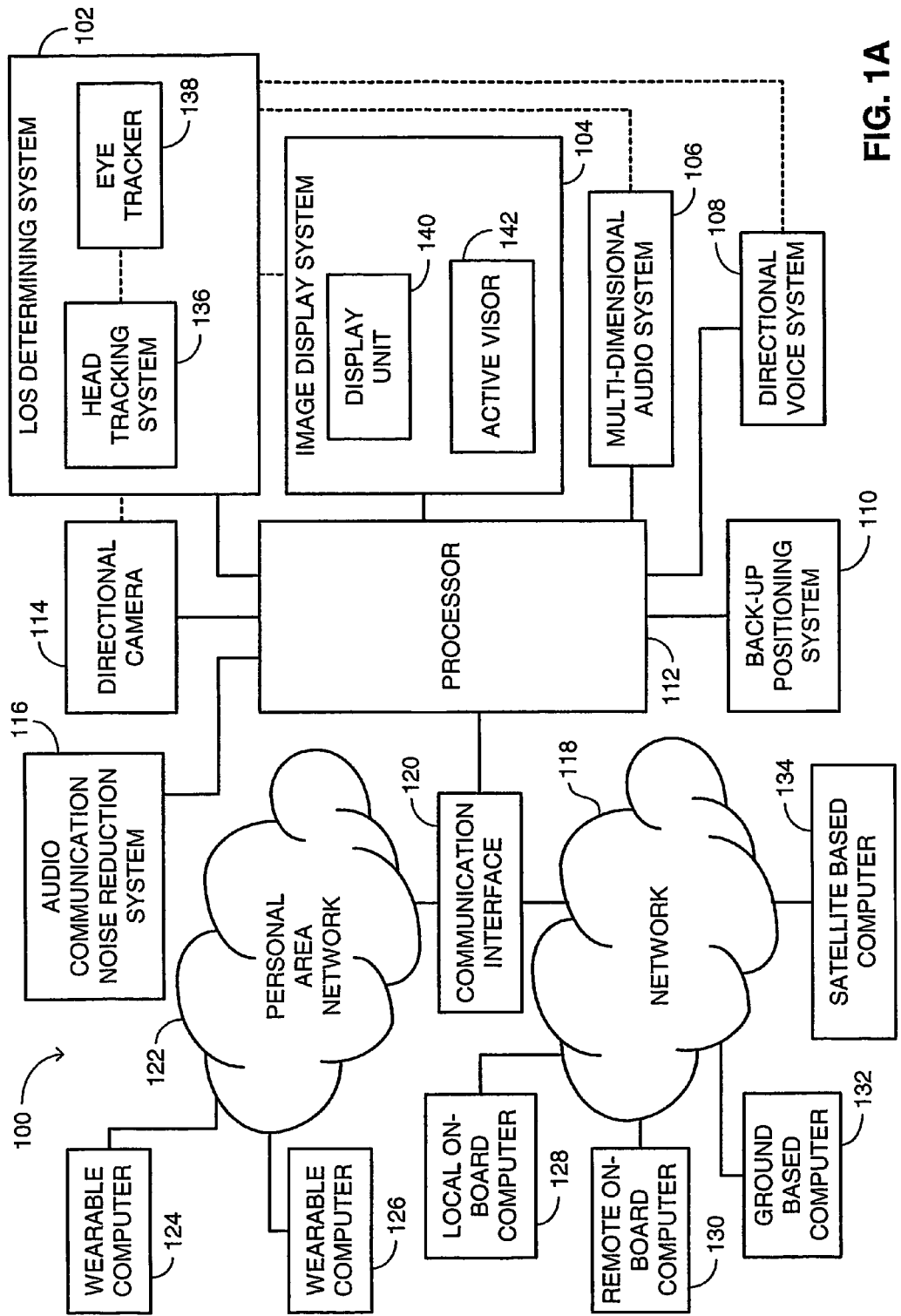

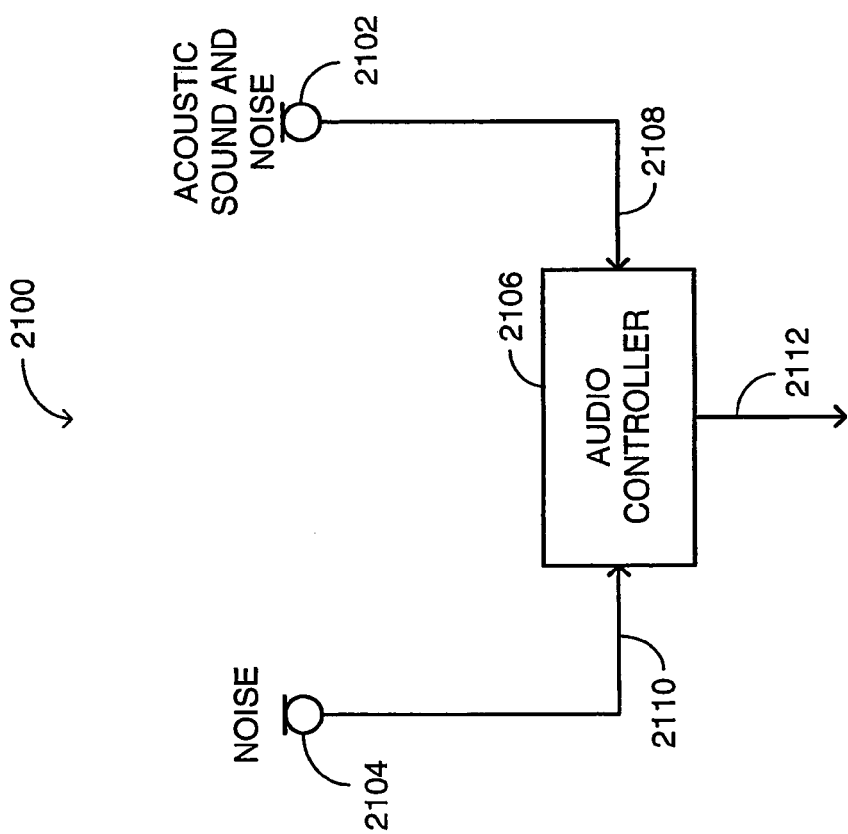

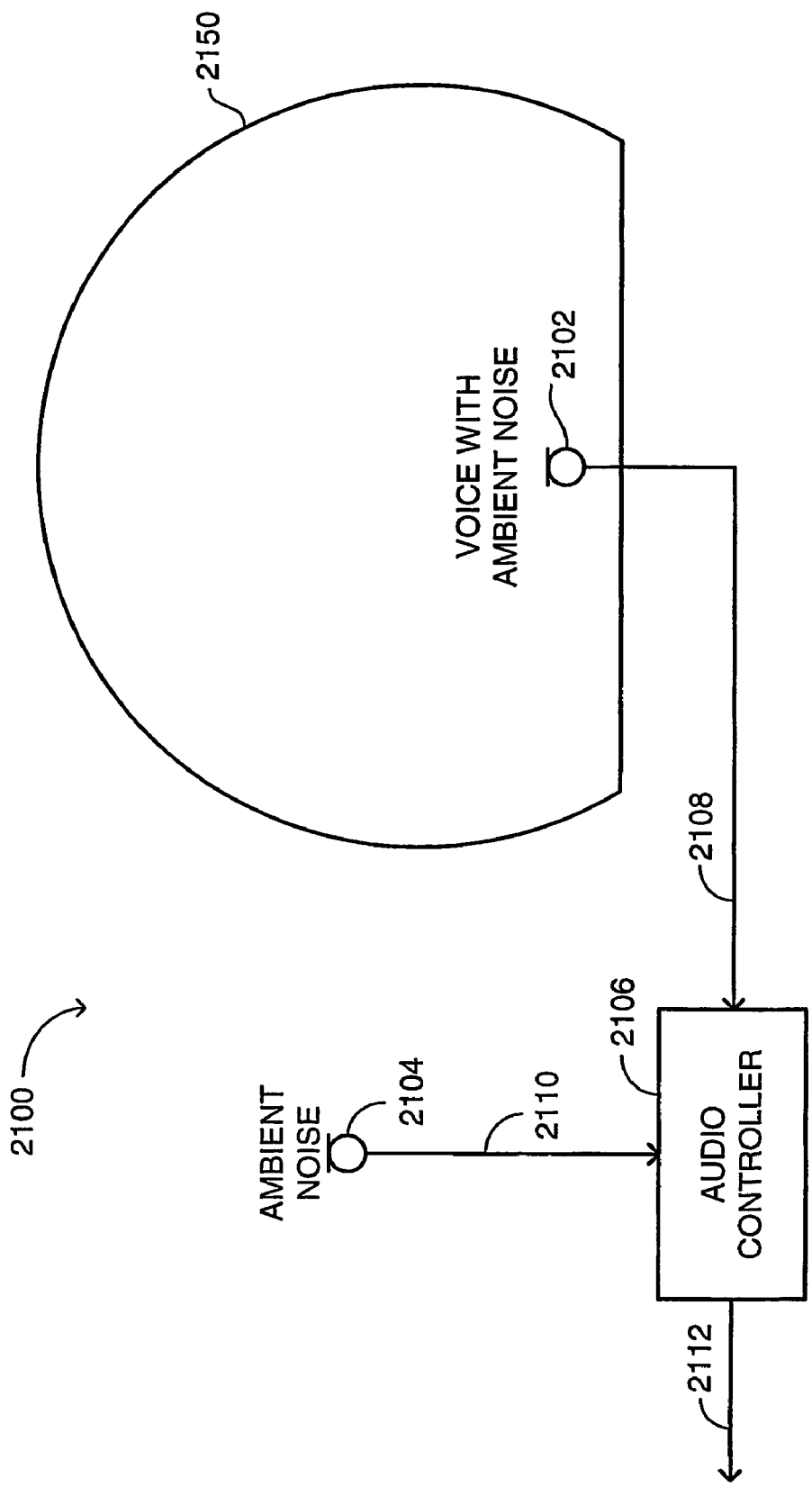

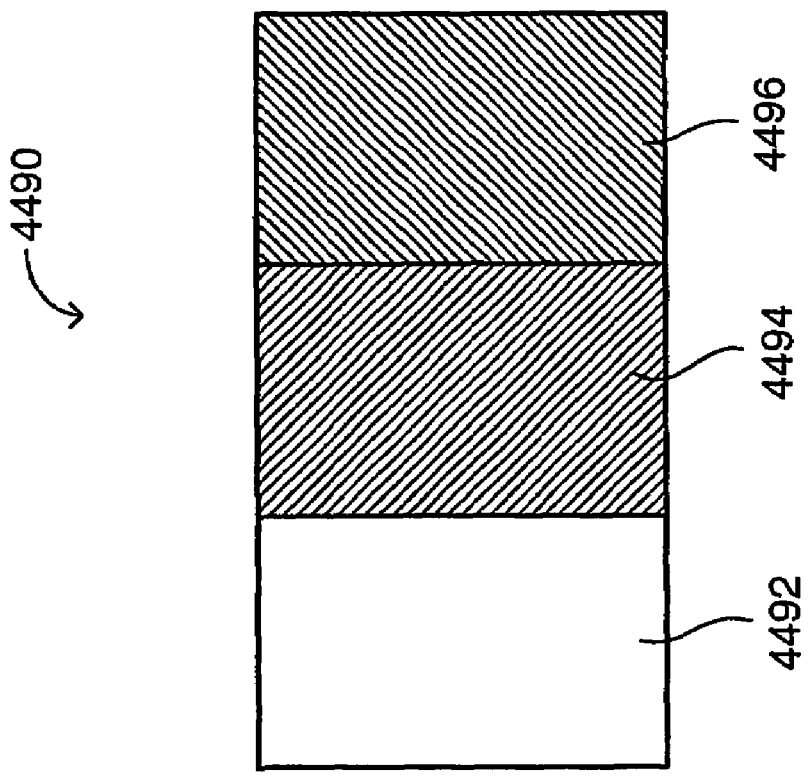

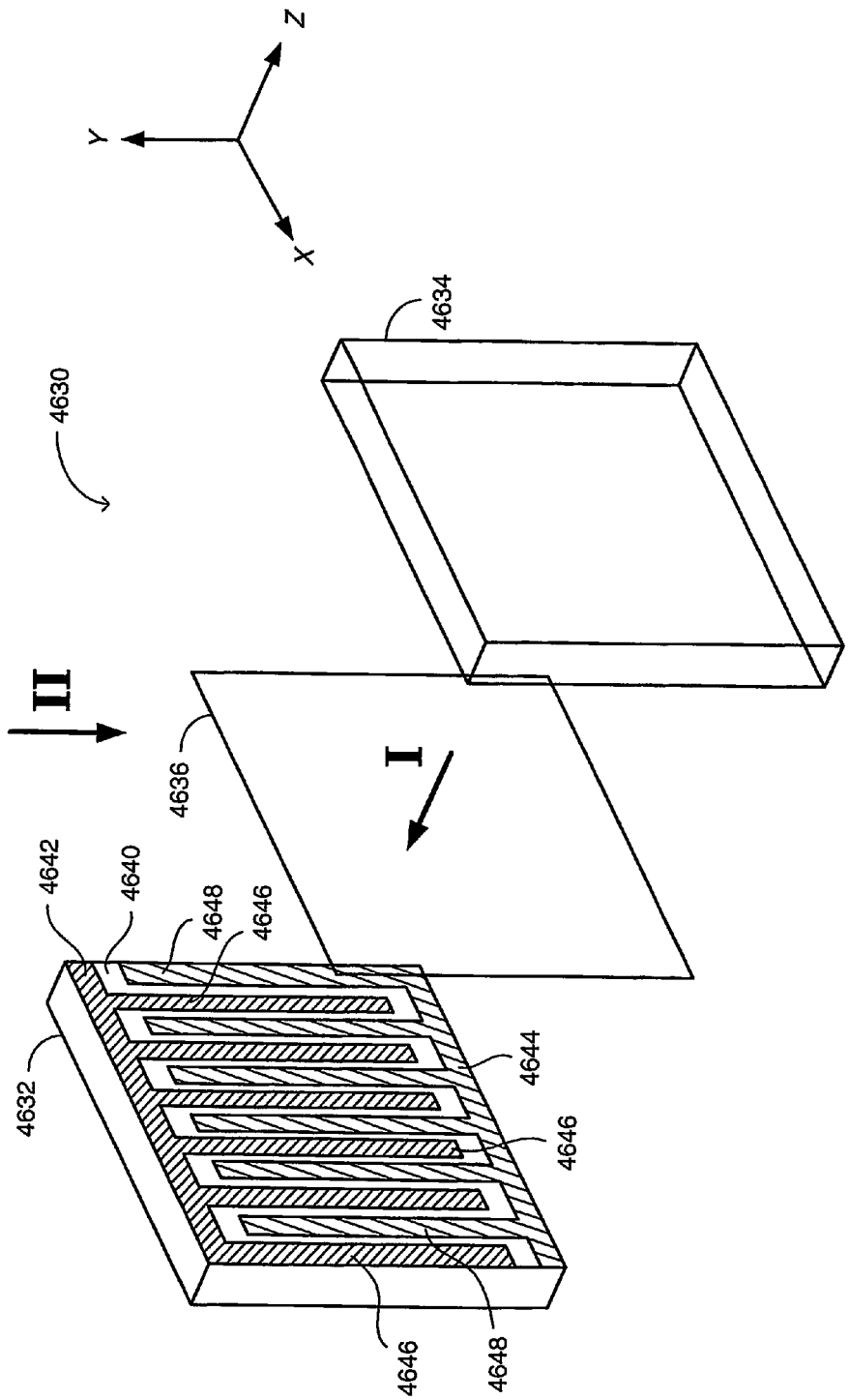

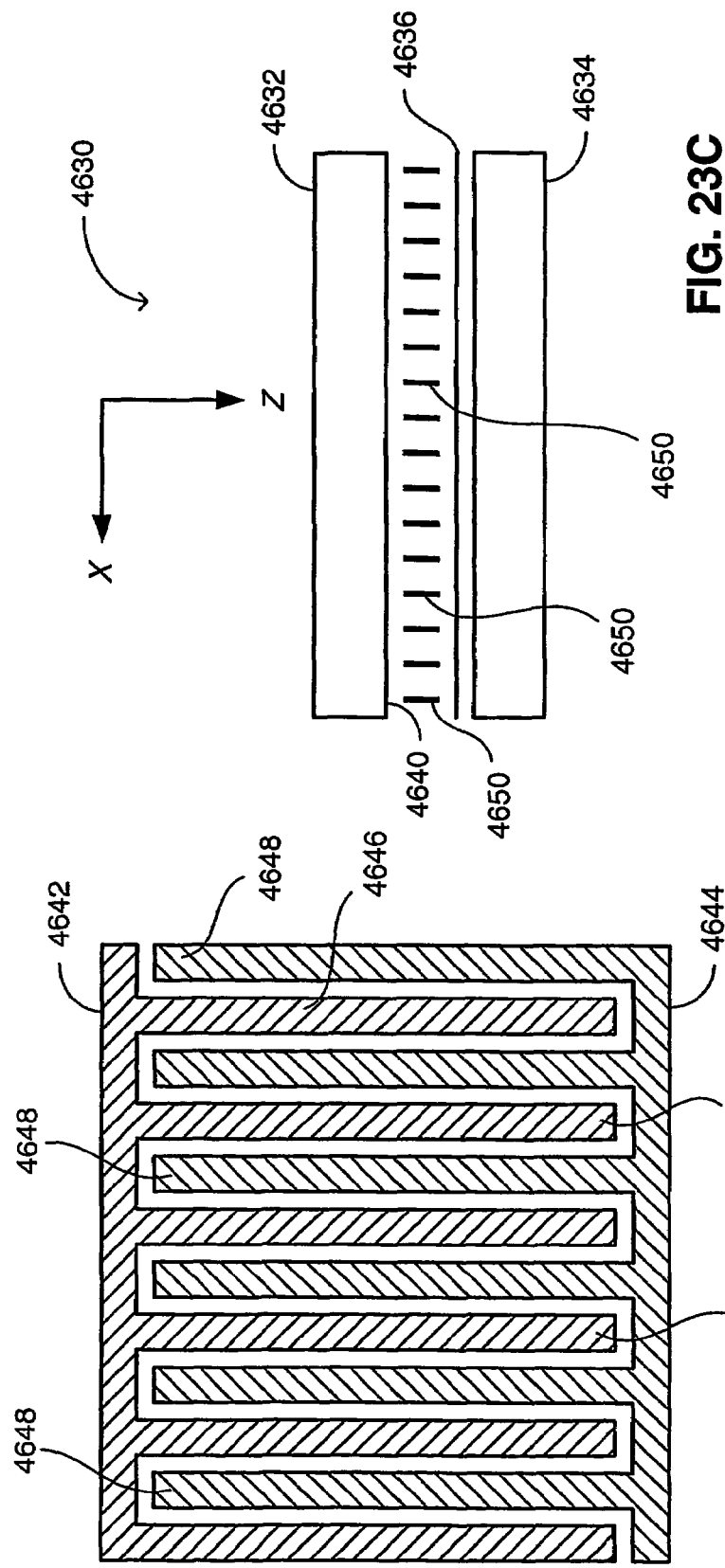

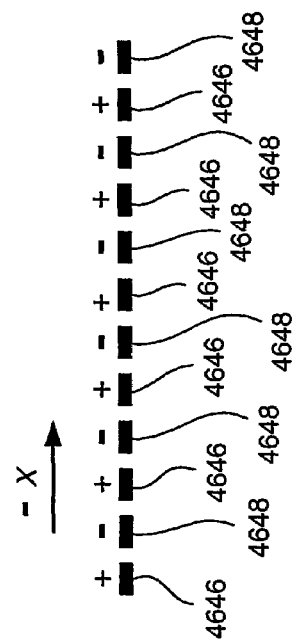
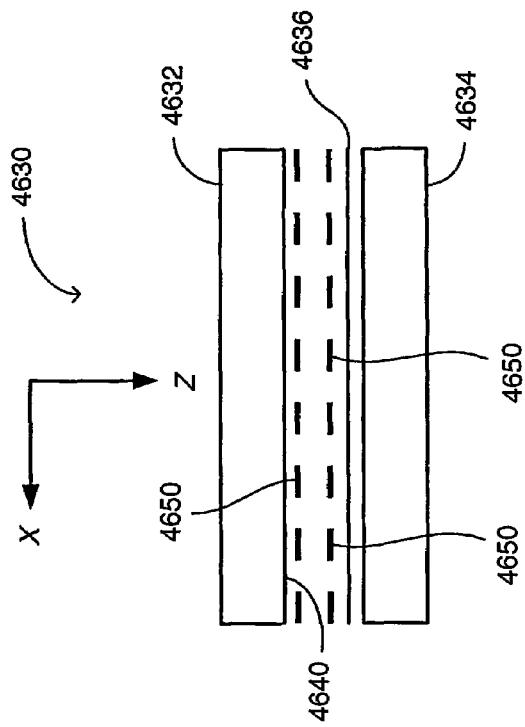
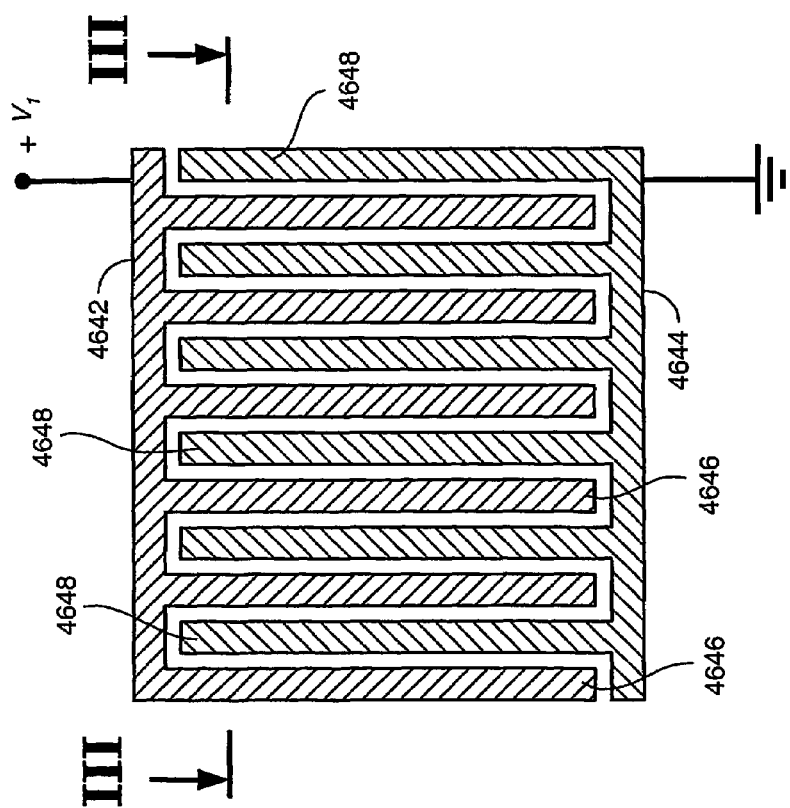
FIG. 23D
FIG. 23E
FIG. 23F

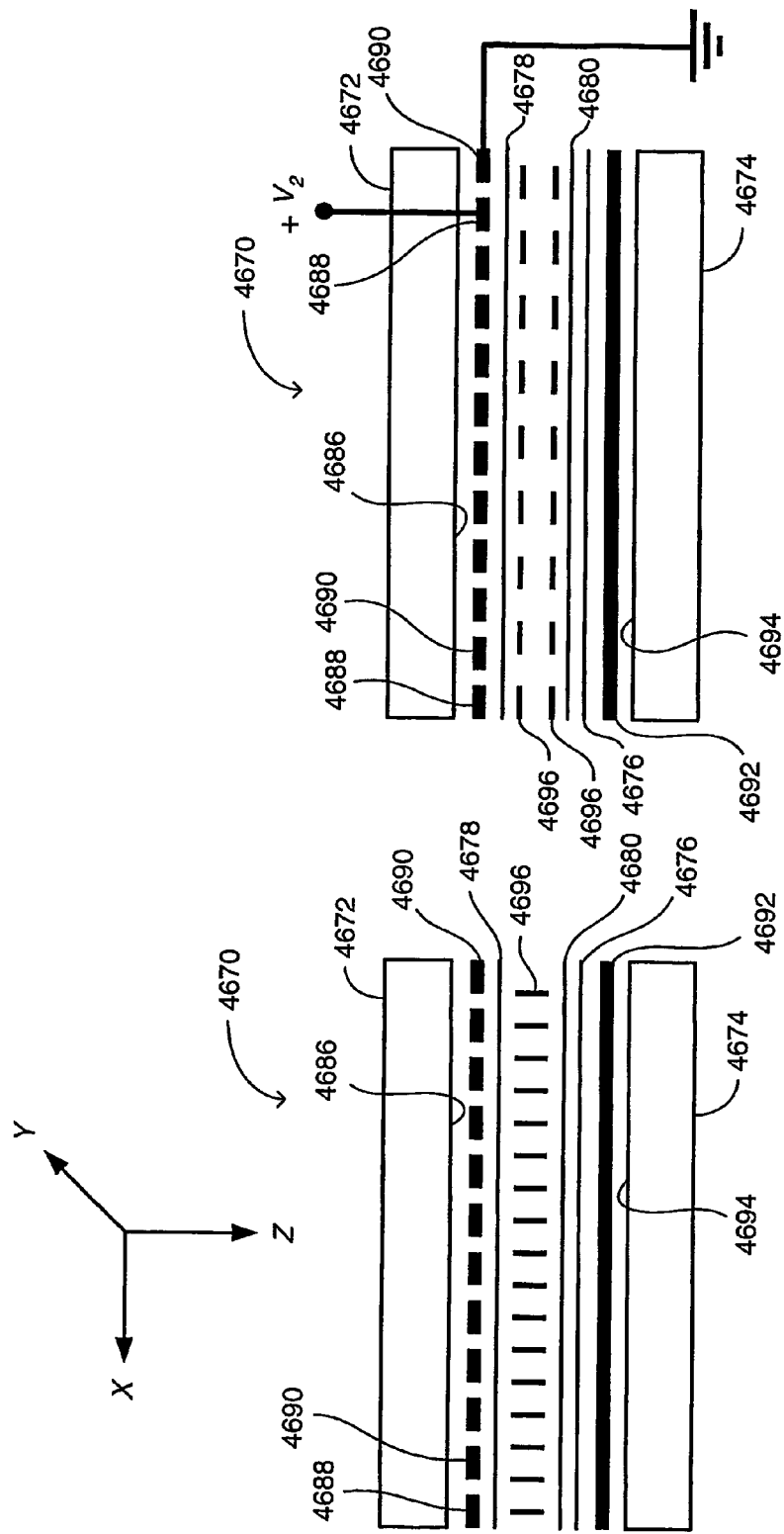

METHOD AND SYSTEM FOR IMPROVING AUDIOVISUAL COMMUNICATION

CROSS-REFERENCE TO RELATED APPLICATION

This application claims the benefit of U.S. provisional application Ser. No. 60/469,637 filed May 12, 2003.

FIELD OF THE DISCLOSED TECHNIQUE

The disclosed technique relates to audiovisual systems in general, and to methods and systems for enhancing communication with the environment, in particular.

BACKGROUND OF THE DISCLOSED TECHNIQUE

The pilot of a fighter plane is occupied in performing different tasks simultaneously while engaged in a mission, such as navigating, flying the plane, aiming and shooting targets, and communicating with ground control or with other pilots. Various systems and devices to ease the burden on the pilot while performing these tasks, and to increase the level of performance of the pilot have been disclosed. Such systems are generally incorporated with the helmet of the pilot or located in close vicinity of the pilot.

U.S. Pat. No. 6,384,982 issued to Spitzer and entitled "Compact Image Display System for Eyeglasses or Other Head-Borne Frames" is directed to a device for displaying an image against an ambient imagery. The device includes an image source, a main lens, a first lens, a second lens and an insert. The main lens is the prescriptive lens of a pair of eyeglasses. A first portion of the insert has a first index of refraction and a second portion thereof has a second index of refraction, wherein the first index of refraction is greater than the second index of refraction. The insert is located within the main lens. The index of refraction of the main lens is equal to the first index of refraction. The first lens is located between the image source and the main lens. The first lens and the image source are located on top of the main lens along a first axis. The second lens is located between the insert and the eye of a user, along a second axis perpendicular to the first axis.

A light beam originating from the image source passes through the first lens and the main lens and strikes the first portion. The relative values of the first index of refraction and the second index of refraction, are such that the light beam is totally internally reflected from the insert to the second lens and toward the eye of the user. Another light beam originating from the ambient imagery passes through the insert and the second lens, and reaches the eye of the user. The device can further include a head band, transducers mounted in one or two ear cups and a microphone. The microphone includes a differential noise canceling arrangement.

U.S. Pat. No. 5,861,994 issued to Kelly and entitled "Modular Binocular Electronic Imaging System", is directed to a portable binocular electronic imaging system which superimposes an image on a viewed scene, provides stereo sound to the user and allows video recording and input and output to electronic devices. The portable binocular electronic imaging system includes a core system housing, a display module, an electronic camera module and a battery and video cassette recorder module. The core system includes a binocular viewing subsystem, stereo speakers, an electronic system control subsystem, an input/output interface, three module ports and an input keypad.

The display module includes a display subsystem. The battery and video cassette recorder module includes a recorder and player and a battery. The binocular viewing subsystem includes a projection lens, a folding mirror, a combination positive Fresnel lens, a reflective striped prism beam splitting surface, and an eye lens.

The electronic system control subsystem is connected to the stereo speakers, the input/output interface, the input keypad, and to the three module ports. Each of the display module, electronic camera module and the battery and video cassette recorder module can be coupled with the portable binocular electronic imaging system. The folding mirror is located at a side of the eye lens. The reflective striped prism beam splitting surface is located in front of the folding mirror and the eye lens. The combination positive Fresnel lens is located between the reflective striped prism beam splitting surface on one side, and the folding mirror and the eye lens on the other. The projection lens is located between the folding mirror and the display subsystem.

The display subsystem projects an image toward the folding mirror through the projection lens, and the folding mirror reflects the image toward the combination positive Fresnel lens and the reflective striped prism beam splitting surface. The reflective striped prism beam splitting surface reflects the image, and the combination positive Fresnel lens converges the image to the eye lens. An image of the scene also passes through the reflective striped prism beam splitting surface and reaches the eye lens through the combination positive Fresnel lens.

U.S. Pat. No. 6,349,001 issued to Spitzer and entitled "Eyeglass Interface System", is directed to an eyeglass which captures a scene image viewed by a user and provides audio communication for the user. The eyeglass includes a first temple, a second temple, a first lens, a second lens, a camera assembly, a beam splitter coating, a mirror coating, a third lens, an audio input subsystem, an audio output subsystem, an interconnection subsystem and a power subsystem.

The first temple and the second temple are connected to the first lens and to the second lens, respectively. The first lens and the second lens are located in front of the eyes of the user. The camera assembly is connected to the first temple. The camera assembly is aligned with the direction of gaze of the user. The beam splitter coating and the mirror coating are embedded within the first lens. The third lens is located between the camera assembly and the mirror coating.

The beam splitter coating reflects part to the light beams respective of the scene image, to the mirror coating and another part thereof to the eye of the user. The mirror coating reflects the light beams respective of the scene image to the camera assembly.

U.S. Pat. No. 6,456,438 issued to Lee et al., and entitled "Variable Immersion Vignetting Display", is directed to a head mounted display (HMD) which displays a generated image for a user, against the real world imagery, in a selected manner. The HMD includes a combiner, a variably transmissive element, a display optical system and a control module. The combiner is located between the eyes of the user and the variably transmissive element. The control module is connected to the variably transmissive element. The combiner focuses optical data generated by the display optical system, toward the eye of the user. The real world imagery passes through the variably transmissive element and combiner, and reaches the eye of the user. The HMD can also include an eye tracking device to register the real world imagery with the generated image, to be coincident with the eye gaze direction of the user.

U.S. Pat. No. 6,160,666 issued to Rallison et al., and entitled "Personal Visual Display System", is directed to an HMD for displaying video images for a user, against the environmental light and producing sound for the user. The HMD includes a right loudspeaker, a left loudspeaker, a right temple piece, a left temple piece, a strap, a forehead brace, an optical device and a tracking device. The optical device includes an image generator, a field correction device, a fold mirror and a combiner.

The right loudspeaker and the left loudspeaker are attached to the right temple piece and the left temple piece, respectively. The right temple piece, the left temple piece, the strap and the forehead brace are attached together. The optical device is attached to the forehead brace. The tracking device is attached either to the right temple piece or the left temple piece.

The fold mirror reflects at least a portion of the image received from the image generator toward the combiner. The combiner reflects at least a portion of the image received from the fold mirror, toward the eye of the user. If the combiner is at least partially transparent, it combines the image with light from the environment, to provide the user with a simultaneous view of the environment and of the generated image. The tracking device collects information respective of the position, posture, location and movement of the head of the user. This information is used to control the generated image to the eyes of the user.

U.S. Pat. No. 5,422,653 issued to Maguire, Jr. and entitled "Passive Virtual Reality", is directed to a system for controlling the portion of an object space which is to be imaged, according to the position of the eye of a cameraman. In this patent, the words "passive viewer" means one whose body, head or visual axis may analogously follow the body, head or visual axis of an observer by following simulated active percepts. The words "active viewer" are meant to describe one whose activity or the effects thereof are monitored to provide a control signal which affects the information content of an image presented thereto.

The system includes a light source, a video camera, an eye position monitor, a first control and a transmitter. A passive viewer helmet includes a receiver, a second control, an image source, a light transmissive liquid crystal display, a prism, a first reflective mirror, a second reflective mirror, a three layer "sandwich" and a plurality of audio sources. The three layer "sandwich" includes a light valve, a variable magnification lens and a Risley prism. The eye position monitor is an oculometer which directs an invisible beam of infrared radiation onto the eye of the cameraman, where it is reflected back for detection. The first reflective mirror and the second reflective mirror are located in front of the right eye and the left eye of the passive viewer, respectively.

The eye position monitor monitors the position of the eyes of the cameraman (i.e., the active viewer) and provides a signal to the first control. The first control controls the portion of the object space which is imaged in a highly detailed manner in the video camera. The video camera provides image information to the first control and the first control transmits the image information to the second control via the transmitter and the receiver. The second control controls the image source to change the position of the highly detailed component of the object space with respect to the lesser detailed component, according to the visual axis of the eyes of the active viewer.

The eyes of the passive viewer observe the image produced by the image source. In this manner, the system induces the passive viewer to shift his gaze according to the changes in the position of the highly detailed component with respect to the imaged object space. The light transmissive liquid crystal display provides images to the prism, and the prism transmits a 50% reduced intensity image to the first reflective mirror and the second reflective mirror, through the three layer "sandwich". The first reflective mirror and the second reflective mirror reflect the reduced intensity image to the right eye and the left eye, respectively, of the passive viewer. The audio source provides an all-around audio effect for the passive viewer.

U.S. Pat. No. 6,421,031 issued to Ronzani et al., and entitled "Camera Display System", is directed to a head mounted display system which provides audiovisual communication for a user. The system includes a head mounted display, a collapsible keyboard, a head mounted computer, an input device and a communication module. The head mounted display includes an optical assembly, a connector and a speaker assembly. The head mounted display connects to a remote video source and to a power supply, via the connector.

The input device is an eye tracker. The communication module includes a global positioning system (GPS) and a wireless transducer. The head mounted computer includes a central processing unit (CPU), a video board module, a disk drive module, at least one expansion module and a battery module. The head mounted computer communicates with a central operations computer via the communication module and a distributed data network. The wireless transducer transmits and receives audio, video and data signals. The optical assembly provides a video image to the eyes of the user.

U.S. Pat. No. 5,682,172 issued to Travers et al., and entitled "Headset for Presenting Video and Audio Signals to a Wearer", is directed to a headset for providing audiovisual information to a user. The headset includes a rigid shell, a visor, speakers, a compensator, selectively inflatable bladders and a nape strap. The rigid shell includes a support beam and a pair of rigid arms. The visor includes a visual display to present an image to the eyes of the user. The compensator includes an open cell foam base. The rigid arms house the speakers. The speakers cooperate with the compensator. The pair of rigid arms extend from the support beam and the visor is pivotally attached to the support beam. The nape strap extends between the rigid arms. The selectively inflatable bladders are located inside the rigid shell.

SUMMARY OF THE DISCLOSED TECHNIQUE

It is an object of the disclosed technique to provide a novel method and system for enhancing communication of a user with the environment.

In accordance with the disclosed technique, there is thus provided a system for improving audiovisual communication. The system includes a line-of-sight determining system for determining a user line-of-sight of the eyes of a user, and an image display system coupled with the line-of-sight determining system. The image display system displays a supplementary image for the eyes, and controls a property of the supplementary image and of a scene image, according to the determined user line-of-sight.

BRIEF DESCRIPTION OF THE DRAWINGS

The disclosed technique will be understood and appreciated more fully from the following detailed description taken in conjunction with the drawings in which:

FIG. 1A is a schematic illustration of a system for improving audiovisual communication, constructed and operative in accordance with an embodiment of the disclosed technique;

FIG. 7A is a schematic illustration of a system for producing a noise-free sound signal, constructed and operative in accordance with a further embodiment of the disclosed technique;

FIG. 7C is a schematic illustration of the system of FIG. 7A incorporated with a head-mounted device;

FIG. 20 is a schematic illustration of a variable transmitter, constructed and operative in accordance with another embodiment of the disclosed technique;

FIG. 23A is a schematic blown-up illustration in perspective of a variable polarizer, constructed and operative in accordance with a further embodiment of the disclosed technique;

FIG. 23B is a schematic illustration of view I (front view) of one of the protective layers of the variable polarizer of FIG. 23A, when no electric voltage is applied across the pair of electrodes of the protective layer;

FIG. 23C is a schematic illustration of view II (top view) of the variable polarizer of FIG. 23A in an assembled form and when no electric field is applied across the pair of electrodes of the protective layer of the variable polarizer of FIG. 23A;

FIG. 23D is a schematic illustration of view I (front view) of one of the protective layers of the variable polarizer of FIG. 23A, when an electric voltage is applied across the pair of electrodes of the protective layer;

FIG. 23E is a schematic illustration of cross section III of the pair of electrodes of FIG. 23D;

FIG. 23F is a schematic illustration of view II (top view) of the variable polarizer of FIG. 23A in an assembled form, having an LC material of positive dielectric anisotropy and a guest material of positive optical anisotropy, and when an electric field is applied across the pair of electrodes of the protective layer of the variable polarizer of FIG. 23A;

FIG. 24B is a schematic illustration of cross section IV of the variable polarizer of FIG. 24A, when no electric voltage is applied across the interdigitating electrodes and the planar electrode of the protective layers of the variable polarizer of FIG. 24A;

FIG. 24C is a schematic illustration of cross section IV of the variable polarizer of FIG. 24A, operating in an in-plane mode;

DETAILED DESCRIPTION OF THE EMBODIMENTS

The disclosed technique overcomes the disadvantages of the prior art by providing a system which determines the line-of-sight (LOS) of a user, displays a supplementary image to the user, and controls the properties of the supplementary image and of a scene image, according to the determined LOS. The system further produces multi-dimensional sound for the user, receives voice commands from the user and captures video images of a scene, according to the determined LOS. The system can further communicate with various computers (either carried by the user or located remotely), via different networks. The term "user" herein below, refers to a person flying in an aircraft, such as a pilot or other crew member, a person residing in a space ship, a person in a ground vehicle, a person in a marine vessel, a person roaming on foot on surface, a scuba diver, and the like.

Figure 1B:
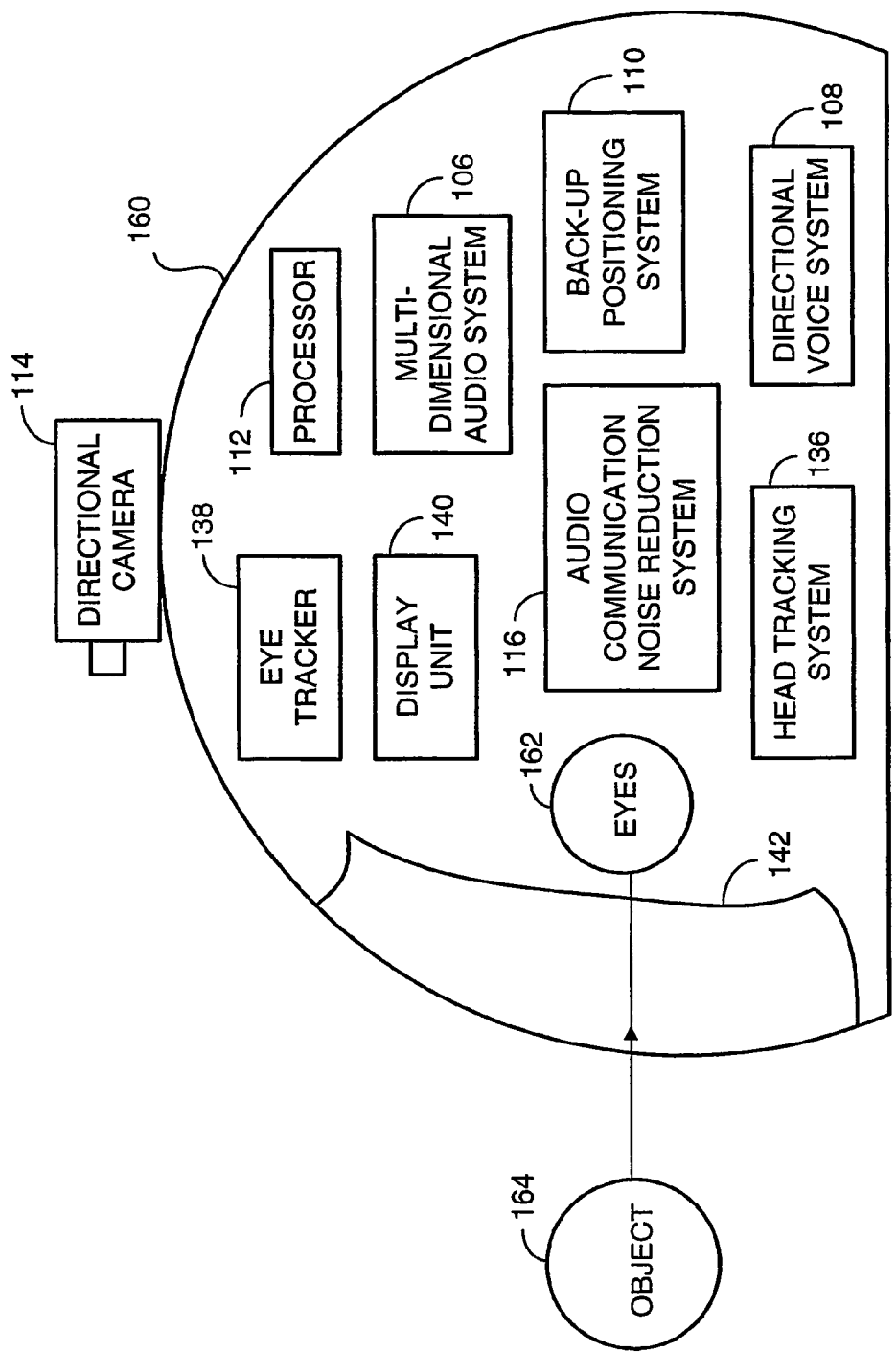
FIG. 1B is a schematic illustration of a system similar to the system of FIG. 1A, incorporated with a head-mounted device.

Reference is now made to FIGS. 1A and 1B. FIG. 1A is a schematic illustration of a system for improving audiovisual communication, generally referenced 100, constructed and operative in accordance with an embodiment of the disclosed technique. FIG. 1B is a schematic illustration of a system similar to system 100, incorporated with a head-mounted device, generally referenced 160.

System 100 includes an LOS determining system 102, an image display system 104, a multi-dimensional audio system 106, a directional voice system 108, a back-up positioning system 110, a processor 112, a directional camera 114, an audio communication noise reduction system 116, a network 118, a communication interface 120, a personal area network 122, a plurality of wearable computers 124 and 126, a local on-board computer 128, a remote on-board computer 130, a ground based computer 132 and a satellite based computer 134. LOS determining system 102 includes a head tracking system 136 and an eye tracker 138. Image display system 104 includes a display unit 140 and an active visor 142.

Head tracking system 136 is a system for determining the position and orientation of head-mounted device 160 in a global coordinate system (e.g., the coordinate system of an aircraft). Eye tracker 138 determines the LOS of one or more eyes 162 of a user (not shown) relative to head-mounted device 160. Head tracking system 136 together with eye tracker 138, determine the LOS of eyes 162 relative to the global coordinate system.

Display unit 140 can be a cathode ray tube (CRT), liquid crystal display (LCD), light emitting diode (LED), organic LED, laser, fluorescent light element, incandescent light element, flat panel display, infrared camera (either near infrared or far infrared still image camera or video camera), visible light video camera, starlight scope—SLS (i.e., a device which amplifies the light intensity of a detected object), and the like. Display unit 140 displays one or more supplementary images (e.g., functional status of the vehicle, dynamic parameters of the vehicle, such as speed and altitude) for eyes 162. Display unit 140 varies the properties of the supplementary image, such as the light intensity and the location relative to eyes 162, according to the LOS of eyes 162. Active visor 142 is a visor incorporated with head-mounted device 160, which varies the light intensity of an object 164 (e.g., a scene) detected by eyes 162.

Multi-dimensional audio system 106 is an audio system which produces sounds for the user, according to the location of the source of a sound, relative to the position and orientation of the head of the user. Directional voice system 108 includes a directional microphone which is placed inside a substantially conical volume which defines the dissipation geometry of sound waves generated by the speech of the user. In this manner, the signal to noise ratio (SNR) of the output of the directional microphone is improved compared to a non-directional microphone. Back-up positioning system 110 is a position and orientation determining system which can replace head tracking system 136, in case of failure of head tracking system 136. Back-up positioning system 110 is an optical, acoustic, electromagnetic system, and the like, which determines the position and orientation of an object by triangulation.

Directional camera 114 is a camera whose LOS changes according to the current LOS of eyes 162. For this purpose, directional camera 114 includes one or more moving mechanisms (including i.e., electronic elements, mechanical elements, or a combination thereof) to continuously readjust the LOS of camera 114 according to the current LOS of eyes 162. Directional camera 114 is either a video camera or a still image camera. Furthermore, directional camera 114 is constructed such that the resolution of those portions of object 164 which are produced by directional camera 114, and which are located directly along the LOS of eyes 162, is greater than other portions of object 164 which are normally detected by eyes 162, but not located along this LOS.

It is noted that each of image display system 104, multi-dimensional audio system 106, directional voice system 108 and audio communication noise reduction system, as well as additional modules which can be incorporated in this system (e.g., firing system, robotic elements), operates according to the LOS of eyes 162 and not merely the position and orientation of head-mounted device 160. Thus, system 100 enables audiovisual communication of the user, in a substantially accurate manner.

Audio communication noise reduction system 116 reduces the ambient noise where the user is located, while transmitting the voice of the user to a receiver. Audio communication noise reduction system 116 also produces the desired sound (e.g., the voice received from ground control), such that the user does not hear the ambient noise in the vicinity of the user. Audio communication noise reduction system 116 can also cancel the ambient noise in the vicinity of the user, such that the user does not hear the ambient noise.

Each of wearable computers 124 and 126 is a computer which is attached to the user. Local on-borne computer 128 is a computer which is located within the vehicle (not shown), such as an aircraft, ground vehicle, and the like, within which the user is located. Remote on-board computer 130 is a computer which is located within another vehicle (not shown). Ground based computer 132 is a computer which is substantially stationary relative to the user, such as one located in a command control station on the ground or on a platform on water, and the like. Satellite based computer 134 is a computer which is located within a satellite, space vehicle, space station, and the like. Network 118 is a local area network (LAN), wireless LAN (WLAN), wide area network (WAN), metropolitan area network (MAN), the Internet, intranet, and the like. Head-mounted device 160 is a helmet, headphone, headband, facemask (i.e., diving goggles, gas mask), and the like.

Head tracking system 136, eye tracker 138, display unit 140, multi-dimensional audio system 106, directional voice system 108, back-up positioning system 110, processor 112 and audio communication noise reduction system 116 are attached to head-mounted device 160. Active visor 142 is part of head-mounted device 160. Directional camera 114 can be either attached to head-mounted device 160 or to the vehicle within which the user is located. Communication interface 120 can be either attached to head-mounted device 160 or to the vehicle within which the user is located.

Processor 112 is coupled with LOS determining system 102, image display system 104, multi-dimensional audio system 106, directional voice system 108, back-up positioning system 110, directional camera 114, audio communication noise reduction system 116 and with communication interface 120. Personal area network 122 is coupled with communication interface 120 and with wearable computers 124 and 126. Network 118 is coupled with local on-board computer 128, remote on-board computer 130, ground based computer 132, satellite based computer 134 and with communication interface 120.

Instead of the coupling with processor 112, directional camera 114 can be coupled with LOS determining system 102. In addition to the coupling with processor 112, directional camera 114 can be coupled also with LOS determining system 102. Instead of the coupling with processor 112, image display system 104 can be coupled with LOS determining system 102. In addition to the coupling with processor 112, image display system 104 can be coupled also with LOS determining system 102.

Instead of the coupling with processor 112, multi-dimensional audio system 106 can be coupled with LOS determining system 102. In addition to the coupling with processor 112, multi-dimensional audio system 106 can be coupled also with LOS determining system 102. Instead of the coupling with processor 112, directional voice system 108 can be coupled with LOS determining system 102. In addition to the coupling with processor 112, directional voice system 108 can be coupled also with LOS determining system 102.

System 100 can produce a specific verbal sound respective of an LOS information received from LOS determining system 102, associated with an object at which the user is currently gazing. For example, when the user gazes at a certain building (i.e., in a scene image), LOS determining system 102 determines the LOS of eyes 162, and meanwhile the user interrogates directional voice system 108 by verbally asking for information related to that building (i.e., the user inputs a verbal message to directional voice system 108), by employing a microphone (not shown). In response to the input of the user, system 100 provides the user for example, with the street address of that particular building via a loudspeaker. Alternatively or additionally, image display system 104 displays a supplementary image on a visor of head-mounted device 160 respective to the location of the building.

Image display system 104 can display the supplementary image on a location on the visor which is on the current LOS of eyes 162, according to the current LOS received from eye tracker 138. In this case, eyes 162 can see the supplementary image while changing the LOS thereof.

Alternatively, image display system 104 can display the supplementary image on a location on the visor where the building can be viewed from (although the eyes 162 of the user may not gaze in that direction). In this case, image display system 104 displays the supplementary image according to data received from head tracking system 136 and the position and orientation of head-mounted device 160 with respect to the building, in the global coordinate system (e.g., the coordinate system of a vehicle). Furthermore, the supplementary image is displayed on the visor, whenever the user shifts the head thereof toward the building.

The user can also store (i.e., record) relevant information of an object in a memory (not shown) of system 100, while gazing at that object. For example, when the user gazes at a building, LOS determining system 102 determines the LOS of eyes 162, and the user can direct system 100 to store in the memory (i.e., record), verbal information respective of the building, such as the street address, number of floors, the type of the building, and the like, while an on board camera acquires an image of the object (i.e., the gazed at building), in association with that acquired image. Furthermore, the user can employ system 100 to provide verbal non-directional commands which are not associated with the LOS of eyes 162 (e.g., eject seat, eject jettison fuel, close landing gear).

One or both of head tracking system 136 and eye tracker 138 can be coupled with processor 112. Instead of the coupling of one or both of head tracking system 136 and eye tracker 138 with processor 112, head tracking system 136 can be coupled with eye tracker 138. In addition to the coupling of one or both of head tracking system 136 and eye tracker 138 with processor 112, head tracking system 136 can be coupled also with eye tracker 138.

Processor 112 manages the operation of LOS determining system 102, image display system 104, multi-dimensional audio system 106, directional voice system 108, back-up positioning system 110, directional camera 114 and of audio communication noise reduction system 116, according to signals received from communication interface 120. Alternatively, processor 112 is not coupled with communication interface 120 and processor 112 manages the operation of LOS determining system 102, image display system 104, multi-dimensional audio system 106, directional voice system 108, back-up positioning system 110, directional camera 114 and of audio communication noise reduction system 116 without any signal from communication interface 120.

Active visor 142 varies the light transmissibility there through, according to the LOS of eyes 162, according to a signal received from processor 112, and the like. For example, the system can include a light detector (not shown) coupled with the processor, for detecting the ambient light intensity, wherein the active visor varies the light transmissibility according to the detected intensity of the ambient light. Alternatively, the active visor varies the light transmissibility according to a signal received from a manual controller (not shown).

Following is a description of multi-dimensional audio system 106. The term "position" herein below, refers either to the location, to the orientation or both the location and the orientation, of an object in a three dimensional coordinate system. The term "aircraft" herein below, refers to airplane, helicopter, amphibian, balloon, glider, unmanned aircraft, spacecraft, and the like. It is noted that the disclosed technique is applicable to aircraft as well as devices other than aircraft, such as ground vehicle, marine vessel, aircraft simulator, ground vehicle simulator, marine vessel simulator, virtual reality system, computer game, home theatre system, stationary units such as an airport control tower, portable wearable units, and the like.

For example, the disclosed technique can provide an airplane crew member three dimensional audio representation regarding another aircraft flying nearby, a moving car and ground control. Similarly, the disclosed technique can provide a flight controller at the control tower three dimensional audio representation regarding aircrafts in the air or on the ground, various vehicles and people in the vicinity of the airport, and the like.

In a simple example, alerts pertaining to aircraft components situated on the left aircraft wing, are imbued with a spatial location corresponding to the left side of the aircraft. This allows the crew member to immediately recognize and concentrate on the required location.

In another example, when a plurality of aircrafts are flying in formation, and are in radio communication, a system according to the disclosed technique associates a received location for each audio signal transmission, based on the location of the transmitting aircraft, relative to the receiving aircraft. For example, when the transmitting aircraft is located on the right side of the receiving aircraft, the system provides the transmission of sound to the crew member of the receiving aircraft, as if it was coming from the right side of the aircraft, regardless of the crew member head position and orientation. Thus, if the crew member is looking toward the front of the aircraft, then the system causes the sound to be heard on the right side of the helmet, while if the crew member is looking toward the rear of the aircraft, the system causes the sound to be heard on the left side of the helmet.

Such spatial association is performed by imbuing the audio signals with spatial location characteristics, and correlating the imbued spatial location with the actual spatial location or with a preferred spatial location. The actual spatial location relates to the location of the sound source relative to the receiving crew member. For example, when the transmitting aircraft is flying to the upper right of the receiving aircraft, a system according to the disclosed technique imbues the actual location of the transmitting aircraft (i.e., upper right) to the sound of the crew member of the transmitting aircraft, while reproducing that sound at the ears of the crew member of the receiving aircraft.

The preferred spatial location refers to a location which is defined virtually to provide a better audio separation of audio sources or to emphasize a certain audio source. For example, when different warning signals are simultaneously generated at the right wing of the aircraft, such as engine fire indication (signal $S_1$), extended landing gear indication (signal $S_2$) and a jammed flap indication (signal $S_3$), a system according to the disclosed technique imbues a different spatial location on each of these warning signals. If the spherical orientation $(\phi,\theta)$ of the right side is designated $(0,0)$, then a system according to the disclosed technique shall imbue orientations $(0,30°)$, $(0,-30°)$ and $(30°,0)$ to signals $S_1$, $S_2$ and $S_3$, respectively. In this case, the crew member can distinguish these warning signals more easily. It is noted that the disclosed technique localizes a sound at a certain position in three dimensional space, by employing crew member line-of-sight information.

The human mind performs three dimensional audio location, based on the relative delay and frequency response of audio signals, between the left and the right ear. By artificially introducing such delays and frequency response, a monaural signal, is transformed into a binaural signal, having spatial location characteristics. The delay and frequency response which associate a spatial audio source location with each ear are described by a Head Related Transfer Function (HRTF) model. The technique illustrated may be refined by constructing the HRTF models for each individual, taking into account different head sizes and geometries. The human ability to detect the spatial location of a sound source by binaural hearing, is augmented by head movements, allowing the sound to be detected in various head orientations, increasing localization efficiency.

In a cockpit environment, a crew member does not maintain a fixed head orientation, but rather, changes head orientation according to the tasks performed. The disclosed technique takes into account the present crew member head orientation, by determining a suitable HRTF model based on both the actual source location, and the crew member head orientation. The crew member head orientation is detected by a user position system. The user position system includes units for detecting the user position (e.g., line-of-sight, ears orientation) and can further include units, such as a GPS unit, a radar and the like, for detecting the position of a volume which is associated with the user (e.g., a vehicle, a vessel, an aircraft and the like). The user position system can be user head-mounted (e.g., coupled to a head-mounted device, such as a helmet, headset, goggles, spectacles) or remote from the user (e.g., one or more cameras overlooking the user, a sonar system). Units for detecting the position of that volume can be coupled with the volume (e.g., GPS unit, onboard radar unit) or be external to the volume (e.g., ground IFF-radar unit with wireless link to the aircraft). Such volume position detecting units can be integrated with the user position detecting units. The user position system can be in form of an electromagnetic detection system, optical detection system, sonar system, and the like.

Figure 2:
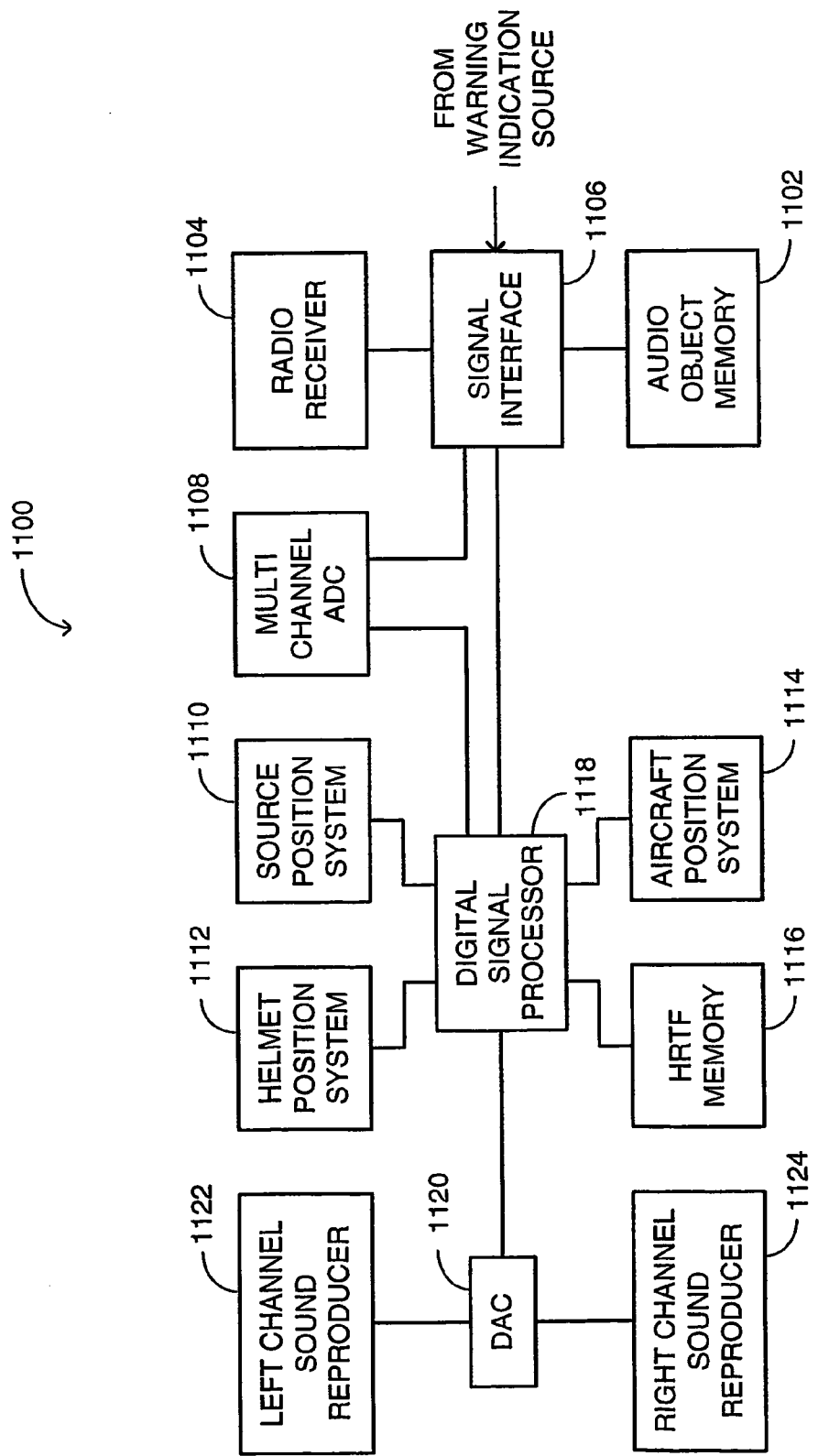
FIG. 2 is a schematic illustration of a system, constructed and operative in accordance with another embodiment of the disclosed technique.

Reference is now made to FIG. 2, which is a schematic illustration of a system, generally referenced 1100, constructed and operative in accordance with another embodiment of the disclosed technique. System 1100 includes an audio object memory 1102, a radio receiver 1104, a signal interface 1106 (e.g., a signal multiplexer), a multi channel analog to digital converter (ADC) 1108, a source position system 1110, an aircraft position system 1114, an HRTF memory 1116, a helmet position system 1112, a digital signal processor 1118, a digital to analog converter (DAC) 1120, a left channel sound reproducer 1122, and a right channel sound reproducer 1124. Audio object memory 1102 includes audio signal data and position data respective of a plurality of alarm states.

Signal interface 1106 is coupled with audio object memory 1102, radio receiver 1104, digital signal processor 1118 and with multi channel ADC 1108. Multi channel ADC 1108 is further coupled with digital signal processor 1118. Digital signal processor 1118 is further coupled with source position system 1110, helmet position system 1112, aircraft position system 1114, source location (HRTF) memory 1116 and with DAC 1120. DAC 1120 is further coupled with left channel sound reproducer 1122 and with right channel sound reproducer 1124.

Radio receiver 1104 receives radio transmissions in either analog or digital format and provides the audio portion of the radio transmissions to signal interface 1106. Signal interface 1106 receives warning indications from a warning indication source (not shown), such as an aircraft component, onboard radar system, IFF system, and the like, in either analog or digital format. Signal interface 1106 receives audio data and spatial location data in digital format, respective of the warning indication, from audio object memory 1102.

If the signals received by signal interface 1106 are in digital format, then signal interface 1106 provides these digital signals to digital signal processor 1118. If some of the signals received by signal interface 1106 are in analog format and others in digital format, then signal interface 1106 provides the digital signals to digital signal processor and the analog ones to multi channel ADC 1108. Multi channel ADC 1108 converts these analog signals to digital format, multiplexes the different digital signals and provides these multiplexed digital signals to digital signal processor 1118.

Source position system 1110 provides data respective of the radio source location to digital signal processor 1118. Helmet position system 1112 provides data respective of crew member helmet position to digital signal processor 1118. Aircraft position system 1114 provides data respective of current aircraft location to digital signal processor 1118. Digital signal processor 1118 selects a virtual source location based on the data respective of radio source location, crew member helmet position, and current aircraft location. Digital signal processor 1118 then retrieves the appropriate HRTF model, from HRTF memory 1116, based on the selected virtual source location.

Digital signal processor 1118 filters the digital audio signal, using the retrieved HRTF model, to create a left channel digital signal and a right channel digital signal. Digital signal processor 1118 provides the filtered digital audio signals to DAC 1120.

DAC 1120 converts the left channel digital signal and the right channel digital signal to analog format, to create a left channel audio signal and a right channel audio signal, respectively, and provides the audio signals to left channel sound reproducer 1122 and right channel sound reproducer 1124. Left channel sound reproducer 1122 and right channel sound reproducer 1124, reproduce the analog format left channel audio signal and right channel audio signal, respectively.

When an alarm or threat is detected, audio object memory 1102 provides the relevant audio alarm to multi channel ADC 1108, via signal interface 1106. Multi channel ADC 1108 converts the analog audio signal to digital format and provides the digital signal to digital signal processor 1118.

Helmet position system 1112 provides data respective of crew member helmet position to digital signal processor 1118. Aircraft position system 1114 provides data respective of current aircraft location to digital signal processor 1118. Aircraft position system 1114 is coupled with the aircraft. Digital signal processor 1118 selects a virtual source location based on the data respective of threat, alarm or alert spatial location, crew member helmet position, and current aircraft location. Digital signal processor 1118 then retrieves the appropriate HRTF model, from HRTF memory 1116, based on the selected virtual source location, in accordance with the embodiment illustrated above.

It is noted that helmet position system 1112 can be replaced with a location system or an orientation system. For example, when the audio signal is received from a transmitting aircraft, then the orientation of the helmet and the location of the receiving aircraft relative to the transmitting aircraft, is more significant than the location of the helmet within the cockpit of the receiving aircraft. In this case, the location of the transmitting aircraft relative to the receiving aircraft can be determined by a global positioning system (GPS), a radar system, and the like.

It is noted that radio receiver 1104 is the radio receiver generally used for communication with the aircraft, and may include a plurality of radio receivers, using different frequencies and modulation methods. It is further noted that threat identification and alarm generation are performed by components separate from system 1100 which are well known in the art, such as IFF (Identify Friend or Foe) systems, ground based warning systems, and the like. It is further noted that left channel sound reproducer 1122 and right channel sound reproducer 1124, are usually headphones embedded in the crew member helmet, but may be any other type of sound reproducers known in the art, such as surround sound speaker systems, bone conduction type headphones, and the like.

According to another embodiment of the disclosed technique, audio object memory 1102 stores audio alarms in digital format, eliminating the need for conversion of the audio signal to digital format, before processing by digital signal processor 1118. In such an embodiment, audio object memory 1102 is directly coupled with digital signal processor 1118.

According to a further embodiment of the disclosed technique, radio receiver 1104 may be a digital format radio receiver, eliminating the need for conversion of the audio signal to digital format, before processing by digital signal processor 1118. Accordingly, radio receiver 1104, is directly coupled with digital signal processor 1118.

According to another embodiment of the disclosed technique, helmet position system 1112, may be replaced by a crew member line-of-sight system (not shown), separate from a crew member helmet (not shown). Accordingly, the crew member may not necessarily wear a helmet, but may still take advantage of the benefits of the disclosed technique. For example, a crew member in a commercial aircraft normally does not wear a helmet. In such an example, the crew member line-of-sight system may be affixed to the crew member head, for example via the crew member headphones, in such a way so as to provide line-of-sight information.

Figure 3:
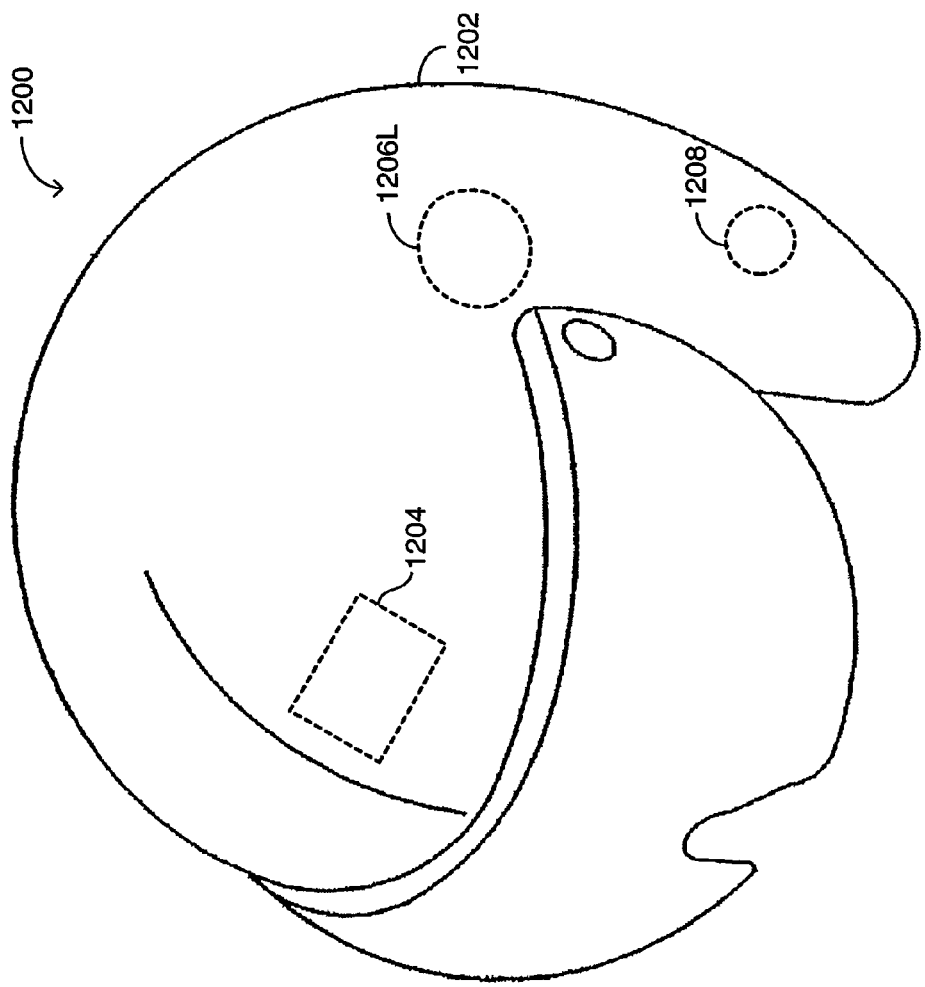
FIG. 3 is a schematic illustration of a crew member helmet, constructed and operative in accordance with a further embodiment of the disclosed technique.

Reference is now made to FIG. 3, which is a schematic illustration of a crew member helmet, generally referenced 1200, constructed and operative in accordance with a further embodiment of the disclosed technique. Crew member helmet 1200 includes a helmet body 1202, a helmet line-of-sight system 1204, a left channel sound reproducer 1206L, a right channel sound reproducer (not shown) and a data/audio connection 1208. Helmet line-of-sight system 1204, left channel sound reproducer 1206L, the right channel sound reproducer, and data/audio connection 1208 are mounted on helmet body 1202. Data/audio connection 1208 is coupled with helmet line-of-sight system 1204, left channel sound reproducer 1206L, and the right channel sound reproducer.

Helmet line-of-sight system 1204, left channel sound reproducer 1206L and the right channel sound reproducer, are similar to helmet position system 1112 (FIG. 2), left channel sound reproducer 1122 and right channel sound reproducer 1124, respectively. Helmet line-of-sight system 1204, left channel sound reproducer 1206L and the right channel sound reproducer, are coupled with the rest of the three dimensional sound imaging system elements (corresponding to the elements of system 1100 of FIG. 2) via data/audio connection 1208.

Figure 4:
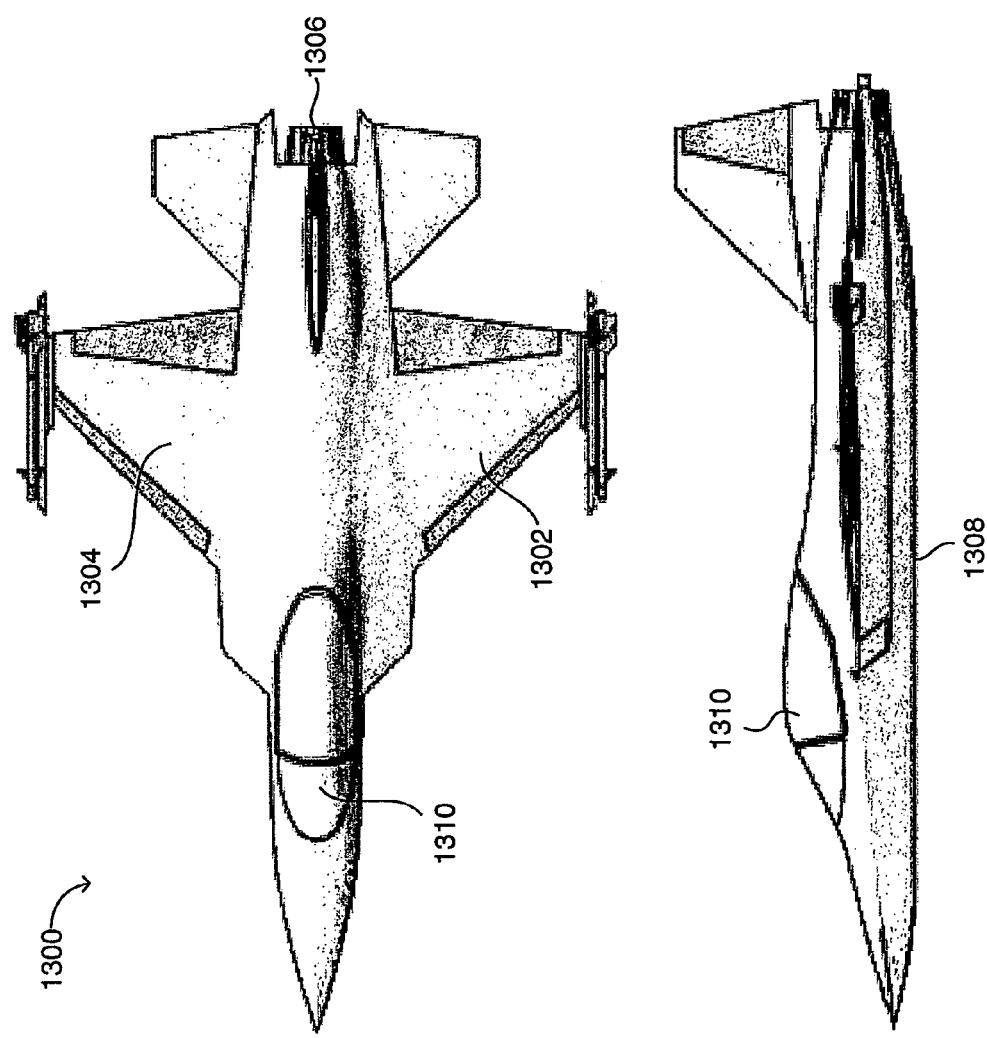
FIG. 4 is a schematic illustration of an aircraft, wherein examples of preferred virtual audio source locations are indicated.

Reference is now made to FIG. 4, which is a schematic illustration of an aircraft, generally referenced 1300, wherein examples of preferred virtual audio source locations are indicated. Indicated on aircraft 1300 are, left wing virtual source location 1302, right wing virtual source location 1304, tail virtual source location 1306, underbelly virtual source location 1308, and cockpit virtual source location 1310. In general, any combination of location and orientation of a transmitting point with respect to a receiving point, can be defined for any transmitting point surrounding the aircraft, using Cartesian coordinates, spherical coordinates, and the like. Alerts relating to left wing elements, such as left engine, left fuel tank and left side threat detection, are imbued with left wing virtual source location 1302, before transmission to the crew member. In a further example, alerts relating to the aft portion of the aircraft, such as rudder control alerts, aft threat detection, and afterburner related alerts, are imbued with tail virtual source location 1306, before being transmitted to the crew member.

It is noted that the illustrated virtual source locations, are merely examples of possible virtual source locations, provided to illustrate the principles of the disclosed technique. Other virtual source location may be provided, as required.

Figure 5:
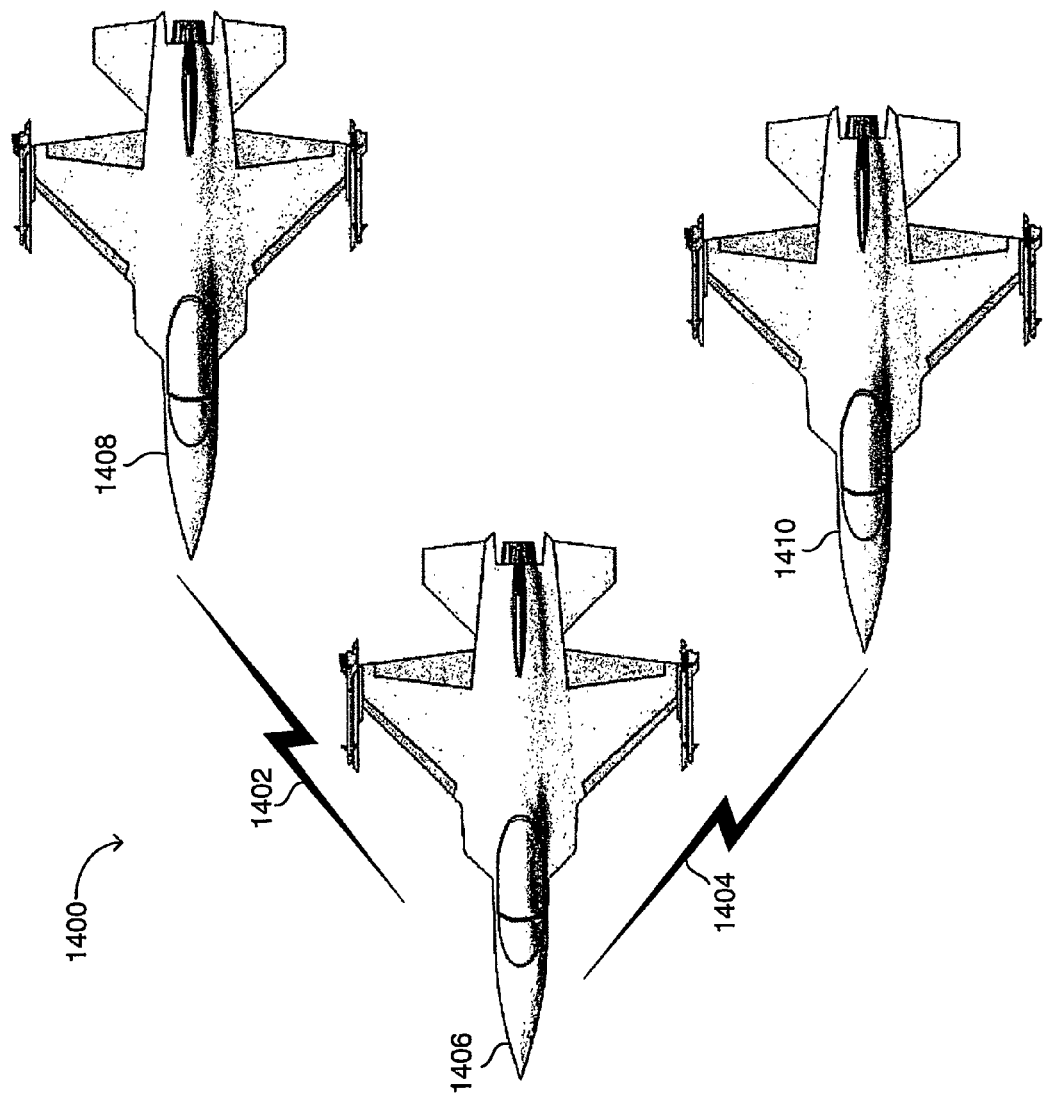
FIG. 5 is a schematic illustration of an aircraft formation, using radio links, to communicate audio signals between crew members in the different aircrafts.

Reference is now made to FIG. 5, which is a schematic illustration of an aircraft formation, generally referenced 1400, using radio links, to communicate audio signals between crew members in the different aircrafts. Aircraft formation 1400 includes lead aircraft 1406, right side aircraft 1408, and left side aircraft 1410. The aircrafts in aircraft formation 1400 communicate there between via first radio link 1402, and second radio link 1404. Lead aircraft 1406 and right side aircraft 1408, are in communication via first radio link 1402. Lead aircraft 1406 and left side aircraft 1410, are in communication via second radio link 1404.

In accordance with the disclosed technique, when lead aircraft 1406, receives a radio transmission from right side aircraft 1408 via first radio link 1402, the received radio transmission is imbued with a right rear side virtual source location, before being played back to the crew member in lead aircraft 1406. In another example, when left side aircraft 1410 receives a radio transmission from lead aircraft 1406, via second radio link 1404, the received radio transmission is imbued with a right frontal side virtual source location, before being played back to the crew member in left side aircraft 1410.

It is noted that the illustrated virtual formation, is merely an example of a possible formation and radio links, provided to illustrate the principles of the disclosed technique. Other formation and radio links, corresponding to different virtual source locations, may be employed, as required.

Figure 6:
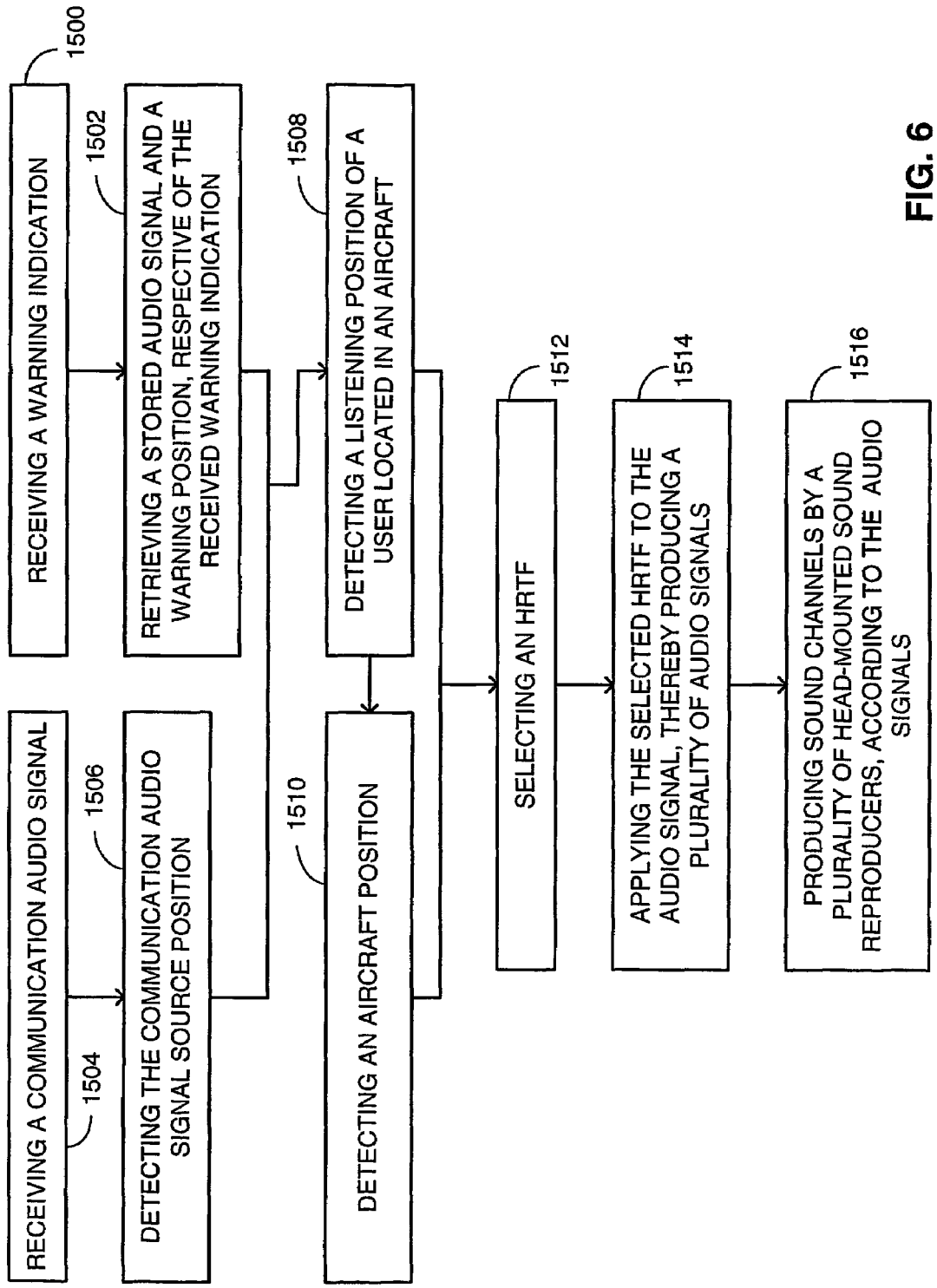
FIG. 6 is a schematic illustration of a method for 3D audio imaging, based on line-of-sight measurements, operative in accordance with another embodiment of the disclosed technique.

Reference is now made to FIG. 6, which is a schematic illustration of a method for 3D audio imaging, based on line-of-sight measurements, operative in accordance with another embodiment of the disclosed technique. In procedure 1500, a warning indication is received. The warning indication is respective of an event, such as a malfunctioning component, an approaching missile, and the like. With reference to FIG. 2, digital signal processor 1118 receives a warning indication from an aircraft component (not shown), such as fuel level indicator, landing gear position indicator, smoke indicator, and the like. Alternatively, the warning indication is received from an onboard detection system, such as IFF system, fuel pressure monitoring system, structural integrity monitoring system, radar system, and the like.

For example, in a ground facility, an alarm system according to the disclosed technique, provides warning indication, respective of a moving person, to a guard. In this case, the alarm system provides the alert signal (e.g., silent alarm) respective of the position of the moving person (e.g., a burglar), with respect to the position of the guard, so that the guard can conclude from that alert signal, where to look for that person.

In procedure 1502, a stored audio signal and a warning position respective of the received warning indication, is retrieved. For each warning indication, a respective audio signal and a respective spatial position is stored in a memory unit. For example, a jammed flap warning signal on the right wing is correlated with beep signals at 5 kHz, each at 500 msec duration and 200 msec apart and with an upper right location of the aircraft. With reference to FIGS. 2 and 4, digital signal processor 1118 retrieves an audio signal respective of a low fuel tank in the left wing of aircraft 1300, and left wing virtual source location 1302, from audio object memory 1102. Alternatively, when a warning regarding a homing missile is received from the onboard radar system, digital signal processor 1118 retrieves an audio signal respective of a homing missile alert, from audio object memory 1102. The system associates between that audio signal and the position of that missile as provided by the onboard radar system so as when selecting the appropriate HRTF, to provide the user with a notion of where the missile is coming from.

In procedure 1504, a communication audio signal is received. The communication audio signal is generally associated with voice (e.g., the voice of another person in the communication network). With reference to FIG. 2, radio receiver 1104 receives a communication audio signal. The communication audio signal can be received from another crew member in the same aircraft, from another aircraft flying simultaneously, from a substantially stationary source relative to the receiving aircraft, such as a marine vessel, air traffic controller, ground vehicle, and the like. Communications audio signal sources can, for example, be ground forces communication radio (Aerial Support), UHF radio system, VHF radio system, satellite communication system, and the like.

In procedure 1506, the communication audio signal source position, is detected. This detected position defines the position of a speaking human in a global coordinate system. With reference to FIG. 2, if the communication audio signal is received from a crew member in the same aircraft, then source position system 1110 detects the location of the helmet of the transmitting crew member. If the communication audio signal is received from another aircraft or from a substantially stationary source relative to the receiving aircraft, then source position system 1110 detects the location of the transmitting aircraft or the substantially stationary source. Source position system 1110 detects the location of the transmitting aircraft or the substantially stationary source by employing a GPS system, radar system, IFF system, and the like or by receiving the location information from the transmitting source.

In procedure 1508, a listening position is detected. This detected position defines the position of the ears of the listener (i.e., the crew member). With reference to FIG. 3, helmet line-of-sight system 1204 detects the position of helmet 1200, which defines the position of the ears of the user wearing helmet 1200. If a warning indication has been received (procedure 1500), then helmet line-of-sight system 1204 detects the location and orientation of helmet 1200 (i.e., the line-of-sight of the receiving crew member). If a communication audio signal has been received from another crew member in the same aircraft (procedure 1504), then helmet line-of-sight system 1204 detects the location and orientation of helmet 1200. For example, when the crew member is inspecting the aircraft while moving there within, the helmet line-of-sight system detects the location and orientation of the crew member at any given moment. If a communication audio signal has been received from another aircraft or a substantially stationary source (procedure 1504), then it is sufficient for helmet line-of-sight system 1204 to detect only the orientation of helmet 1200 of the receiving crew member, relative to the coordinate system of the receiving aircraft.

In procedure 1510, the aircraft position is detected. The detected position defines the position of the aircraft in the global coordinate system. With reference to FIG. 2, if a communication audio signal has been received from a source external to the aircraft (e.g., another aircraft or a substantially stationary source), then aircraft position system 1114 detects the location of the receiving aircraft, relative to the location of the transmitting aircraft or the substantially stationary source.

Aircraft position system 1114 detects the location by employing a GPS system, inertial navigation system, radar system, and the like. Alternatively, the position information can be received from the external source.

In procedure 1512, an HRTF is selected. The HRTF is selected with respect to the relative position of the listener ears and the transmitting source. With reference to FIG. 2, if a warning indication has been received (procedure 1500), then digital signal processor 1118 selects an HRTF model, according to the retrieved warning location (procedure 1502) and the detected line-of-sight of the receiving crew member (procedure 1508). If a communication audio signal has been received from a transmitting crew member in the same aircraft (procedure 1504), then digital signal processor 1118 selects an HRTF model, according to the detected location of the helmet of the transmitting crew member (procedure 1506) and the detected line-of-sight (location and orientation) of the receiving crew member (procedure 1508). If a communication audio signal has been received from another aircraft or a substantially stationary source, then digital signal processor 1118 selects an HRTF model, according to the location detected in procedure 1506, the line-of-sight detected in procedure 1508 and the location of the receiving aircraft detected in procedure 1510.

In procedure 1514, the selected HRTF is applied to the audio signal, thereby producing a plurality of audio signals. Each of these audio signals is respective of a different position in three dimensional space. With reference to FIG. 2, digital signal processor 1118 applies the HRTF model which was selected in procedure 1512, to the received warning indication (procedure 1500), or to the received communication audio signal (procedure 1504).

Digital signal processor 1118 further produces a left channel audio signal and a right channel audio signal (i.e., a stereophonic audio signal). Digital signal processor 1118 provides the left channel audio signal and the right channel audio signal to left channel sound reproducer 1122 and right channel sound reproducer 1124, respectively, via DAC 1120. Left channel sound reproducer 1122 and right channel sound reproducer 1124 produce a left channel sound and a right channel sound, according to the left channel audio signal and the right channel audio signal, respectively (procedure 1516).

It is noted that the left and right channel audio signals include a plurality of elements having different frequencies. These elements generally differ in phase and amplitude according to the HRTF model used to filter the original audio signal (i.e., in some HRTF configurations, for each frequency). It is further noted that the digital signal processor can produce four audio signals in four channels for four sound reproducers (quadraphonic sound), five audio signals in five channels for five sound producers (surround sound), or any number of audio signals for respective number of sound reproducers. Thus, the reproduced sound can be multi-dimensional (i.e., either two dimensional or three dimensional).

In a further embodiment of the disclosed technique, the volume of the reproduced audio signal, is altered so as to indicate distance characteristics for the received signal. For example, two detected threats, located at different distances from the aircraft, are announced to the crew member using different volumes, respective of the distance of each threat. In another embodiment of the disclosed technique, in order to enhance the ability of the user to perceive the location and orientation of a sound source, the system utilizes a predetermined echo mask for each predetermined set of location and orientation. In a further embodiment of the disclosed technique, a virtual source location for a received transmission is selected, based on the originator of the transmission (i.e. the identity of the speaker, or the function of the radio link). Thus a crew member may identify the speaker, or the radio link, based on the imbued virtual source location.

For example, transmissions from the mission commander may be imbued with a virtual source location directly behind the crew member, whereas transmissions from the control tower may be imbued with a virtual source location directly above the crew member, allowing the crew member to easily distinguish between the two speakers. In another example, radio transmissions received via the ground support channel, may be imbued with a spatial location directly beneath the crew member, whereas, tactical communications received via a dedicated communication channel may be imbued with a virtual source location to the right of the crew member.

It is noted that the locations and sources, described herein above are merely examples of possible locations and sources, provided to illustrate the principles of the disclosed technique. Other virtual source locations and communication sources may be used, as required.

In a further embodiment of the disclosed technique, the method illustrated in FIG. 6, further includes a preliminary procedure of constructing HRTF models, unique to each crew member. Accordingly, the HRTF models used for filtering the audio playback to the crew member, are loaded from a memory device that the crew member introduces to the system (e.g., such a memory device can be associated with his or her personal helmet). It is noted that such HRTF models are generally constructed in advance and used when required.

In a further embodiment of the disclosed technique surround sound speakers are used to reproduce the audio signal to the crew member. Each of the spatial models corresponds to the characteristic of the individual speakers and their respective locations and orientations within the aircraft. Accordingly, such a spatial model defines a plurality of audio channels according to the number of speakers. However, the number of audio channels may be less than the number of speakers: Since the location of these speakers is generally fixed, then a spatial model is not selected according to the crew member line-of-sight (LOS) information, but only based on the source location and orientation with respect to the volume defined and surrounded by the speakers. It is noted that in such an embodiment, the audio signal is heard by all crew members in the aircraft, without requiring LOS information for any of the crew members.

Following is a description of audio communication noise reduction system 116. The term "acoustoelectric transducer" herein below, refers to a device which converts acoustical signals to electrical signals (e.g., a microphone). The term "electroacoustic transducer" herein below, refers to a device which converts electrical signals to acoustical signals (e.g., a loudspeaker). An acoustoelectric transducer can operate based on principles of electrodynamics, electrostatics, piezoelectricity, magnetostriction, fiber-optics, stimulation of carbon particles, and the like. An electroacoustic transducer can operate based on principles of electrodynamics, magnetism, piezoelectricity, magnetostriction, hydraulic, and the like. The term "electric" herein includes all electromagnetic signals, such as electric, optic, radio, and the like, that can be transmitted by wire or other communication channels, or wirelessly.

The term "quiet zone" herein below, refers to a region in the vicinity of the ear-drum, the ear, or within the outer canal thereof, at which a sound at approximately 180 degrees out-of-phase relative to the ambient noise (anti-phase, or out-of-phase by $\pi$ radians), cancels the ambient noise and as a result, the person does not hear the ambient noise. The locations "close to the ear" herein below, are approximate and refer to the quiet zone. The term "tonal noise" herein below, refers to a noise which is confined to substantially limited frequency range or ranges, such as the noise generated by the rotors of a helicopter.

Figure 7B:
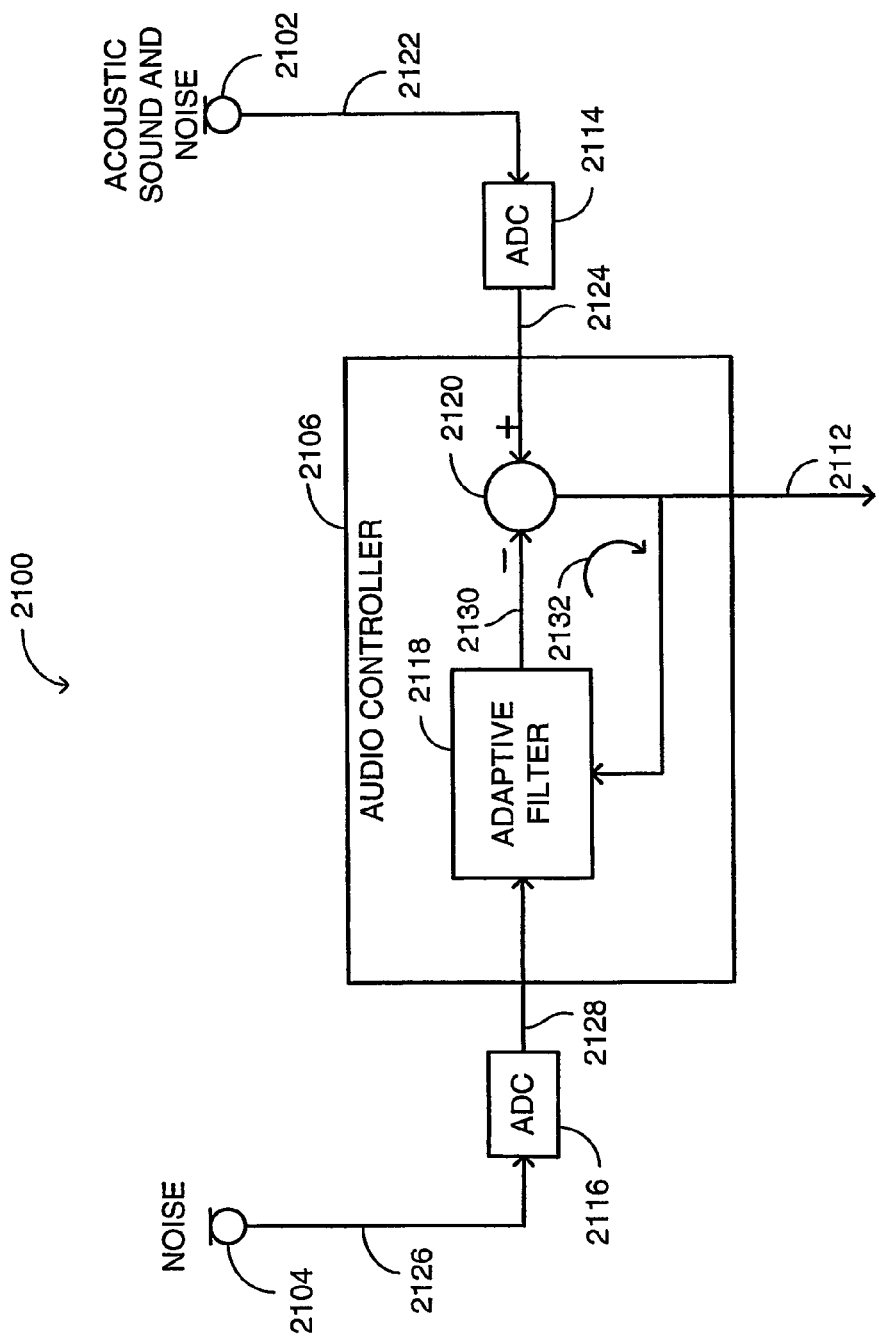
FIG. 7B is a schematic illustration of a detail of the audio controller of the system of FIG. 7A.

Reference is now made to FIGS. 7A, 7B and 7C. FIG. 7A is a schematic illustration of a system for producing a noise-free sound signal, generally referenced 2100, constructed and operative in accordance with a further embodiment of the disclosed technique. FIG. 7B is a schematic illustration of a detail of the audio controller of the system of FIG. 7A. FIG. 7C is a schematic illustration of the system of FIG. 7A incorporated with a head-mounted device, generally referenced 2150.

With reference to FIG. 7A, system 2100 includes acoustoelectric transducers 2102 and 2104 and an audio controller 2106. Audio controller 2106 is coupled with acoustoelectric transducers 2102 and 2104.

Audio controller 2106 is a digital processor, which simultaneously samples two input signals at the same sampling rate and determines a transfer function for these two input signals, according to an adaptive filtering method. Audio controller 2106 applies the transfer function on one of the input signals and subtracts the result from the other input signal. Audio controller 2106, then produces an output signal respective of the result of the subtraction.

Acoustoelectric transducer 2102 detects acoustic sound. This acoustic sound can be a human voice, machine generated voice, and the like. If the acoustic sound is the voice of a person (not shown), then acoustoelectric transducer 2102 is located close to the mouth (not shown) of the person. Acoustoelectric transducer 2102 detects the desired sound (i.e., the voice) as well as the noise (i.e., an undesired sound) which is present in the environment surrounding the person. The noise is generated for example, by other persons and devices, such as engines, turbines, motors, and mechanical devices, hydraulic or pneumatic devices (e.g., tubing, actuators), electromechanical devices (e.g., electric motor), loud-speakers which surround the speaker, firing of ammunition, by environmental sources, such as wind, rain, ocean waves, thunderstorm, by animals, and the like.

Acoustoelectric transducer 2104 and acoustoelectric transducer 2102 detect different sounds, due to either a sound absorbing material (not shown), located between acoustoelectric transducers 2102 and 2104, or the mere distance between acoustoelectric transducers 2102 and 2104. Thus, acoustoelectric transducer 2104 detects the noise and substantially none of the desired sound, while acoustoelectric transducer 2102 detects the desired sound and noise.

Audio controller 2106 receives signals 2108 and 2110 from acoustoelectric transducers 2102 and 2104, respectively. Each of signals 2108 and 2110 is in analog format. An analog to digital converter (not shown) and herein below referred to as ADC, which converts an analog signal to a digital signal, is coupled with acoustoelectric transducer 2102 and audio controller 2106. Another ADC (not shown) is coupled with acoustoelectric transducer 2104 and audio controller 2106. Thus, audio controller 2106 receives signals 2108 and 2110 which are in digital format.

Signal 2108 includes information respective of a desired sound and noise. Signal 2110 includes information respective of noise. Audio controller 2106 determines a new reduced-intensity sound pressure level (SPL) for signal 2110, by employing an SPL converter (not shown). The SPL converter can be in form of a hardwired look-up table, a software look-up table, a hardwired transfer function, a software transfer function, an adaptive filter, and the like. Audio controller 2106 subtracts the new determined SPL from the SPL of signal 2108, which corresponds to signal 2110. The noise detected by acoustoelectric transducer 2102 is different from the noise detected by acoustoelectric transducer 2104, namely—it is usually at a reduced intensity and with a retarded phase (due to an acoustic insulation or acoustic insulating distance between acoustoelectric transducers 2102 and 2104). Thus, the new determined SPL corresponds to a reduced and retarded function of the SPL of signal 2110. Audio controller 2106 produces a signal 2112 respective of the result of the above subtraction operation. Thus, signal 2112 includes information respective of the desired sound, substantially excluding the noise.

The form and the parameters of the SPL converter are determined in accordance with certain physical parameters, such as the hearing characteristics of a person, the voice characteristics of a person, the sound absorbing characteristics of a headset worn by a person, the dimensions of the headset, the relative distances between acoustoelectric transducer 2102 and acoustoelectric transducer 2104, the acoustic properties of the environment which surround acoustoelectric transducer 2102 and acoustoelectric transducer 2104, the acoustic properties of the sound absorbing material located between acoustoelectric transducer 2102 and acoustoelectric transducer 2104, and the like.

With reference to FIG. 7B, system 2100 includes acoustoelectric transducers 2102 and 2104, audio controller 2106 and analog to digital converters 2114 and 2116. Audio controller 2106 includes an adaptive filter 2118 and a summing element 2120. ADC 2114 is coupled with acoustoelectric transducer 2102 and summing element 2120. ADC 2116 is coupled with acoustoelectric transducer 2104 and adaptive filter 2118. Alternatively, ADC 2114 is integrated with either acoustoelectric transducer 2102 or audio controller 2106. Similarly, ADC 2116 can be integrated with acoustoelectric transducer 2104 or audio controller 2106.

Acoustoelectric transducer 2102 produces an analog signal 2122 and sends analog signal 2122 to ADC 2114. ADC 2114 converts analog signal 2122 to a digital signal 2124, sends digital signal 2124 to summing element 2120 and adaptive filter 2118 produces a signal 2130 according to signal 2128. Signal 2130 is respective of the ambient noise detected by acoustoelectric transducer 2104 at a reduced SPL (i.e., the SPL of the ambient noise close to acoustoelectric transducer 2102). Summing element 2120 produces signal 2112 by subtracting signal 2130 from signal 2124. Signal 2112 is further provided to an interface (not shown) for further processing or transmission. Acoustoelectric transducer 2104 produces an analog signal 2126 and sends analog signal 2126 to ADC 2116. ADC 2116 converts analog signal 2126 to a digital signal 2128 and sends digital signal 2128 to adaptive filter 2118. Signal 2112 from summing element 2120 is fed back to adaptive filter 2118, in a feedback loop 2132. If signal 2112 includes any residual noise, then adaptive filter 2118 detects this residual noise and adjusts signal 2130 accordingly. Summing element 2120 then subtracts this residual noise from signal 2124.

With reference to FIG. 7C, acoustoelectric transducer 2102 is incorporated with head-mounted device 2150. Audio controller 2106 is coupled with acoustoelectric transducers 2102 and 2104. Head-mounted device 2150 is in form of a helmet, a headset, and the like. Acoustoelectric transducer 2102 is located at the mouth (not shown) of the user (not shown). Acoustoelectric transducer 2104 is located external to head-mounted device 2150 or externally mounted thereon, but acoustically insulated or remote from the mouth of the user.

Head-mounted device 2150 can include a visual device (not shown), such as a head-up display, visor, liquid crystal display (LCD), field emission display (FED), mirror, and the like. Additionally, head-mounted device 2150 can include one or more electroacoustic transducers.

If head-mounted device 2150 is in form of a helmet, it can include sound absorbing material, such as mineral wool, fiberglass, and the like. In this case, acoustoelectric transducer 2102 detects the voice of the user, while also detecting the background noise—but at a reduced SPL.

In case head-mounted device 2150 is in form of a headset, due to the physical distance of acoustoelectric transducer 2104 from the mouth of the user, acoustoelectric transducer 2104 detects the ambient noise and substantially none of the voice of the user. However, acoustoelectric transducer 2102 detects the voice of the user and the ambient noise. It is noted that even ambient air can effectively acoustically insulate, such as insulating acoustoelectric transducer 2104 from the mouth of the user.

In case head-mounted device 2150 is a helmet worn by a pilot (not shown), the ambient noise can be the noise generated by the engine (i.e., power-plant) of the aircraft, by the engines of other aircraft flying closeby, the voices of the aircraft crew, the sound of thunder, the sound of ice particles striking the windshield, the sound of firing ammunition, and the like. Acoustoelectric transducer 2102 is attached to the inner portion of head-mounted device 2150, close to the mouth of the pilot and acoustoelectric transducer 2104 is attached to the outer portion of head-mounted device 2150.

Head-mounted device 2150 includes sound absorbing material, and acoustoelectric transducer 2104 is farther away from the mouth of the pilot than acoustoelectric transducer 2102. Hence, acoustoelectric transducer 2104 detects mostly the ambient noise and substantially none of the voice of the pilot. However, since the sound absorbing material of head-mounted device 2150 absorbs only a portion of the sound, acoustoelectric transducer 2102 detects the voice of the pilot, in addition to the ambient noise at a reduced SPL. Thus, signal 2108 includes information respective of the voice of the pilot and an attenuated level of the ambient noise, while signal 2110 includes information respective of the ambient noise at an SPL higher than that detected by acoustoelectric transducer 2102. The attenuation level of the ambient noise may depend on frequency.

The parameters of the SPL converter can be determined empirically, by measuring the SPL values of signals 2108 and 2110 in a selected frequency range, in response to sound corresponding to the SPL values and in the frequency range of the expected ambient noise. It is noted that these measurements are performed without the voice of the pilot in the same location within the aircraft, in which system 2100 is employed. These measurements can be performed before flight as "pre-calibrations" or during speech pauses at flight time. In addition, audio controller 2106 calibrates system 2100, at the beginning of every flight. Alternatively, the parameters of the SPL converter can be determined analytically, by computing the estimated attenuation of SPL values of the ambient noise in a selected frequency range.

It is further noted that the attenuated SPL value of the ambient noise detected by acoustoelectric transducer 2102, depends also on the physical distance between acoustoelectric transducers 2102 and 2104. It is noted that due to the physical distance between acoustoelectric transducers 2102 and 2104 and a given value of the speed of sound, signals 2108 and 2110 can include information respective of the ambient noise waveform, which are out of phase. In order to subtract the correct portion of the ambient noise waveform from signal 2108, audio controller 2106 takes this phase-shift into account, by referring to a respective look-up table, transfer function, and the like.

According to another aspect of the disclosed technique, a noise reduction system employs an active noise reduction (ANR) controller, to produce a noise-free sound close to the ear of a user. The ANR controller produces an anti-phase signal of the ambient noise, which is derived from the detection of ambient noise by an external acoustoelectric transducer.

Figure 8A:
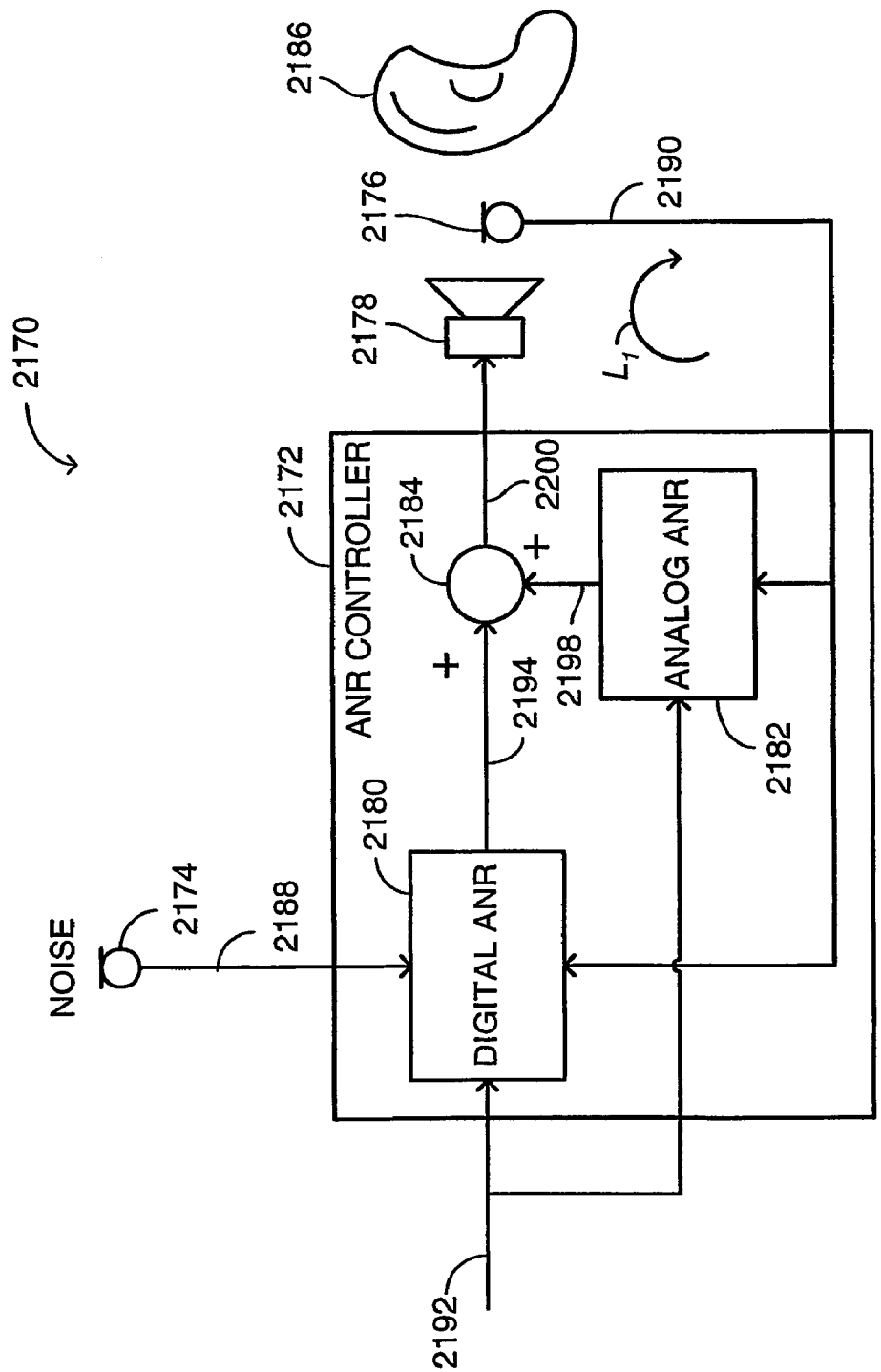
FIG. 8A is a schematic illustration of a noise-canceling system, constructed and operative in accordance with another embodiment of the disclosed technique.
Figure 8B:
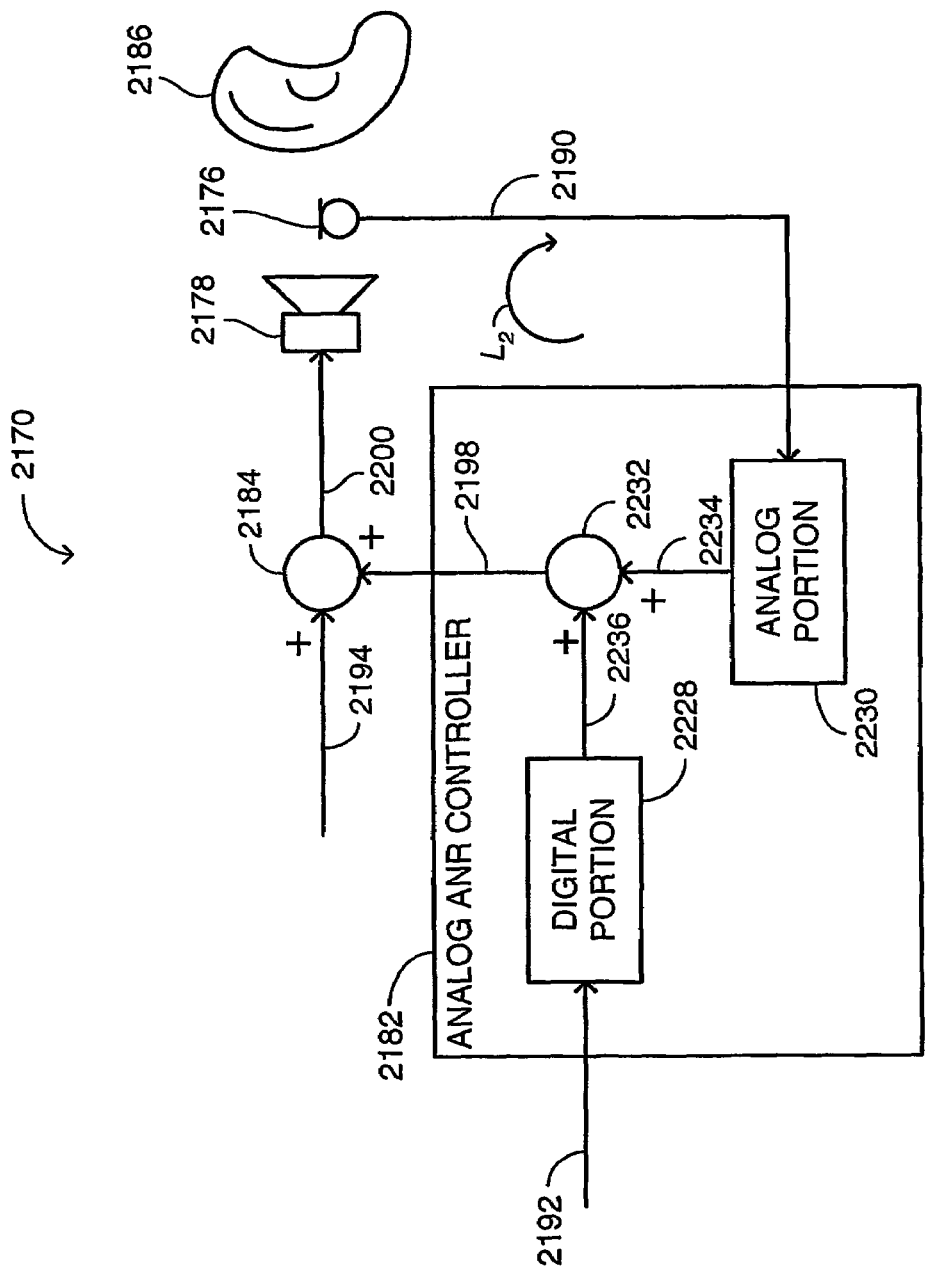
FIG. 8B is a schematic illustration of a detail of the analog ANR controller of the ANR controller of the system of FIG. 8A.
Figure 8C:
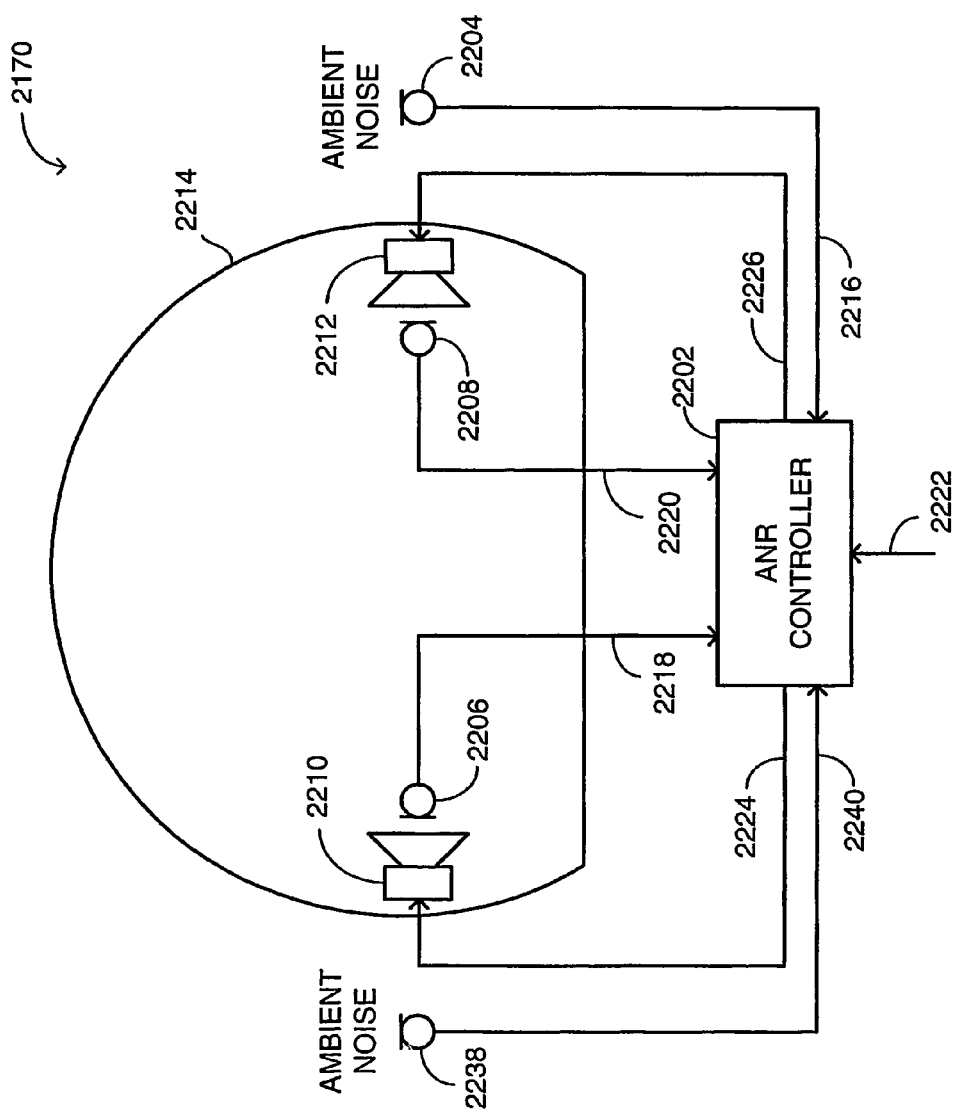
FIG. 8C is a schematic illustration of the system of FIG. 8A, incorporated with a head-mounted device.

Reference is now made to FIGS. 8A, 8B and 8C. FIG. 8A is a schematic illustration of a noise-canceling system, generally referenced 2170, constructed and operative in accordance with another embodiment of the disclosed technique. FIG. 8B is a schematic illustration of a detail of the analog ANR controller of the ANR controller of the system of FIG. 8A. FIG. 8C is a schematic illustration of the system of FIG. 8A, incorporated with a head-mounted device, generally referenced 2214.

With reference to FIG. 8A, system 2170 includes an ANR controller 2172, a reference acoustoelectric transducer 2174, an error acoustoelectric transducer 2176 and an electroacoustic transducer 2178. ANR controller 2172 includes a digital ANR controller 2180, an analog ANR controller 2182 and a primary summing element 2184. Digital ANR controller 2180 is a device which produces an anti-phase signal for an input signal, at a reduced SPL. Analog ANR controller 2182 is a device which produces an anti-phase signal for an input signal, at the same SPL.

Digital ANR controller 2180 is coupled with reference acoustoelectric transducer 2174, error acoustoelectric transducer 2176 and with primary summing element 2184. Analog ANR controller 2182 is coupled with error acoustoelectric transducer 2176 and with primary summing element 2184. Primary summing element 2184 is coupled with electroacoustic transducer 2178.

Electroacoustic transducer 2178 and error acoustoelectric transducer 2176 are located close to an ear 2186 of a user (not shown). Reference acoustoelectric transducer 2174 is located substantially remote from ear 2186. Alternatively, a sound absorbing material (not shown) is located between electroacoustic transducer 2178 and error acoustoelectric transducer 2176 on one side and reference acoustoelectric transducer 2174 on the other. In both cases, reference acoustoelectric transducer 2174 detects the ambient noise and substantially none of the sound produced by electroacoustic transducer 2178. Likewise, error acoustoelectric transducer 2176 detects the sound emitted by electroacoustic transducer 2178 and the ambient noise at a location close to ear 2186.

Following is a description of a loop $L_1$ formed by digital ANR controller 2180, primary summing element 2184, electroacoustic transducer 2178 and error acoustoelectric transducer 2176. Digital ANR controller 2180 continuously samples a signal 2188 from reference acoustoelectric transducer 2174, respective of the ambient noise, and a signal 2192 respective of a desired sound, from a sound source (not shown). The desired sound from the sound source can be a human voice, machine generated sound, mechanical voice, a sound signal, an acoustic sound (e.g., loud speaker), and the like.

Digital ANR controller 2180 determines a reduced SPL for signal 2188 by employing an SPL converter as described herein above in connection with audio controller 2106 (FIG. 7C). The reduced SPL for signal 2188 corresponds to the SPL of the ambient noise, at a location close to ear 2186. Digital ANR controller 2180 produces an anti-phase signal (not shown) for signal 2188 at the reduced SPL, and adds this anti-phase signal at the reduced SPL, to signal 2192, thereby producing a signal 2194. Electroacoustic transducer 2178 produces a sound according to signal 2194.

It is noted that error electroacoustic transducer 2176 is located sufficiently close to ear 2186, such that the anti-phase sound of the ambient noise at the quiet zone of ear 2186, which is emitted by electroacoustic transducer 2178, substantially cancels out the ambient noise at the quiet zone of ear 2186. Error acoustoelectric transducer 2176 is located sufficiently close to electroacoustic transducer 2178, to detect the sound emitted by electroacoustic transducer 2178.

Digital ANR controller 2180 receives a signal 2190 from error acoustoelectric transducer 2176, respective of the sound emitted by electroacoustic transducer 2178 (which includes the desired sound and the anti-phase of the ambient noise at a location close to ear 2186) and the ambient noise at a location close to ear 2186. Digital ANR controller 2180 modifies a portion of signal 2194 respective of the anti-phase of the ambient noise at a location close to ear 2186, by processing signals 2188, 2190 and 2192.

It is further noted that since signals 2188 and 2190 are analog, two analog to digital converters (not shown), are employed to convert signals 2188 and 2190 to digital format. Alternatively, these analog to digital converters are integrated with each one of reference acoustoelectric transducer 2174 and error acoustoelectric transducer 2176, or integrated with digital ANR controller 2180. Signal 2192 can be either digital or analog. If signal 2192 is analog, then another ADC (not shown) converts signal 2192 to digital format. A digital to analog converter (not shown), and herein below referred to as DAC, converts signal 2194 from digital format to analog format. Alternatively, this DAC is integrated with either digital ANR controller 2180 or with primary summing element 2184.

With further reference to FIG. 8B, analog ANR controller 2182 includes a digital portion 2228, an analog portion 2230 and a secondary summing element 2232. Secondary summing element 2232 is coupled with digital portion 2228, analog portion 2230 and primary summing element 2184. Primary summing element 2184 is coupled with electroacoustic transducer 2178. Analog portion 2230 is coupled with error acoustoelectric transducer 2176. Analog portion 2230, primary summing element 2184, secondary summing element 2232, electroacoustic transducer 2178 and error acoustoelectric transducer 2176 form a feedback loop $L_2$ in system 2170.

Following is a description of feedback loop $L_2$. Analog portion 2230 receives signal 2190 from error acoustoelectric transducer 2176, produces a signal 2234 and sends signal 2234 to secondary summing element 2232. Signal 2234 is approximately 180 degrees out-of-phase relative to signal 2190. Due to the operation of analog portion 2230 and gain losses between electroacoustic transducer 2178 and analog portion 2230, signal 2234 is attenuated. Digital portion 2228 produces a signal 2236 by attenuating signal 2192 by the same amount that signal 2234 is attenuated and sends signal 2236 to secondary summing element 2232.

Secondary summing element 2232 produces a signal 2198, by adding signals 2234 and 2236. Since the desired sound portion of signal 2234 is out-of-phase by approximately 180 degrees relative to signal 2236, the desired sound portion of signal 2234 and signal 2236, substantially cancel out at secondary summing element 2232. Thus, signal 2198 is substantially respective of only the anti-phase of the ambient noise at a location close to ear 2186. Primary summing element 2184 produces a signal 2200 by adding signals 2194 and 2198. Electroacoustic transducer 2178 emits a sound respective of the sum of signal 2194 (which includes the desired sound, an anti-phase to the ambient noise at a location close to ear 2186 and an adjustment according to signal 2190) and signal 2198 (which includes another anti-phase to the ambient noise at a location close to ear 2186).

It is noted that the ANR controller can include only the digital ANR controller coupled with the reference acoustoelectric transducer, the error acoustoelectric transducer and with the electroacoustic transducer. Thus, the digital ANR controller makes adjustments to a signal which sends to the electroacoustic transducer, according to an error signal, which the digital ANR controller receives from the error acoustoelectric transducer. In this case, the digital ANR controller reduces mainly tonal noise.

With reference to FIG. 8A, it is noted that digital ANR controller 2180 operates at a slower rate than that of analog ANR controller 2182, but digital ANR controller 2180 is substantially more effective in producing anti-phase signals for tonal noise and for noise at substantially high frequencies. On the other hand, analog ANR controller 2182 is more effective in producing anti-phase signals for noise in a substantially wide frequency range, albeit at substantially low frequencies. Thus, by combining digital ANR controller 2180 and analog ANR controller 2182 in ANR controller 2172, system 2170 is capable to produce a desired sound in the presence of noise, both at a narrow (i.e., tonal noise) or a wide frequency range, as well as low or high frequencies. Digital ANR controller 2180 and analog ANR controller 2182 attenuate the same noise. Thus, the attenuated noise in signal 2200 is substantially equal to the sum of the attenuation performed by digital ANR controller 2180 and analog ANR controller 2182.

With reference to FIG. 8C, system 2170 includes ANR controller 2202, reference acoustoelectric transducers 2204 and 2238, error acoustoelectric transducers 2206 and 2208 and electroacoustic transducers 2210 and 2212. ANR controller 2202 is similar to ANR controller 2172 (FIG. 8A). Each of error acoustoelectric transducers 2206 and 2208 is similar to error acoustoelectric transducer 2176. Each of electroacoustic transducers 2210 and 2212 is similar to electroacoustic transducer 2178. Error acoustoelectric transducers 2206 and 2208 and electroacoustic transducers 2210 and 2212 are coupled with head-mounted device 2214. Reference acoustoelectric transducers 2204 and 2238 are located external to head-mounted device 2214 or externally mounted thereon, but acoustically insulated or remote from error acoustoelectric transducers 2206 and 2208 and electroacoustic transducers 2210 and 2212.

Head-mounted device 2214 is similar to head-mounted device 2150, as described herein above in connection with FIG. 7C.

Error acoustoelectric transducer 2206, electroacoustic transducer 2210 and reference acoustoelectric transducer 2238 are located adjacent to the right ear (not shown) of the user (not shown). Error acoustoelectric transducer 2208, electroacoustic transducer 2212 and reference acoustoelectric transducer 2204 are located adjacent to the left ear (not shown) of the user. Error acoustoelectric transducer 2206 detects the sound emitted by electroacoustic transducer 2210, the ambient noise at a reduced SPL, and substantially none of the sound emitted by electroacoustic transducer 2212. Error acoustoelectric transducer 2208 detects the sound emitted by electroacoustic transducer 2212, the ambient noise at a reduced SPL, and substantially none of the sound emitted by electroacoustic transducer 2210. Reference acoustoelectric transducers 2204 and 2238 detect the ambient noise and substantially none of the sound which is emitted by electroacoustic transducers 2210 and 2212.

ANR controller 2202 is coupled with reference acoustoelectric transducers 2204 and 2238, error acoustoelectric transducers 2206 and 2208 and with electroacoustic transducers 2210 and 2212. ANR controller 2202 receives a signal 2216 from reference acoustoelectric transducer 2204, a signal 2240 from reference acoustoelectric transducer 2238, a signal 2218 from error acoustoelectric transducer 2206, a signal 2220 from error acoustoelectric transducer 2208 and a signal 2222 from a sound source (not shown). Signals 2216 and 2238 are similar to signal 2188 (FIG. 8A). Each of signals 2218 and 2220 is similar to signal 2190. Each of signals 2224 and 2226 is similar to signal 2200 and signal 2222 is similar to signal 2192.

Signal 2222 can be either a single channel sound signal (i.e., monaural), or a multi-channel sound signal, such as stereophonic, quadraphonic, surround sound, and the like. ANR controller 2202 produces a signal 2224 for electroacoustic transducer 2210 and a signal 2226 for electroacoustic transducer 2212. ANR controller 2202 produces signals 2224 and 2226, by processing signals 2216, 2238, 2218, 2220 and 2222, in the same manner that ANR controller 2172 (FIG. 8A) processes signals 2188, 2192 and the signal received from error acoustoelectric transducer 2176, for producing signal 2200.

Each of electroacoustic transducers 2210 and 2212 produces a sound which includes the sound respective of signal 2222 and an anti-phase of the ambient noise at a reduced SPL. Since the anti-phase of the ambient noise substantially cancels the actual ambient noise at the quiet zone of the respective ear, the user hears mostly a sound corresponding to signal 2222 and substantially none of the ambient noise. If signal 2222 is a single channel sound signal, then each of signals 2224 and 2226 is produced according to signal 2222 and the anti-phase of the ambient noise at a reduced SPL. Hence, the user can hear a monaural sound.

If signal 2222 is stereo, then signals 2224 and 2226 are produced for example, according to the right and the left channel of signal 2222, respectively, and according to the anti-phase of the ambient noise at a reduced SPL. Hence, the user can hear the sound which corresponds to signal 2222 in stereo, without hearing the ambient noise.

Alternatively, more than two electroacoustic transducers and respective acoustoelectric transducers can be coupled to the ANR controller. In this case, if signal 2222 is multi-channel, then the user can hear the sound which corresponds to signal 2222 in multi-dimension, without hearing the ambient noise.

With further reference to FIG. 8A, the electroacoustic transducers are coupled with the primary summing element and the acoustoelectric transducers are coupled with the digital ANR controller. The digital ANR controller produces a signal for each one of the electroacoustic transducers, by processing the desired sound signal, the noise signal and the error signal received from the respective acoustoelectric transducer.

With further reference to FIG. 8B, the electroacoustic transducers are coupled with the primary summing element and the acoustoelectric transducers are coupled with the analog portion of the analog ANR controller. According to the desired sound signal, the digital portion estimates in real time, the SPL of the desired sound which each of the electroacoustic transducers produces and the digital portion produces these estimated desired sound signals. The digital portion sends the estimated desired sound signal respective of each of the electroacoustic transducers, to the secondary summing element.

The analog portion produces an anti-phase signal respective of each of the signals received from the acoustoelectric transducers and sends these anti-phase signals to the secondary summing element. The secondary summing element produces a signal respective of each of the electroacoustic transducers, by adding the respective anti-phase signal received from the analog portion and the respective signal received from the digital portion. The primary summing element produces a signal for each of the electroacoustic transducers, by adding the respective signal received from the digital ANR controller and the respective signal received from the secondary summing element.

Alternatively, the noise-canceling system of FIG. 8A, receives no signals respective of the desired sound and produces only an anti-phase noise sound, according to noise detected by a reference acoustoelectric transducer located away from the ear of the user. In this case, the noise-canceling system includes a digital ANR controller similar to digital ANR controller 2180, a reference acoustoelectric transducer and an electroacoustic transducer. The digital ANR controller is coupled with the reference acoustoelectric transducer and the electroacoustic transducer. The reference acoustoelectric transducer is located in a noisy environment away from the ear of the user and the electroacoustic transducer is located close to the ear of the user.

Additionally, the noise-canceling system includes an error acoustoelectric transducer coupled with the digital ANR controller. The error acoustoelectric transducer is located close to the ear of the user and sends an error signal to the digital ANR controller, respective of the sound emitted by the electroacoustic transducer. The digital ANR controller processes the error signal and the reference noise signal and makes adjustments to the anti-phase noise signal which sends to the electroacoustic transducer.

Additionally, the noise-canceling system includes an analog ANR controller similar to analog ANR controller 2182 and a summing element. The analog ANR controller is coupled with the error acoustoelectric transducer and the summing element, and the summing element is coupled with the digital ANR controller and the electroacoustic transducer. The analog ANR controller produces an anti-phase noise signal approximately 180 degrees out-of-phase relative to the error signal. The summing element produces a signal for the electroacoustic transducer, by adding the anti-phase noise signals produced by the digital ANR controller and the analog ANR controller.

Alternatively, the error acoustoelectric transducer can be coupled only with the analog active noise reduction controller and not with the digital active noise reduction controller. In this case, only the analog active noise reduction controller makes adjustments to the anti-phase noise signal which the digital active noise reduction controller sends to the electroacoustic transducer.

According to another aspect of the disclosed technique, a noise reduction system produces a noise-free sound close to the ear of a user, and a noise-free signal corresponding to the voice of the user. The system produces a noise-canceling sound or a noise canceling signal, according to a noise reference signal.

Figure 9A:
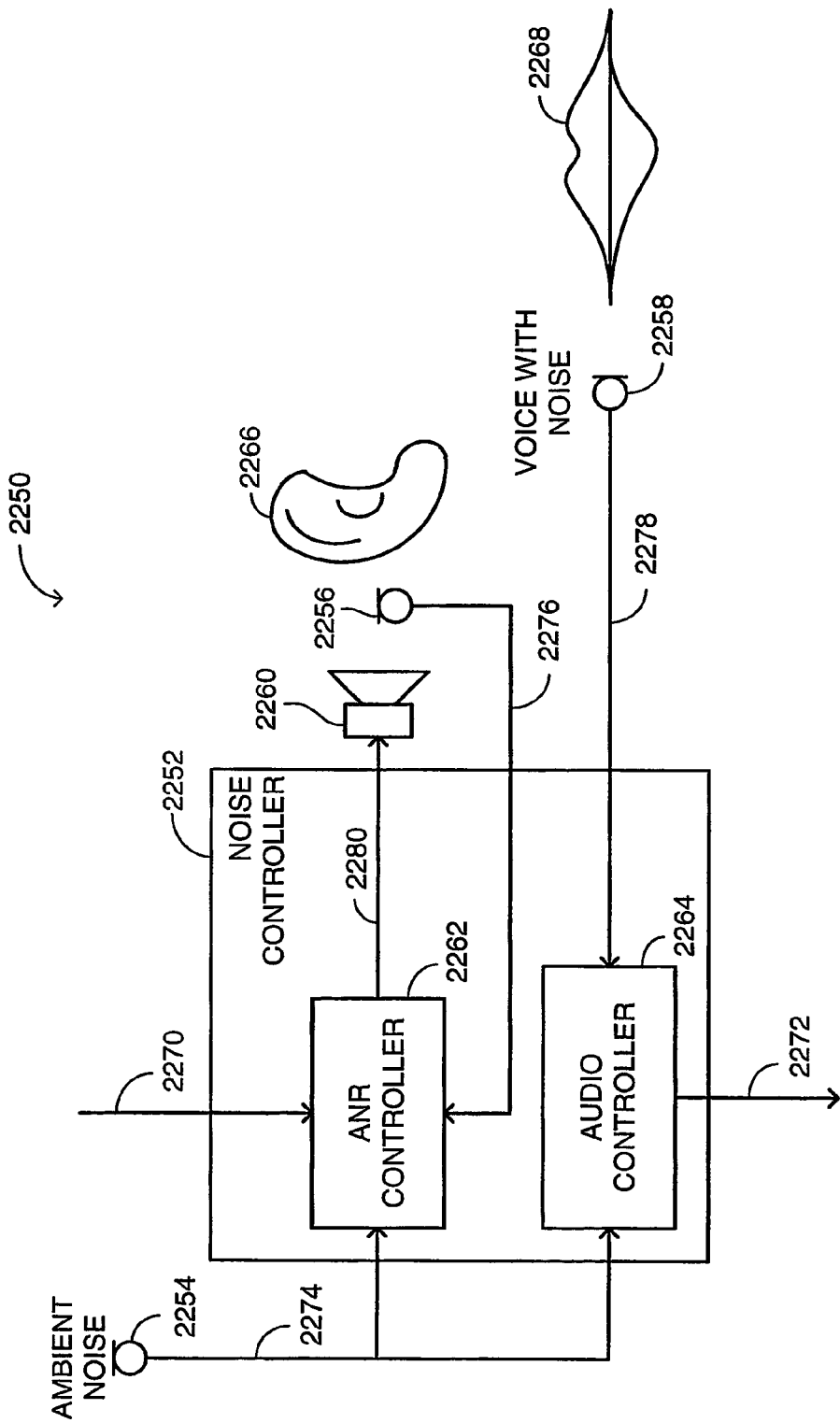
FIG. 9A is a schematic illustration of a noise reduction system, constructed and operative in accordance with a further embodiment of the disclosed technique.
Figure 9B:
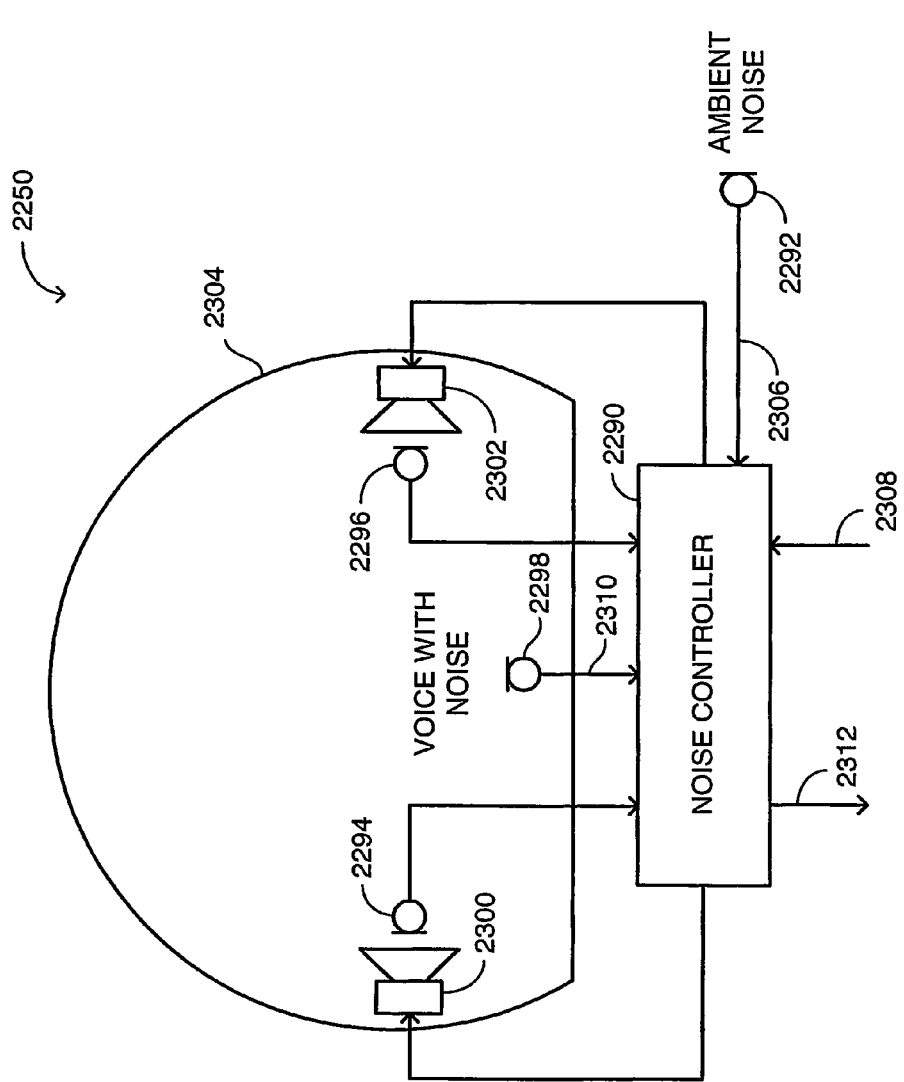
FIG. 9B is a schematic illustration of the system of FIG. 9A, incorporated with a head-mounted device.

Reference is now made to FIGS. 9A and 9B. FIG. 9A is a schematic illustration of a noise reduction system, generally referenced 2250, constructed and operative in accordance with a further embodiment of the disclosed technique. FIG.

9B is a schematic illustration of the system of FIG. 9A, incorporated with a head-mounted device, generally referenced 2304.

With reference to FIG. 9A, system 2250 includes a noise controller 2252, a reference acoustoelectric transducer 2254, an error acoustoelectric transducer 2256, a voice acoustoelectric transducer 2258 and an electroacoustic transducer 2260. Noise controller 2252 includes an ANR controller 2262 and an audio controller 2264. ANR controller 2262 is similar to ANR controller 2172 (FIG. 8A) and audio controller 2264 is similar to audio controller 2106 (FIG. 7A).

ANR controller 2262 is coupled with reference acoustoelectric transducer 2254, error acoustoelectric transducer 2256 and with electroacoustic transducer 2260. Audio controller 2264 is coupled with reference acoustoelectric transducer 2254 and voice acoustoelectric transducer 2258.

Electroacoustic transducer 2260 and error acoustoelectric transducer 2256 are located close to an ear 2266 of a user (not shown) and voice acoustoelectric transducer 2258 is located close to a mouth 2268 of the user. Sound absorbing material (not shown) can be placed between electroacoustic transducer 2260, error acoustoelectric transducer 2256 and voice acoustoelectric transducer 2258 on one side and reference acoustoelectric transducer 2254, on the other. Such a sound absorbing material can be in the form of an earmuff, and the like, which encloses electroacoustic transducer 2260 and error acoustoelectric transducer 2256. In addition, sound absorbing material acoustically insulates voice acoustoelectric transducer 2258 and mouth 2268 from electroacoustic transducer 2260, error acoustoelectric transducer 2256 and ear 2266. Thus, error acoustoelectric transducer 2256 does not detect the voice of the user and voice acoustoelectric transducer 2258 does not detect sound emitted by electroacoustic transducer 2260.

Thus, reference acoustoelectric transducer 2254 detects the ambient noise and substantially none of the voice of the user or the sound emitted by electroacoustic transducer 2260. Reference acoustoelectric transducer 2254 sends a signal 2274 respective of the detected ambient noise, to ANR controller 2262 and to audio controller 2264. Error acoustoelectric transducer 2256 detects the sound emitted by electroacoustic transducer 2260 and the ambient noise at a reduced SPL and sends a respective signal 2276 to ANR controller 2262. Voice acoustoelectric transducer 2258 detects the voice of the user from mouth 2268 and the ambient noise at a reduced SPL and sends a respective signal 2278 to audio controller 2264.

System 2250 can be divided to a hearing portion and a speaking portion. The hearing portion consists of ANR controller 2262, reference acoustoelectric transducer 2254, error acoustoelectric transducer 2256 and electroacoustic transducer 2260. The speaking portion consists of audio controller 2264 and reference acoustoelectric transducer 2254 and voice acoustoelectric transducer 2258. Reference acoustoelectric transducer 2254 is common to the hearing portion and the speaking portion.

The hearing portion of system 2250 is similar to system 2170, as described herein above in connection with FIG. 8A. ANR controller 2262 determines an anti-phase to signal 2274 at a reduced SPL (i.e., the ambient noise at the quiet zone of ear 2266). ANR controller 2262 produces a signal 2280 respective of the desired sound, according to a signal 2270 from a sound source (not shown) and the anti-phase of signal 2274 at the reduced SPL. Electroacoustic transducer 2260 produces a sound according to signal 2280. Thus, the user hears the desired sound and substantially none of the ambient noise. ANR controller 2262 makes adjustments to signal 2280, according to signal 2276.

Alternatively, the active noise reduction controller does not receive any signal respective of the desired sound. In this case, the active noise reduction controller sends a noise-canceling signal to the electroacoustic transducer and a different electroacoustic transducer produces the desired sound according to the signal respective of the desired sound. Further alternatively, the desired sound reaches the ear from a sound source other than an electroacoustic transducer, such as the voice of another person, mechanical voice, machine generated sound, and the like.

Alternatively, the acoustoelectric transducer can be eliminated from the noise reduction system. In this case, the active noise reduction controller produces a noise-canceling signal only according to the reference noise signal, and without any error signal as feedback.

The speaking portion of system 2250 is similar to system 2100, as described herein above in connection with FIG. 7A. Thus, audio controller 2264 produces a noise-free voice signal 2272.

With reference to FIG. 9B, system 2250 includes a noise controller 2290, a reference acoustoelectric transducer 2292, error acoustoelectric transducers 2294 and 2296, a voice acoustoelectric transducer 2298 and electroacoustic transducers 2300 and 2302. Noise reduction system 2290 is similar to noise reduction system 2252 (FIG. 9A). Noise controller 2290 is coupled with reference acoustoelectric transducer 2292, error acoustoelectric transducers 2294 and 2296, voice acoustoelectric transducer 2298 and with electroacoustic transducers 2300 and 2302.

Error acoustoelectric transducers 2294 and 2296, voice acoustoelectric transducer 2298 and electroacoustic transducers 2300 and 2302 are located within head-mounted device 2304. Reference acoustoelectric transducer 2292 is located external to head-mounted device 2304 or externally mounted thereon, but acoustically insulated or remote the mouth of the user and from error acoustoelectric transducers 2294 and 2296 and electroacoustic transducers 2300 and 2302. Error acoustoelectric transducer 2294 and electroacoustic transducer 2300 are located at a right ear (not shown) of a user (not shown). Error acoustoelectric transducer 2296 and electroacoustic transducer 2302 are located at a left ear (not shown) of the user. Voice acoustoelectric transducer 2298 is located at a mouth (not shown) of the user.

Noise controller 2290 receives a signal 2306 from reference acoustoelectric transducer 2292, respective of the ambient noise and a signal 2308 from a sound source (not shown), respective of a desired sound. Noise controller 2290 receives a signal 2310 from voice acoustoelectric transducer 2298 respective of the voice of the user and the ambient noise at a reduced SPL.

Noise controller 2290, reference acoustoelectric transducer 2292, error acoustoelectric transducers 2294 and 2296 and electroacoustic transducers 2300 and 2302, form the hearing portion of system 2250, as described herein above in connection with FIG. 9A. Electroacoustic transducers 2300 and 2302 produce sounds which include a desired sound carried by a signal 2308 and another sound at anti-phase and at a reduced SPL relative to signal 2306. Thus, the user hears the desired sound and substantially none of the ambient noise.

Noise controller 2290, reference acoustoelectric transducer 2292 and voice acoustoelectric transducer 2298, form the speaking portion of system 2250, as described herein above in connection with FIG. 8A. Thus, noise controller 2290 produces a noise-free signal 2312 of the voice of the user, according to signals 2306 and 2310.

Alternatively, system 2250 can include two reference acoustoelectric transducers similar to reference acoustoelectric transducer 2292 and coupled with noise controller 2290. Each of these reference acoustoelectric transducers is located external to head-mounted device 2304, in a manner similar to that described herein above in connection with reference acoustoelectric transducers 2204 and 2238 (FIG. 8C).

According to another aspect of the disclosed technique, an active noise reduction system includes a digital feedforward portion which receives a reference noise signal and a digital/analog feedback portion, which receives a signal respective of a sound produced by the system at the quiet zone of the ear. The feedforward portion produces a signal respective of a desired sound, and an anti-phase of the background noise according to a desired sound signal and the feedback from the feedback portion.

Figure 10A:
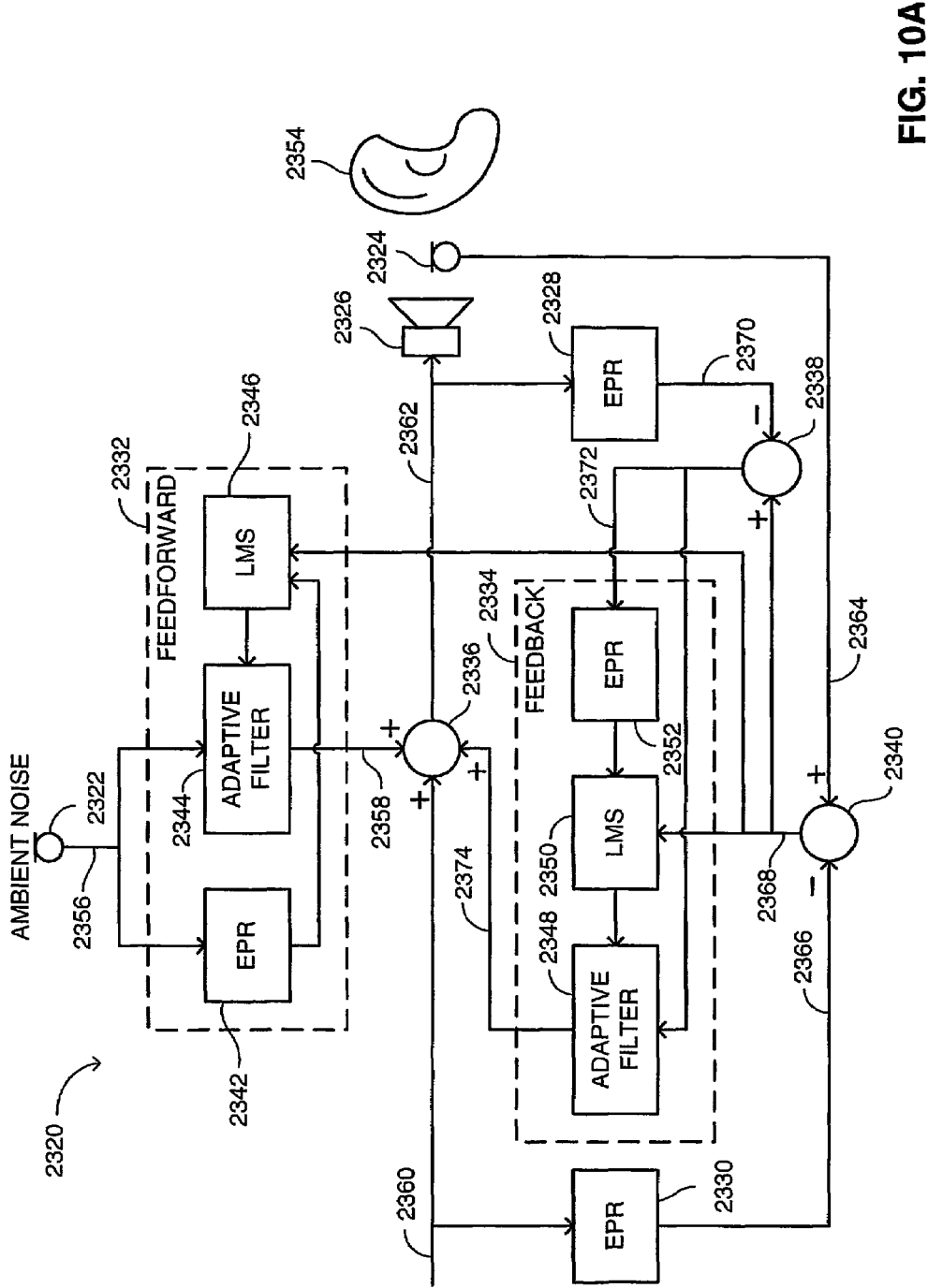
FIG. 10A is a schematic illustration of a digital noise reduction system, constructed and operative in accordance with another embodiment of the disclosed technique.
Figure 10B:
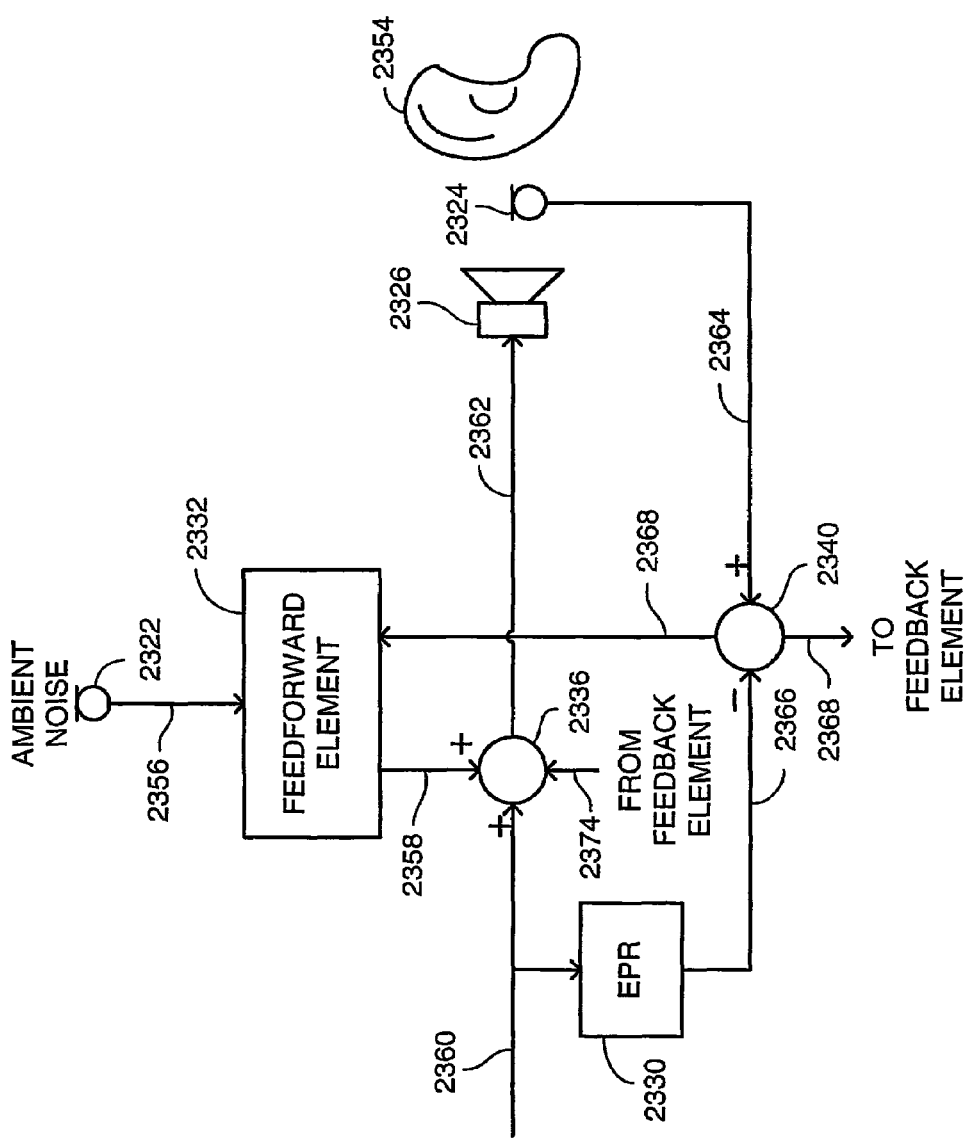
FIG. 10B is a schematic illustration of the feedforward portion of the system of FIG. 10A.
Figure 10C:
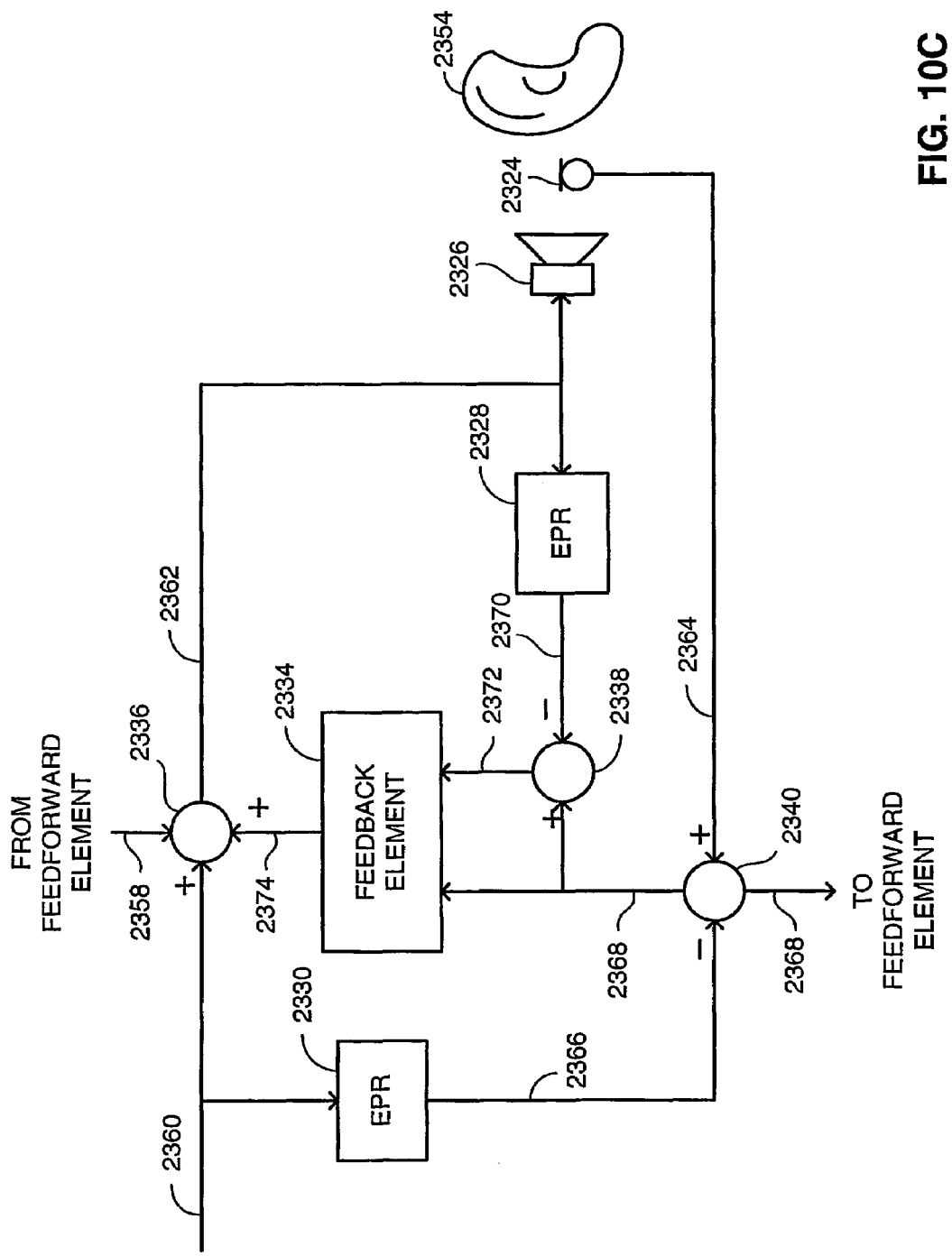
FIG. 10C is a schematic illustration of the feedback portion of the system of FIG. 10A.

Reference is now made to FIGS. 10A, 10B and 10C. FIG. 10A is a schematic illustration of a digital noise reduction system, generally referenced 2320, constructed and operative in accordance with another embodiment of the disclosed technique. FIG. 10B is a schematic illustration of the feedforward portion of the system of FIG. 10A. FIG. 10C is a schematic illustration of the feedback portion of the system of FIG. 10A. It is noted that system 2320 is a detail illustration of a digital ANR controller such as digital ANR controller 2180 (FIG. 8A).

With reference to FIG. 10A, system 2320 includes a reference acoustoelectric transducer 2322, an error acoustoelectric transducer 2324, an electroacoustic transducer 2326, estimated plant response (EPR) elements 2328 and 2330, a feedforward element 2332, a feedback element 2334, and summing elements 2336, 2338 and 2340. Feedforward element 2332, feedback element 2334, EPR elements 2328 and 2330 and summing elements 2336, 2338 and 2340 together, are equivalent to digital ANR controller 2180 (FIG. 8A). Feedforward element 2332 includes an EPR element 2342, an adaptive filter 2344 and a least mean square (LMS) element 2346. Feedback element 2334 includes an adaptive filter 2348, an LMS element 2350 and an EPR element 2352.

An EPR element is an element which estimates the ratio of two sound signals according to predetermined information, applies this ratio to an input signal to the EPR element and produces an output signal, accordingly. One of these two sound signals can be for example, respective of a desired sound which is to be produced by an electroacoustic transducer, while the other sound signal is respective of the sound which the electroacoustic transducer actually produces. An LMS element is an element which updates the response of the adaptive filter, according to an LMS adaptive filter method. The combination of an LMS element and an EPR element is equivalent to a Filter X LMS (FXLMS) element, as known in the art.

Electroacoustic transducer 2326 and error acoustoelectric transducer 2324 are located close to an ear 2354 of a user (not shown). A sound absorbing element (not shown) is located between electroacoustic transducer 2326 and error acoustoelectric transducer 2324 on one side and reference acoustoelectric transducer 2322 on the other. Thus, reference acoustoelectric transducer 2322 detects the ambient noise and none of the sound emitted by electroacoustic transducer 2326. Error acoustoelectric transducer 2324 detects the sound emitted by electroacoustic transducer 2326 and the ambient noise at a reduced SPL. Each of adaptive filters 2344 and 2348 is similar in principle to adaptive filter 2118, as described herein above in connection with FIG. 7B.

With reference to FIG. 10B, the digital feedforward portion of system 2320 includes reference acoustoelectric transducer 2322, error acoustoelectric transducer 2324, electroacoustic transducer 2326, feedforward element 2332, summing elements 2336 and 2340 and EPR element 2330. Summing element 2336 is coupled with feedforward element 2332, electroacoustic transducer 2326 and with EPR element 2330. Summing element 2340 is coupled with feedforward element 2332, error acoustoelectric transducer 2324 and with EPR element 2330. Reference acoustoelectric transducer 2322 is coupled with feedforward element 2332.

Reference acoustoelectric transducer 2322 detects the ambient noise and sends a respective signal 2356 to feedforward element 2332. Feedforward element 2332 determines the reduced SPL of the ambient noise at the quiet zone of ear 2354. It is noted that the SPL reduction is generally sensitive to the frequency of signal 2356. Feedforward element 2332, determines a signal 2358 which is at anti-phase to the ambient noise signal 2356 at the reduced SPL and sends signal 2358 to summing element 2336. Summing element 2336 adds signal 2358 to a signal 2360, and produces a signal 2362 respective of the result of addition. Signal 2360 is respective of a desired sound from a sound source (not shown). Thus, signal 2362 includes the desired sound signal and the anti-phase of the ambient noise at the reduced SPL. Summing element 2336 sends signal 2362 to electroacoustic transducer 2326.

Electroacoustic transducer 2326 produces the desired sound together with a noise-canceling sound, according to signal 2362. Since the anti-phase of the ambient noise at the quiet zone of ear 2354 cancels the ambient noise at this quiet zone, the user hears the desired sound and substantially none of the ambient noise.

Error acoustoelectric transducer 2324 detects the sound emitted by electroacoustic transducer 2326 and sends a signal 2364 respective of the detected sound, to summing element 2340. EPR element 2330 receives signal 2360, determines a signal 2366 which is an estimate of the desired sound emitted by electroacoustic transducer 2326 at the quiet zone of ear 2354, and sends signal 2366 to summing element 2340. Summing element 2340 produces an error signal 2368, by comparing signals 2366 and 2364 (i.e., by subtracting signal 2366 from signal 2364) and sends error signal 2368 to feedforward element 2332 and to feedback element 2334. Error signal 2368 represents the difference between the desired sound as received from the sound source and the noise-cancelled desired sound emitted at the quiet zone of ear 2354. Feedforward element 2332 makes a correction to signal 2358 according to error signal 2368 and sends signal 2358 to summing element 2336.

With reference to FIG. 10C, the feedback portion of system 2320 includes electroacoustic transducer 2326, error acoustoelectric transducer 2324, feedback element 2334, EPR elements 2328 and 2330 and summing elements 2336, 2338 and 2340. Summing element 2336 is coupled with feedback element 2334, EPR elements 2328 and 2330 and with electroacoustic transducer 2326. Summing element 2338 is coupled with feedback element 2334, EPR element 2328 and with summing element 2340. Summing element 2340 is coupled with feedback element 2334, EPR element 2330, summing element 2338 and with error acoustoelectric transducer 2324.

Summing element 2336 produces signal 2362 by adding signal 2358, which summing element 2336 receives from feedforward element 2332, to signal 2360, which summing element 2336 receives from the sound source. Thus, as described herein above in connection with FIG. 10B, signal 2362 includes the desired sound signal and the anti-phase of the ambient noise at the reduced SPL. Summing element 2336 sends signal 2362 to electroacoustic transducer 2326 and to EPR element 2328.

Electroacoustic transducer 2326 produces the desired sound together with a noise-canceling sound, according to signal 2362. Since the anti-phase of the ambient noise at the quiet zone of ear 2354 cancels the ambient noise at this quiet zone, the user hears the desired sound and substantially none of the ambient noise.

Error acoustoelectric transducer 2324 detects the sound emitted by electroacoustic transducer 2326 and sends a signal 2364 respective of the detected sound, to summing element 2340. EPR element 2330 receives signal 2360, determines a signal 2366 which is an estimate of the desired sound emitted at the quiet zone of ear 2354 and sends signal 2366 to summing element 2340. Summing element 2340 produces an error signal 2368, by comparing signals 2366 and 2364 (i.e., by subtracting signal 2366 from signal 2364) and sends error signal 2368 to feedback element 2334, to summing element 2338 and to feedforward element 2332. Error signal 2368 represents the difference between the desired sound as received from the sound source and the noise-cancelled desired sound emitted at the quiet zone of ear 2354.

EPR element 2328 produces a signal 2370, which is an estimate of a sound emitted by electroacoustic transducer 2326 and as detected by error acoustoelectric transducer 2324. EPR element 2328 produces signal 2370 according to signal 2362. Summing element 2338 produces an error signal 2372, by comparing signals 2368 and 2370 (i.e., by subtracting signal 2370 from signal 2368) and sends error signal 2372 to feedback element 2334. Feedback element 2334 produces an error signal 2374, by processing error signals 2368 and 2372 and sends error signal 2374 to summing element 2336. Summing element 2336 produces signal 2362 by adding error signal 2374 to signal 2358 (for the ambient noise canceling signal) and signal 2360 (for the sound source signal).

It is noted that the noise reduction system can include a plurality of electroacoustic transducers and a respective acoustoelectric transducer for each of the electroacoustic transducers. In this case, the system receives the desired sound in a plurality of channels and the user can hear the desired sound in multiple dimensions.

It is further noted that system 2320 produces an anti-phase noise signal according to a signal received from an acoustoelectric transducer (i.e., reference acoustoelectric transducer 2322), which is not affected by the sound emitted by the electroacoustic transducer (i.e., electroacoustic transducer 2326) and adapts this anti-phase noise signal according to a signal respective of the sound emitted by this electroacoustic transducer (i.e., signal 2364). The operation of the feedforward portion and the feedback portion of system 2320 are similar. The difference between the two portions is that the input to the feedforward portion is the ambient noise devoid of any sound emitted by the electroacoustic transducer, while the input to the feedback portion is the sound which is actually emitted by this electroacoustic transducer.

Figure 11A:
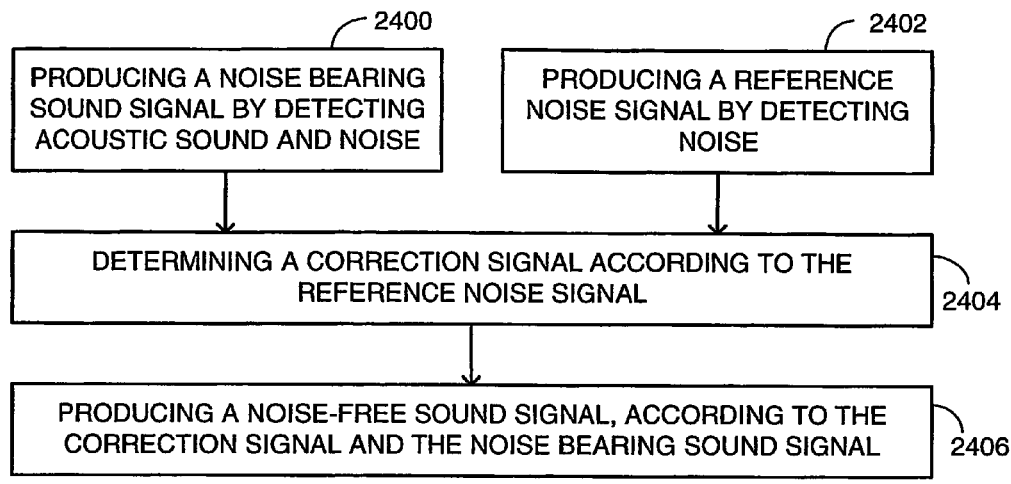
FIG. 11A is a schematic illustration of a method for operating the system of FIG. 7A, operative in accordance with a further embodiment of the disclosed technique.

Reference is now made to FIG. 11A, which is a schematic illustration of a method for operating the system of FIG. 7A, operative in accordance with a further embodiment of the disclosed technique. In procedure 2400 a noise bearing sound signal is produced, by detecting acoustic sound and noise. With reference to FIG. 7A, acoustoelectric transducer 2102 detects acoustic sound and noise and sends signal 2108 respective of this detected acoustic sound and noise, to audio controller 2106.

In procedure 2402, a reference noise signal is produced by detecting noise. With reference to FIG. 7A, acoustoelectric transducer 2104 detects the noise and sends signal 2110 respective of this noise, to audio controller 2106.

In procedure 2404, a correction signal is determined according to the reference noise signal. With reference to FIG. 7A, audio controller 2106 determines a reduced SPL for signal 2110.

In procedure 2406, a noise-free signal is produced according to the correction signal and the noise bearing sound signal. With reference to FIG. 7A, audio controller 2106 produces signal 2112 by subtracting signal 2110 at the reduced SPL, from signal 2108.

Figure 11B:
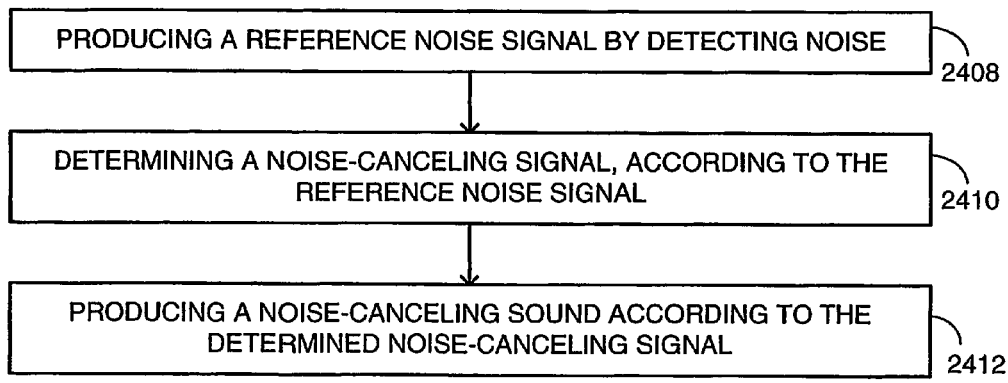
FIG. 11B is a schematic illustration of a method for operating a noise-canceling system, operative in accordance with another embodiment of the disclosed technique.

Reference is now made to FIG. 11B, which is a schematic illustration of a method for operating a noise-canceling system, operative in accordance with another embodiment of the disclosed technique. This noise-canceling system employs a reference acoustoelectric transducer to detect the ambient noise, wherein the reference acoustoelectric transducer is located away from the ear of the user. It is noted that the procedure of detecting the ambient noise by this reference acoustoelectric transducer, is common to both of the methods according to FIGS. 11A and 11B. It is further noted that the methods according to FIGS. 11A and 11B, can be combined into a single method which is herein below described in connection with FIG. 12.

With reference to FIG. 11B, in procedure 2408, which is similar to procedure 2402, reference noise signal is produced by detecting noise. The reference acoustoelectric transducer produces a reference noise signal, by detecting the ambient noise. In procedure 2410, a noise-canceling signal is determined, by processing the reference noise signal. An ANR controller similar to ANR controller 2172 (FIG. 8A) determines a noise-canceling signal by processing the reference noise signal. The ANR controller determines a reduced SPL for the reference noise signal, corresponding to the SPL of the ambient noise at a location close to the ear of the user. Furthermore, the ANR controller determines a noise-canceling signal, which is approximately 180 degrees out-of-phase relative to the reference noise signal. An electroacoustic transducer similar to electroacoustic transducer 2178 (FIG. 8A), produces a noise-canceling sound according to the determined noise-canceling signal (procedure 2412).

Figure 12:
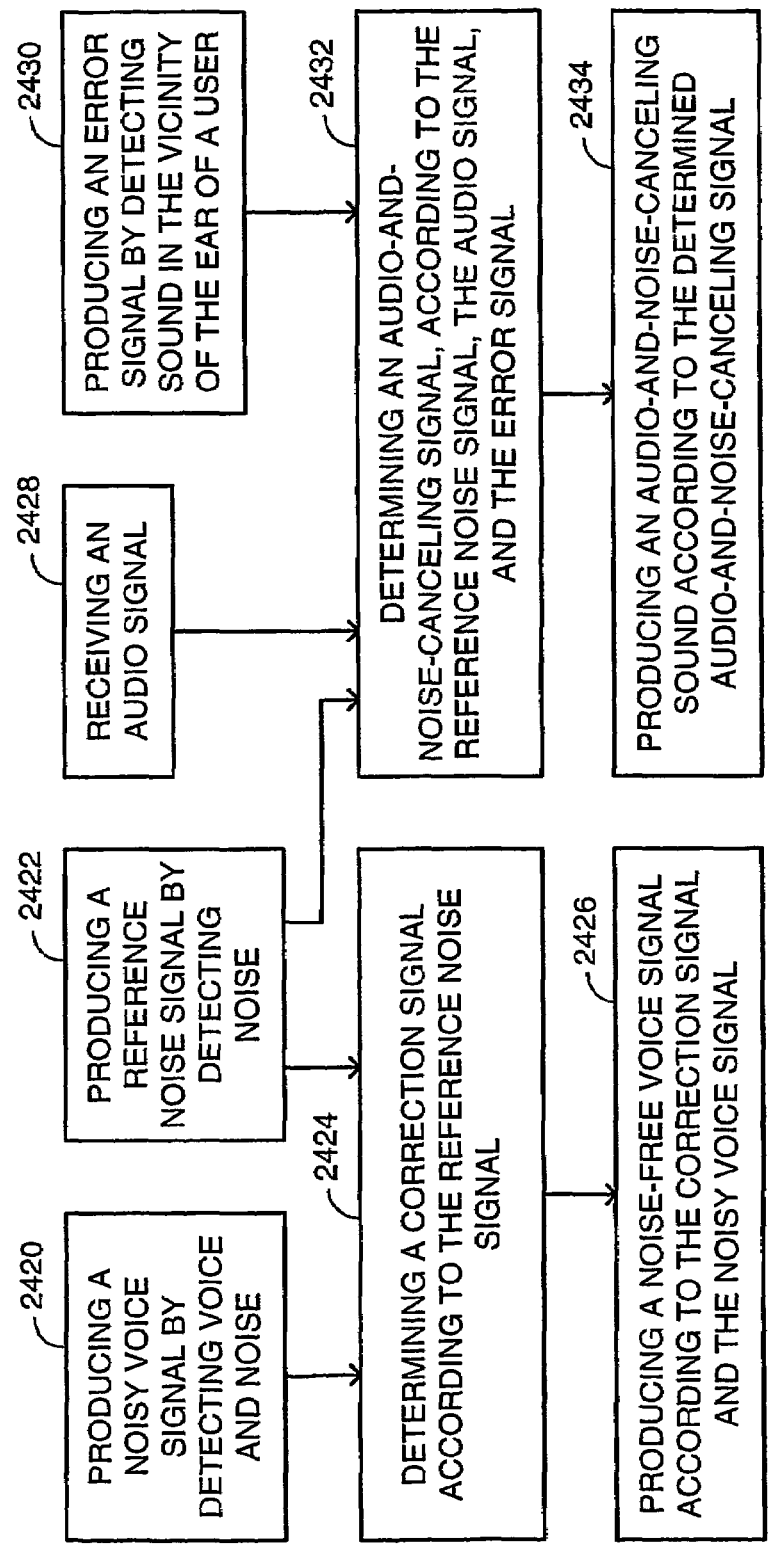
FIG. 12 is a schematic illustration of a method for operating the system of FIG. 9A, operative in accordance with a further embodiment of the disclosed technique.

Reference is now made to FIG. 12, which is a schematic illustration of a method for operating the system of FIG. 9A, operative in accordance with a further embodiment of the disclosed technique. In procedure 2420, a noisy voice signal is produced by detecting voice and noise. With reference to FIG. 9A, voice acoustoelectric transducer 2258 detects the voice of the user from mouth 2268, together with the ambient noise at a reduced SPL and sends signal 2278 to audio controller 2264.

In procedure 2422, a reference noise signal is produced by detecting noise. With reference to FIG. 9A, reference acoustoelectric transducer 2254 detects the ambient noise and sends signal 2274 to audio controller 2264.

In procedure 2424, a correction signal is determined according to the reference noise signal. With reference to FIG. 9A, audio controller 2264 determines a reduced SPL for signal 2274.

In procedure 2426, a noise-free voice signal is produced according to the correction signal and the noisy voice signal. With reference to FIG. 9A, audio controller 2264 produces signal 2272 by subtracting signal 2274 at the reduced SPL, from signal 2278.

In procedure 2428, an audio signal is received. With reference to FIG. 9A, ANR controller 2262 receives signal 2270 from the sound source. In procedure 2430, an error signal is produced, by detecting sound in the vicinity of the ear. With reference to FIG. 9A, error acoustoelectric transducer 2256 detects the sound close to ear 2266 and sends signal 2276 respective of this detected sound, to ANR controller 2262.

In procedure 2432, an audio-and-noise-canceling signal is determined, according to the reference noise signal, the audio signal and the error signal. With reference to FIG. 9A, ANR controller 2262 determines signal 2280, by processing signals 2270, 2274 and 2276.

In procedure 2434, an audio-and-noise-canceling sound is produced according to the determined audio-and-noise-canceling signal. With reference to FIG. 9A, electroacoustic transducer 2260 produces sound according to signal 2280.

Figure 13:
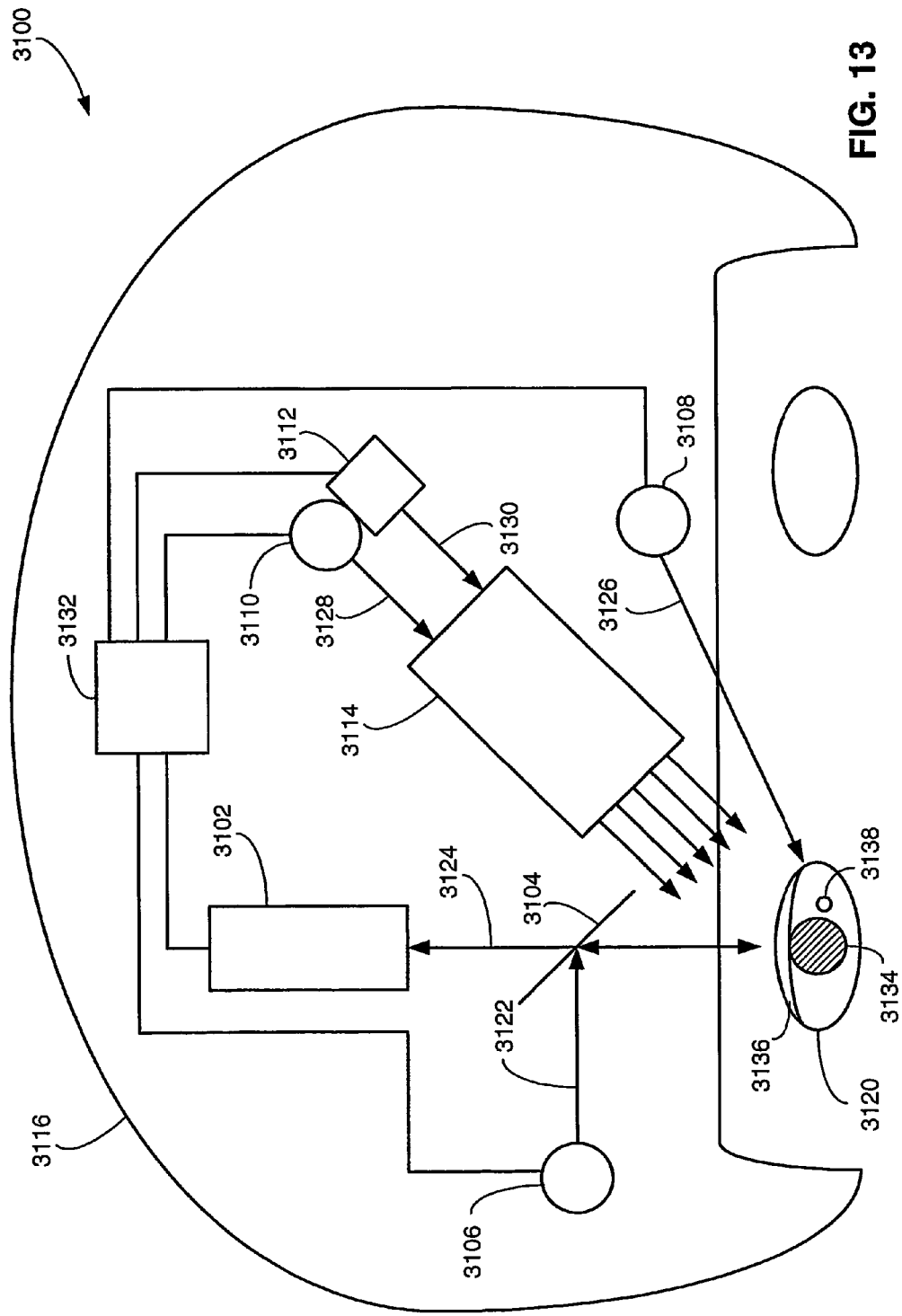
FIG. 13 is a schematic front-view illustration of a system, constructed and operative in accordance with another embodiment of the disclosed technique.

Following is a description of eye tracker 138. Reference is now made to FIG. 13, which is a schematic front-view illustration of a system 3100, constructed and operative in accordance with another embodiment of the disclosed technique, which displays images to an eye 3120 of a user and which further tracks eye 3120. A pupil 3134 is located within eye 3120. System 3100 (e.g., eye tracker 3534 illustrated herein below in FIG. 18) includes a camera module 3102, an imaging processor 3132, a beam splitter 3104, light sources 3106, 3108 and 3110, a display module 3112 and a collimating optical assembly 3114, all mounted on a helmet 3116.

Beam splitter 3104 transmits a portion of light incident there-upon, and reflects another portion of the incident light. For example, beam splitter 3104 may be a polarizing beam splitter (PBS). Light sources 3106, 3108 and 3110 emit non-visible light. For example, each of light sources 3106, 3108 and 3110 may emit infra-red (1R) light or near-infra-red (NIR) light. Light sources 3106, 3108 and 3110 may be light-emitting diodes (LEDs), NIR-filtered broadband light sources, and the like.

Display module 3112 produces an image to be viewed by the user (e.g., display module 3112 may include a cathode ray tube (CRT), a rear illuminated liquid crystal display (LCD), or an organic light emitted diode (OLED)). Light source 3110 and display 3112 are coupled with collimating optical assembly 3114.

Camera module 3102 receives an image, which passes through beam splitter 3104. Camera module 3102 includes an image sensor such as a CCD, CMOS, and the like, for detecting images.

Imaging processor 3132 is coupled with camera module 3102, display module 3112 and with light sources 3106, 3108 and 3110. In the present example, imaging processor 3132 is mounted on the helmet 3116. It is noted, however, that the processor may generally be on-helmet, off-helmet, or partially on-helmet (e.g., when the processor consists of a chipset).

Imaging processor 3132 receives image data from camera 3102, and determines the visual line of sight of the eye 3120 according to these image data. Imaging processor 3132 may further record images, communicate with an external source (e.g., a user interface, an ambient light detector), and control the display 3112 and the light sources 3106, 3108 and 3110.

In the present example, light sources 3106, 3108 and 3110 emit light substantially in the same predetermined range of wavelengths. The camera module 3102 further includes a filter (not shown), which admits light in the same range of wavelengths as light sources 3106, 3108 and 3110, and which filters out light which is outside of this range. It is noted, however, that the light sources may generally emit light having different ranges of wavelengths, and the camera may have various detection spectrums. The general requirement in order for the camera to detect the reflections of light originating from light sources 3106, 3108 and 3110, is that the combined emission spectrum of light sources 3106, 3108 and 3110, has a substantial overlap with detection range of camera module 3102.

Light source 3106 emits a non-visible illuminating light beam 3122 towards beam splitter 3104. Beam splitter 3104 partially reflects light beam 3122 toward the eye 3120, thereby illuminating the eye 3120. Illuminating light beam 3122 is concentric with the optical axis of the camera module 3102. A portion of illuminating light beam 3122 is reflected back from the pupil 3134 of the eye 3120, as a light beam 3124, to the image sensor of camera module 3102. Thus, pupil 3134 appears as a bright spot in the image detected by camera module 3102. Accordingly, imaging processor 3132 determines the position of the center of pupil 3134.

According to another embodiment of the disclosed technique, imaging processor 3132 is further coupled with an ambient light detector (not shown), which can be on-helmet or off-helmet. It is noted that under certain conditions, camera module 3102 may not be able to detect pupil 3134 as a bright spot. For example, ambient light in the system 3100 may reach high levels of intensity. Since viewing the pupil 3134 requires a minimal contrast level between the pupil and its surrounding non-transparent tissue (i.e., the iris), the intensity level of light beam 3122 must also increase as the intensity of the ambient light increases. However, the intensity of light beam 3122 may be limited by a safety threshold.

If the intensity of light beam 3122, which would be required for viewing the pupil 3134 as a bright spot, is beyond the safety threshold, the ambient light detector can signal to imaging processor 3132 accordingly. Imaging processor instructs light sources 3106, 3108 and 3110 to illuminate the eye differently. For example, light source 3106 may significantly reduce the intensity of light beam 3122. Thus, pupil 3134 shall appear in the image detected by camera module 3102, as a dark spot. Imaging processor 3132 then detects pupil 3134 according to different criteria. For example, the criterion for detecting a "bright pupil" may select image portions which are beyond a certain brightness threshold, while the criterion for detecting a "dark pupil" may select image portions beneath a "darkness" threshold.

Light source 3110 emits a non-visible illuminating light beam 3128 toward collimating optical assembly 3114. Display module 3112 emits a light beam 3130, which carries a visible image, toward collimating optical assembly 3114. Collimating optical assembly 3114 collimates light beams 3128 and 3130, and directs the collimated light beams toward the eye 3120 of the user. Imaging processor 3132 detects the corneal reflection 3138 of light beam 3128 (i.e., corneal reflection 3138 is the reflection of light beam 3128 from the cornea of the eye 3120). Since light beam 3128 is collimated, the position of corneal reflection 3138 on the cornea is invariant to the movement of the eye 3120, relative to the light source 3110 position (e.g., such relative movement can occur under helmet slippage). In the present example, corneal reflection 3138 is located outside of the area of pupil 3134. It is noted, however, that corneal reflection 3138 may, in general, partially or completely overlap with the area of pupil 3134. It is further noted that the position of the corneal reflection 3138 depends on the gaze of the eye 3120.

Light source 3108 emits a non-visible illuminating light beam 3126 toward the eye 3120 and eyelids 3136 of the user. A portion of light beam 3128 (not shown) is reflected toward the camera module 3102. Thus, camera module 3102 detects an image of the eye 3120 and eyelids 3136 of the user. Light source 3108 may be configured to produce flood illumination over certain areas of the face (e.g., eyes and eyelids) with homogeneous light (i.e., intensity, polarization, wavelength and the like). For example, a diffuser may be used to generate a uniform intensity of illumination.

According to a further embodiment of the disclosed technique, the imaging processor 3132 determines the line of sight of the user according to the relative position between pupil 3134 and the corneal reflection 3138. For example, imaging processor 3132 can extract from the eye image the position of the center of pupil 3134 and the center of corneal reflection 3138. Thus, the imaging processor can calculate the relative position between the center of the pupil and the center of the corneal reflection. The imaging processor may then transform this result, using a predetermined model transformation, to determine the line of sight of the user. It is noted that the model transformation is based on knowledge of the physiology of the eye, and may further be determined according to previously acquired data regarding the user. The position of the eyelids 3136 may be used in order to enhance the accuracy of the calculation of the line of sight. For example, either corner of the eyelids is generally at rest relative to the face of the user. Thus, a corner of the eyelids 3136 may be used as a further reference point, in addition to the pupil and the corneal reflection.

Alternatively, the position of eyelids 3136 may be used for calculating the line of sight of the user, in case one of the other reference points (i.e., the pupil 3134 or the corneal reflection 3138) is not available. For example, under certain conditions, the corneal reflection 3138 may not be available. Accordingly, the imaging processor determines the line of sight according to the relative position between the center of the pupil 3134 and a corner of the eyelids 3136.

It is noted that the imaging processor may calculate the line of sight dynamically. Accordingly, the imaging processor 3132 initially calculates the line of sight, and then associates any subsequent movement in the eye with a change of the line of sight.

According to another embodiment of the disclosed technique, imaging processor 3132 determines the physiological state of the user according to the position and movement of either eyelids 3136 or pupil 3134. For example, the position of eyelids 3136 and the movement of pupil 3134, can indicate the fatigue state of the user, and identify loss of consciousness (LOC), and the like. For example, the imaging processor can thus identify a loss of consciousness under high G loads (G-LOC). This physiological state can be for example, fatigue, loss of consciousness, cross-eye, astigmatism, eye damage, vertigo, and the like.

When certain physiological conditions are detected, imaging processor 3132 can initiate a response accordingly. For example, when imaging processor detects that the user is sleepy, imaging processor can instruct an alarm system to sound an audible alarm, to generate a mild electric shock, alert the attention of a command center, and the like.

System 3100 further includes a semi-transparent visor or combiner (not shown). It is noted that the paths of the light beams traveling between the eye 3120 and the elements of system 3100 are shown only schematically in FIG. 13. Light beams 3122, 3124, 3126, 3128 and 3130 are actually reflected from the visor before reaching the eye 3120 or the camera module 3102.

Figure 14:
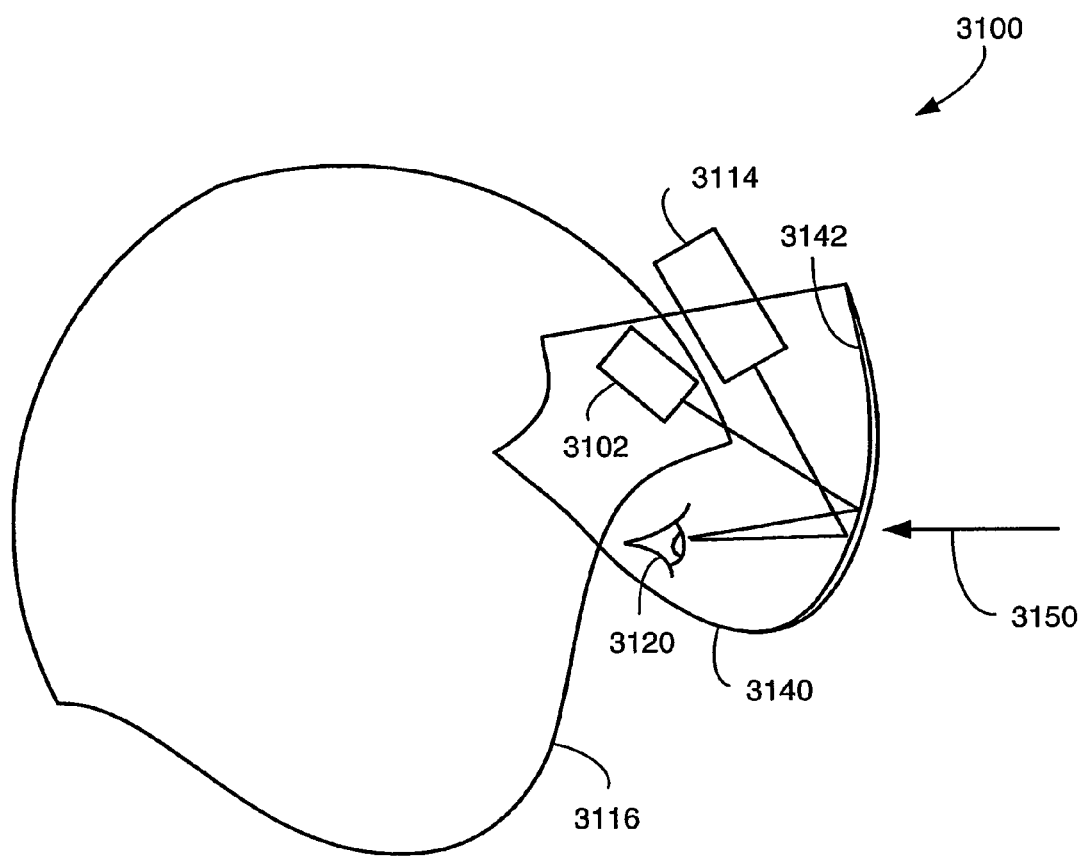
FIG. 14 is a schematic side-view illustration of the system of FIG. 13.

Reference is now made to FIG. 14, which is a schematic side-view illustration of system 3100 (FIG. 13). A visor 3140 reflects light beams passing between the eye 3120 and the camera 3102 (i.e., light beam 3124 of FIG. 13), as well as light beams passing between the collimator 3114 and the eye 3120 (i.e., light beams 3128 and 3130 of FIG. 13). It is noted that both display module 3112 and light source 3110 transmit light to visor/combiner 3140 through collimator 3114. Thus, system 3100 determines the LOS of eyes 3120 and displays an image for eyes 3120, while display module 3112 and light source 3110 utilize substantially the same optical path.

In the present example, the surface of visor 3140 is spherical. It is noted, however that the surface of visor 3140 may have various shapes such as spherical, aspherical, planar, and the like. It is further noted that a spherical visor may have some degree of rotational freedom, without affecting the paths of light beams reflected there from.

Visor 3140 at least partially transmits visible light, thereby enabling the user to view a scene there through. Visor 3140 may further filter out light having substantially the same wavelengths as illuminating light beams 3122, 3126 and 3128. For example, the visor may include a pigment which absorbs light having these wavelengths. Thus, visor 3140 prevents light having these wavelengths from passing entering the space between the visor and the face of the user. This substantially eliminates interference to the system 3100 caused by ambient light (e.g., light from the sun), which is generally referenced 3150.

Visor 3140 is coated with an inner coating 3142. It is noted that coating 3142 may coat the entire inner side of visor 3140. For example, inner coating 3142 may be an interference mirror coating, which has peak reflection response at the wavelength region of light beams 3122, 3126 and 3128 and display 3112. Thus, inner coating 3142 prevents any light having these wavelengths from traveling from the inner side of the visor (i.e., the space between the visor and the face of the user) to the outer side of the visor.

Thus, the space between the visor and the face of the user is practically optically isolated at these wavelengths. Substantially all of the light having the same wavelengths as the illuminating light beams, which is detected by camera module 3102, originates only from light sources 3106, 3108 and 3110. Thus, the signal (i.e., light that originated in one of the light sources) to noise (i.e., ambient light 3150) ratio (SNR) is sufficient for analyzing the image received by camera module 3102.

It is noted that a debriefing camera may be incorporated with system 3100. Such a camera can provide data regarding the position and orientation of the helmet 3116 during the flight. Taken together with data from camera module 3102, these data may provide further insight regarding the view seen by the user. Similarly, the system may be incorporated with a position and orientation sensor mounted on the helmet 3116 (e.g., head position tracker 3536 illustrated in FIG. 18), as well as a position and orientation sensor which is associated with the aircraft (e.g., vehicle position and orientation tracker 3538 illustrated in FIG. 18).

Figure 15A:
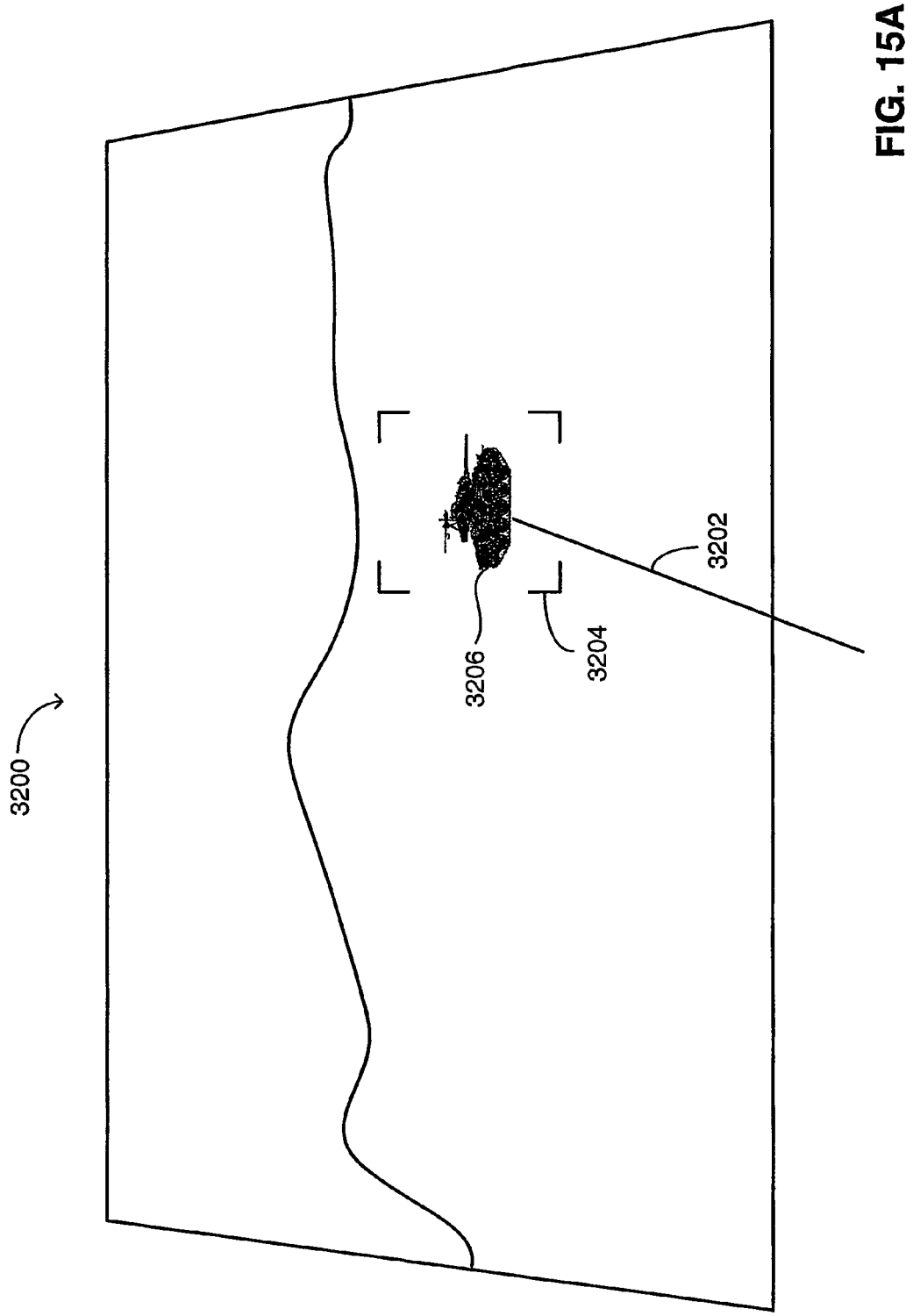
FIG. 15A is a schematic illustration of a first scene, which is viewed by a user, in accordance with a further embodiment of the disclosed technique.
Figure 15B:
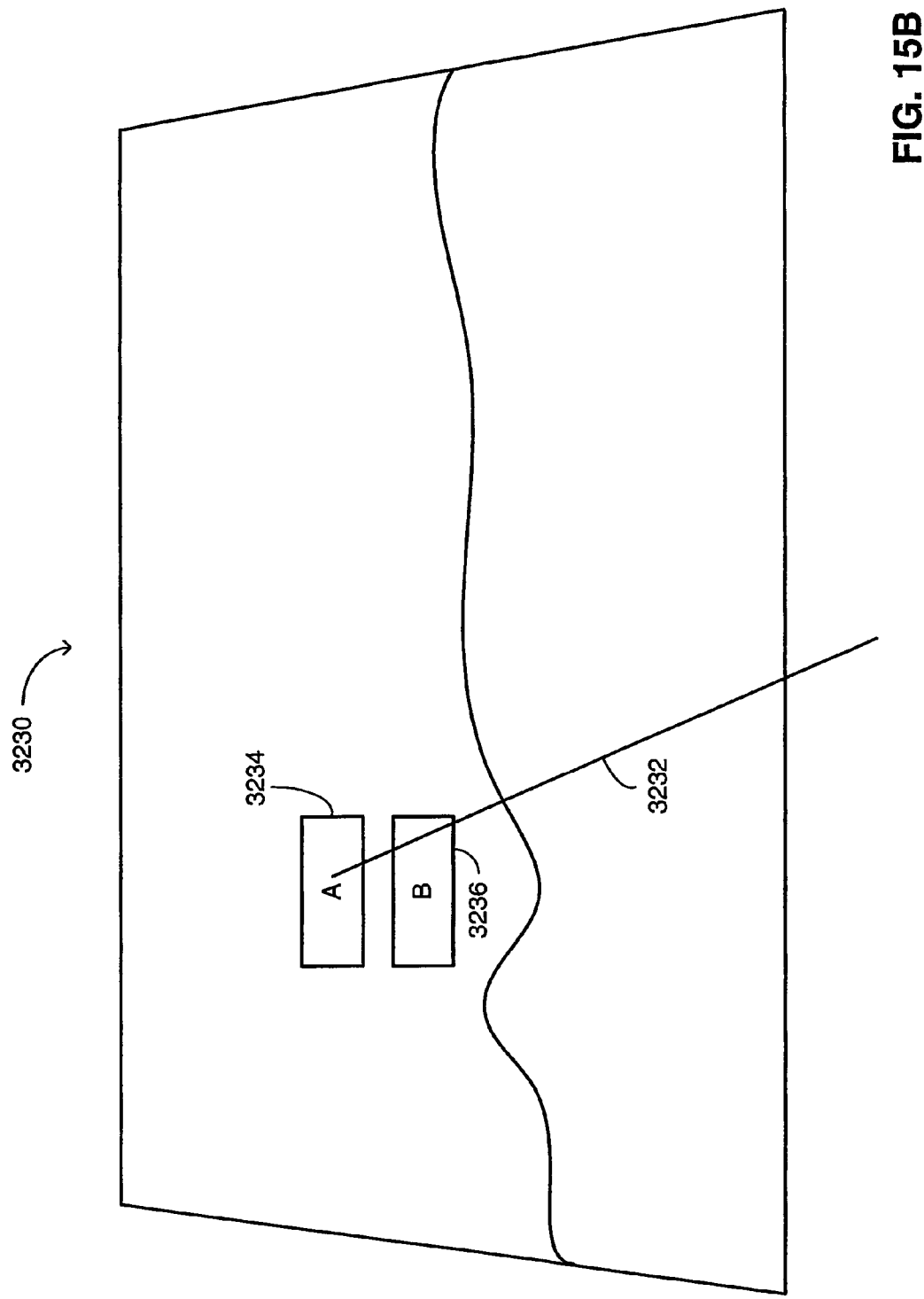
FIG. 15B is a schematic illustration of a second scene, which is viewed by the user, in accordance with another embodiment of the disclosed technique.

In accordance with another embodiment of the disclosed technique, the image displayed to the viewer is controlled according to the detected line of sight. Reference is now made to FIGS. 15A and 15B. FIG. 15A is a schematic illustration of a first scene, generally referenced 3200, which is viewed by a user, in accordance with a further embodiment of the disclosed technique. FIG. 15B is a schematic illustration of a second scene, generally referenced 3230, which is viewed by the user, in accordance with another embodiment of the disclosed technique. In the examples set forth in FIGS. 15A and 15B, the user is operating an aircraft (e.g., the user is an aviation crew member). It is noted, however, that the disclosed technique may be applied to various applications for extending the user ability to interface with systems, such as in a tank, a submarine, various types of simulators, assembly lines, apparatuses for persons with disabilities, and the like.

With reference to FIG. 15A, scene 3200 includes a target 3206. In the example set forth in FIG. 15A, target 3206 is a tank. A target marking 3204 is superimposed on the scene 3200. Target marking 3204 is displayed around the line of sight 3202 of the viewer. It is noted that the line of sight 3202 is shown for purposes of explanation only and is generally not displayed to the user. The line of sight extends from the pupil, perpendicularly to the cornea and hence, from the visual perspective of the user, this virtual line is a single point located exactly at the center of the field of view of each eye.

In the present example, the user attempts to aim at target 3206 and direct a weapon (e.g., weapon 3532 illustrated in FIG. 18) at this target. In order to aim at the target, the user simply gazes at the target, thereby setting the line of sight 3202 to the direction of the target. The target marking 3204, displayed around the target, helps the user to determine whether the aim is sufficiently accurate. When the aim is sufficiently accurate, the user can fire at the target (e.g., by pressing a manual button, providing a vocal command).

To determine the actual targeting location at which the user is aiming, the disclosed technique implements a coordinate system hierarchy. Accordingly, the disclosed technique cascades the pupil line of sight coordinate system (i.e., eye tracking), within the helmet line of sight coordinate system (i.e., helmet position and orientation), which is further registered in an aircraft position (e.g., a global positioning system (GPS) combined with a radar) and orientation (e.g., a gyroscope).

It is noted that the disclosed technique provides the user with a field of aim, which may include any point in the field of view of the eyes of the user. It is further noted that the speed and stability of the aim of the user are virtually limited only by the physiological limitations of the eye of the user.

It is noted that an aircraft may be subject to extreme conditions (e.g., during combat), such as a high gravitational (G) force in various directions, vibrations, pressure, and the like. The human eyes are naturally virtually self-stabilized by the vestibular ocular reflex. By constantly tracking the eye and determining the visual line of sight, the disclosed technique provides the user with stability of the aim, even when the plane is subject to such extreme conditions. Thus, the disclosed technique uses the natural self-stabilization of the eyes in order to compensate for head vibrations.

In accordance with another embodiment of the disclosed technique, the eye tracking system registers logical display elements according to the line of sight of the viewer. Thus, the user can select display elements using the eye. With reference to FIG. 15B, display elements A (referenced 3234) and B (referenced 3236) are superimposed on scene 3230. Each of display elements 3234 and 3236 represents an action (e.g., selecting missiles, eject seat, transmit a distress signal) which the user can select.

The eye tracking system initially registers logical display elements with the field of view of the viewer. Thus, the system detects when the user gazes at a certain logical display element. Hence, the user can select a logical display element by gazing at this element and confirming the selection. In the present example, the user is selecting option A. The selection may be confirmed by various confirmation mechanisms, such as manual confirmation, gazing at the logical display element for a minimal duration, providing vocal indication, and the like.

Figure 15C:
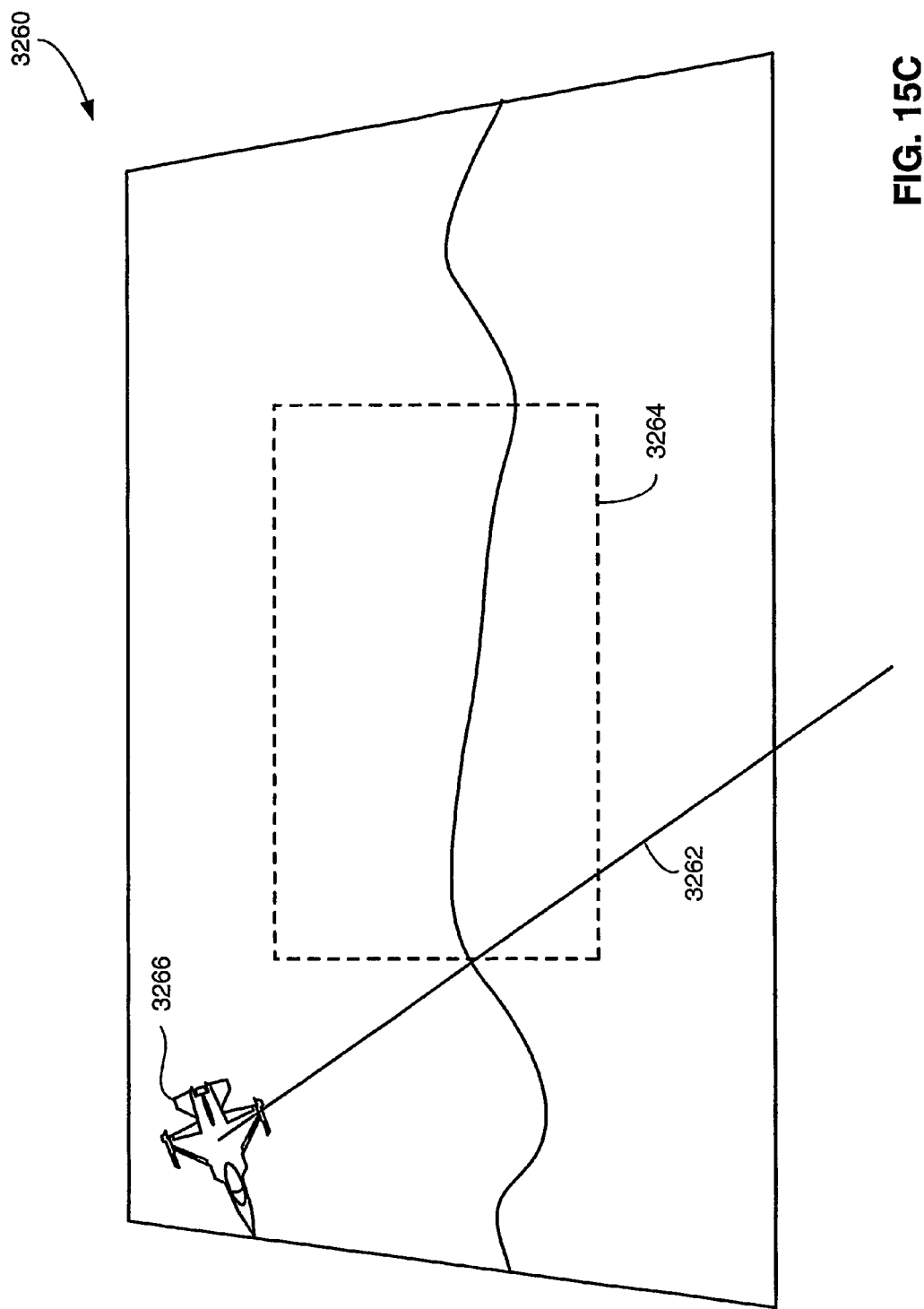
FIG. 15C is a schematic illustration of a third scene, which is viewed by the user, in accordance with a further embodiment of the disclosed technique.

In accordance with another embodiment of the disclosed technique, the user can select targets outside of the field of display. Reference is now made to FIG. 15C, which is a schematic illustration of a third scene, generally referenced 3260, which is viewed by the user, in accordance with a further embodiment of the disclosed technique.

Scene 3260 includes a target 3266. In the example set forth in FIG. 15C, target 3266 is an enemy plane. The field of display of the system, referenced 3264, represents the area in which the system can display images to the user. It is noted that the field of display 3264 is typically smaller than the field of view of the human eye. It is further noted that the field of display 3264 is shown for purposes of explanation, and does not actually appear on scene 3260.

Target 3266 is located outside of the field of display 3264, and hence, the system does not display a target marking (e.g., similar to target marking 3204 of FIG. 15A) around target 3266. The user of system 3100 can lock on to target 3266, by directing the field of view 3262 toward the target (i.e., by looking at the target), and by further activating a confirmation mechanism.

Figure 16:
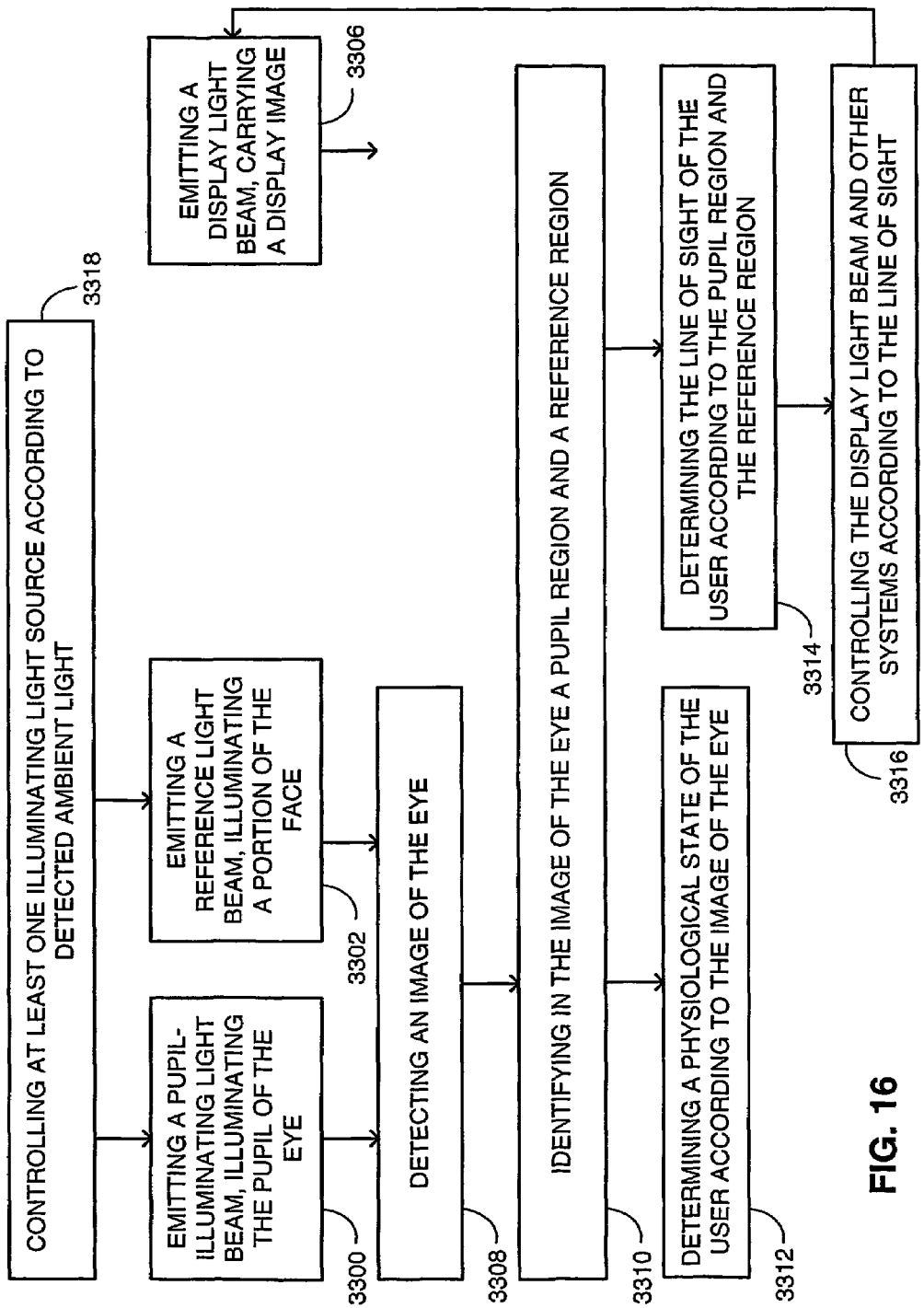
FIG. 16 is a schematic illustration of a method for tracking an eye of a user, while projecting images toward the eye, operative in accordance with another embodiment of the disclosed technique.

Reference is now made to FIG. 16, which is a schematic illustration of a method for tracking an eye of a user, while projecting images toward the eye, operative in accordance with another embodiment of the disclosed technique. In procedure 3300, a pupil-illuminating light beam is emitted toward a reflecting surface. Such a pupil-illuminating light beam is directed at illuminating a pupil and the tissue surrounding that pupil in a way which emphasizes the contrast between the pupil and that tissue. It is noted that the pupil-illuminating light beam may reach the reflecting surface indirectly. Accordingly, the light beam is first emitted toward at least one optical element, which then directs the light beam toward the reflecting surface. With reference to FIGS. 13 and 14, light source 3106 emits light beam 3122 toward beam splitter 3104 and from there toward the inner coating 3142 of the visor 3140.

In procedure 3302, an eyelid-illuminating light beam is emitted toward the reflecting surface. Such an eyelid-illuminating light beam is directed at illuminating the entire eye and eyelids, in a way which enables tracking the position of the eyelids. With reference to FIGS. 13 and 14, light source 3108 emits light beam 3126 toward the inner coating 3142 of visor 3140.

In procedure 3304, a cornea-illuminating light beam is emitted toward the reflecting surface. Such a cornea-illuminating light beam is directed at illuminating the cornea of the eye, such that a visible point reflection appears on the cornea of the eye. With reference to FIGS. 13 and 14, light source 3110 emits light beam 3128, through collimating optical assembly 3114, toward the inner coating 3142 of visor 3140.

In procedure 3306, a display light beam is emitted toward the reflecting surface. The display light beam carries an image to be viewed by the user. With reference to FIGS. 13 and 14, light source 3112 emits light beam 3130, through collimating optical assembly 3114, toward inner coating 3142 of visor 3140.

In procedure 3308, the illuminating light beams and the display light beam are reflected toward an eye of a user, thereby illuminating the eye and displaying a display image to the user. With reference to FIGS. 13 and 14, inner coating 3142 of visor 3140 reflects light beams 3122, 3126, 3128 and 3130 toward the eye 3120.

In procedure 3310, light received from the eye is reflected toward an image detector, thereby detecting an image of the eye. With reference to FIGS. 13 and 14, inner coating 3142 of visor 3140 reflects portions (not shown) of light beams 3122, 3126 and 3130, through beam splitter 3104, toward camera module 3102.

In procedure 3312, the image of the eye is analyzed, thereby determining a physiological state of the user. With reference to FIG. 13, imaging processor 3132 analyzes the image of the eye 3120, and determines the fatigue state of the user according to the position and movement of the eyelids.

In procedure 3314, the image of the eye is analyzed, thereby determining the line of sight of the user. With reference to FIGS. 13 and 14, imaging processor 3132 analyzes the image of eye 3120 received from camera module 3102, and determines the line of sight of the user according to the relative position of the pupil 3134, the corneal reflection 3138 and the structure and position of the eyelids 3136.

In procedure 3316, the display light beam is controlled according to the line of sight of the user. With reference to FIG. 15A, the display light source beam projects an image including target marking 3204. The position of target marking 3204 is controlled according to the position of the line of sight 3202 of the viewer.

It is noted that other systems may be controlled according to the line of sight of the user. For example, an ejection mechanism, a firing mechanism, mode of operation, and the like, may be controlled according to the line of sight.

In procedure 3318, at least one illuminating light source is controlled according to detected ambient light. In the example set forth in FIGS. 13 and 14, an ambient light detector (not shown) detects the intensity level of ambient light 3150, and provides imaging processor with a signal accordingly. When the intensity levels exceed a certain threshold, imaging processor instructs light source 3106 to substantially reduce (or completely eliminate) the intensity of illuminating light beam 3122. It is noted that procedure 3318 is performed before procedures 3300, 3302 and 3304.

In accordance with another embodiment of the disclosed technique, the apparatus is mounted in front of the user, not being attached to the user (e.g., not being mounted on a helmet). In such a system, the line of sight of the viewer is tracked with respect to different head positions. The module which tracks the head can be physically coupled with the head (e.g., attached to a helmet) or visually tracking the position of the head from a remote location, in the vicinity of the user.

Figure 17A:
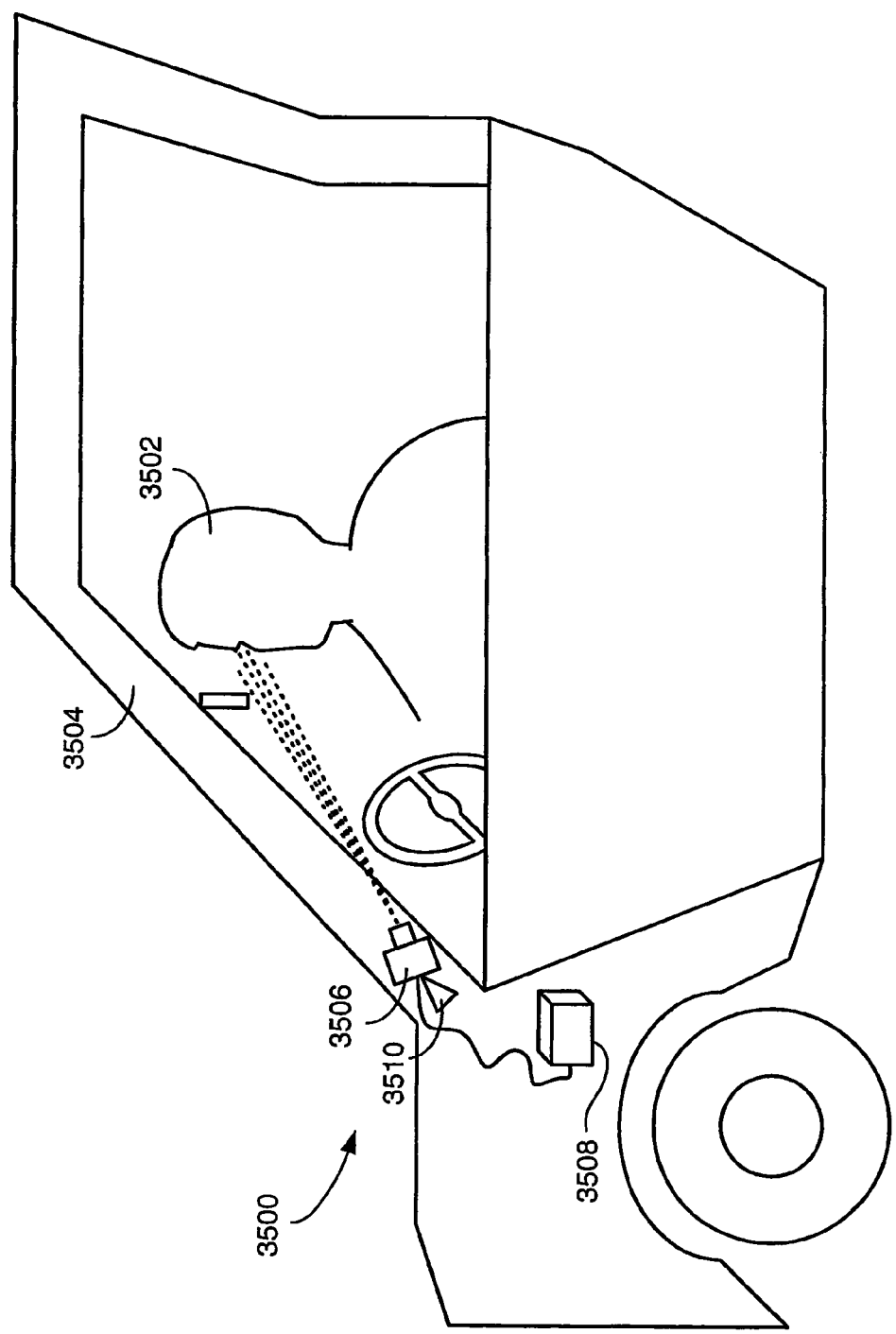
FIG. 17A is a schematic side-view illustration of a system, constructed and operative in accordance with a further embodiment of the disclosed technique.
Figure 17B:
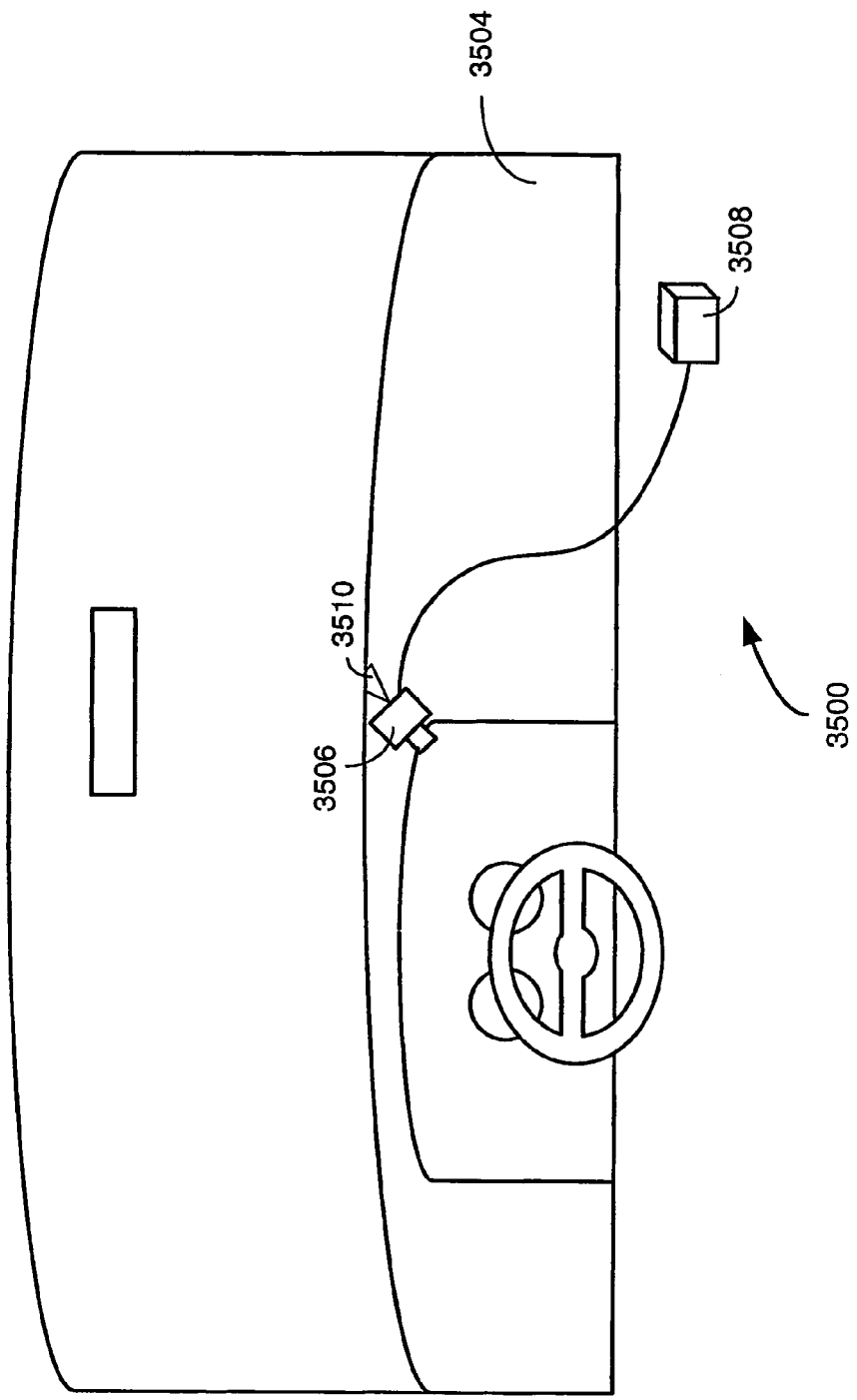
FIG. 17B is a front-view illustration of the system of FIG. 17A.

Reference is now made to FIGS. 17A and 17B. FIG. 17A is a schematic side-view illustration of a system, generally referenced 3500, constructed and operative in accordance with a further embodiment of the disclosed technique. FIG. 17B is a front-view illustration of the system of FIG. 17A. In the examples set forth in FIGS. 17A and 17B, the user is operating a vehicle (e.g., the user is an automobile driver). It is noted that this embodiment of the disclosed technique may be applied to any type of vehicle (e.g., a bus, a truck, a motorcycle, bicycles), vessel (e.g., boat or submarine) or aircraft (e.g., airplane, helicopter, spaceship) or in a stationary facility.

With reference to FIG. 17A, system 3500 includes an eye tracker module 3506, a drive module 3510, and a video processing unit 3508. Eye tracker module 3506 is coupled with drive module 3510 and video processing unit 3508, and all are mounted onto vehicle 3504. Vehicle 3504 is operated by a driver 3502.

Eye tracker module 3506 comprises components including a camera module, a beam splitter, light sources, a display module, and a collimating optical assembly (all not shown) similar to system 3100 of FIG. 13. The functionality of these units is analogous to the corresponding units with reference to system 3100. Generally, eye tracker module 3506 emits illuminating light beams and a display light beam toward the eye of driver 3502, thereby illuminating the eye and displaying an image to driver 3502. The image displayed may include different features or instructions associated with the road or the driving process, and allow driver 3502 to select an element by activating a confirmation mechanism.

Since the head position of driver 3502 is not constrained to a limited area, the position of the eye can be in a wide possible range within vehicle 3504. According to one aspect of the disclosed technique, drive module 3510 directs eye tracker module 3506 toward the general location of the eye. This direction may be determined according to a head-mounted MPS or according to an off-user camera.

According to another aspect of the disclosed technique, there exists a plurality of eye tracker modules 3506 that cover the entire area in which the head of the driver can move. Furthermore, there also exists a unit which determines which eye tracker module 3506 to select for operation at any given time.

According to a further aspect of the disclosed technique, video processing unit 3508 includes a high resolution detector (e.g. a CMOS imager). Such a high resolution detector, coupled with wide angle optics, covers a large field of view. It is noted that these aspects of the disclosed technique are not mutually exclusive. For example, a high resolution detector may be used together with a drive module 3510, in order to improve accuracy.

Video processing unit 3508 receives an image of the eye of driver 3502 from eye tracker module 3506. Video processing unit 3508 analyzes the image of the eye and determines the line of sight of driver 3502 with respect to head position. Video processing unit 3508 controls images to be displayed to driver 3502 according to the line of sight. Video processing unit 3508 may also analyze the image of the eye to determine a physiological state of driver 3502. When certain physiological conditions are detected, video processing unit 3508 can initiate a response accordingly, as described above in conjunction with the system 3100.

According to another aspect of the disclosed technique, driver 3502 can gaze at an object (i.e., scene image) outside of vehicle 3504 and interrogate system 3500 information regarding the object. Driver 3502 can interrogate system 3500 by employing a microphone (not shown). Eye tracker module 3506 then displays an image respective of the object, on a windshield of vehicle 3504, in response to the interrogation, according to the LOS of driver 3502, as determined by eye tracker module 3506. In this case, eye tracker module 3506 displays the image on a location on the windshield which corresponds to the current LOS of driver 3502 (i.e., the location of the image on the windshield changes according to the gaze direction of driver 3502).

Alternatively, eye tracker module 3506 displays the image according to the position of the head of driver 3502 relative to vehicle 3504, as determined by eye tracker module 3506. In this case, eye tracker module 3506 displays the image on a location on the windshield which corresponds to the current position of the head of driver 3502 (i.e., the location of the image on the windshield changes according to the position of the head of driver 3502).

Reference is now made to FIG. 17B, which is a schematic front-view illustration of system 3500 (FIG. 17A). It is noted that eye tracker module 3506 is mounted at a convenient location within vehicle 3504, facing the user.

It is further noted that the light beams are not reflected off the surface of a lens (such as a visor), as in previous embodiments of the disclosed technique, but rather there is a direct path between the light beams and the eye of driver 3502.

Figure 18:
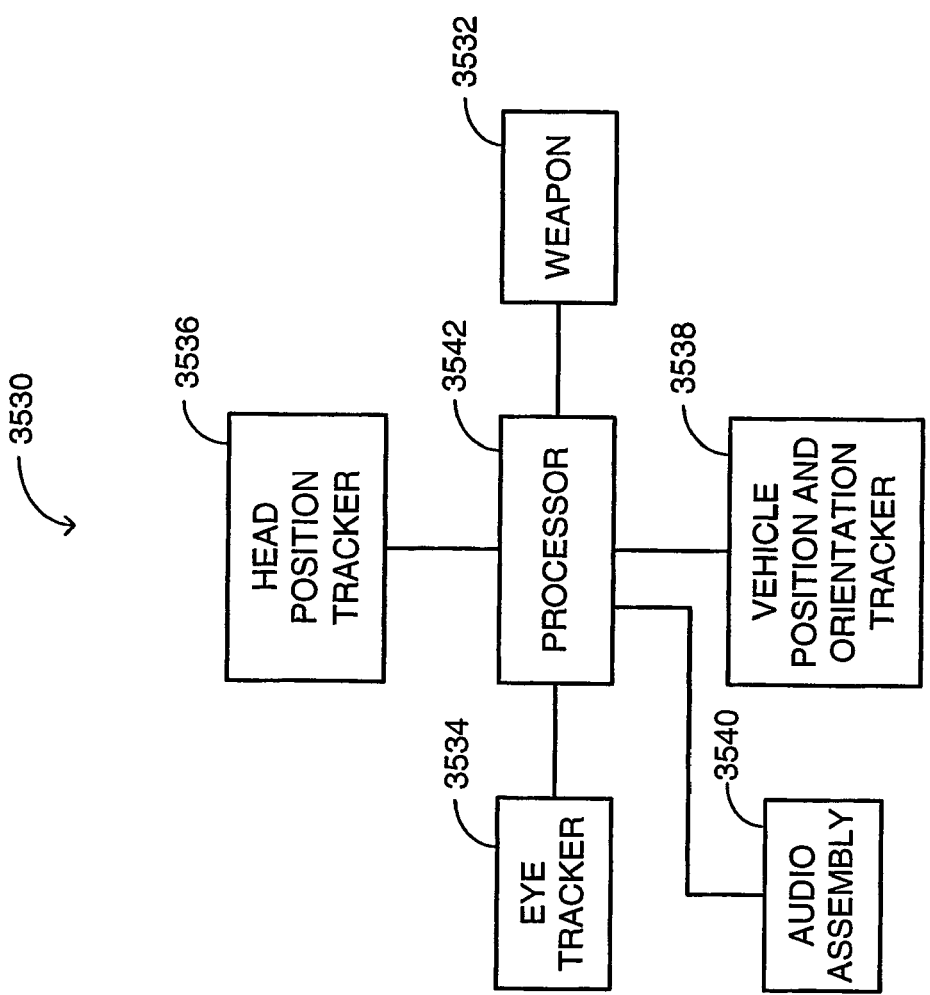
FIG. 18 is a schematic illustration of a system constructed and operative in accordance with another embodiment of the disclosed technique, to direct a weapon toward a target.

Reference is now made to FIG. 18, which is a schematic illustration of a system, generally referenced 3530, constructed and operative in accordance with another embodiment of the disclosed technique, the system being employed to direct a weapon, generally referenced 3532, toward a target. System 3530 includes an eye tracker 3534, a head position tracker 3536, a vehicle position and orientation tracker 3538, an audio assembly 3540 and a processor 3542. Weapon 3532, eye tracker 3534, head position tracker 3536, vehicle position and orientation tracker 3538 and audio assembly 3540 are coupled with processor 3542.

Weapon 3532 includes a moving mechanism (not shown), such as an electric actuator, hydraulic actuator, pneumatic actuator, piezoelectric actuator, and the like. Processor 3542 aims weapon 3532 toward the target, according to data received from eye tracker 3534, head position tracker 3536 and vehicle position and orientation tracker 3538, by employing the moving mechanism. Processor 3542 directs audio assembly 3540 to sound audible signals to a user (not shown) indicating predetermined states or operation modes of weapon 3532.

It is noted that processor 3542 may further be coupled with additional systems (not shown) which confirm the identity of the target based on measured and detected characteristics thereof such as material analysis (e.g., if the target is made of metal), shape analysis (e.g., based on shape oriented image processing), activity analysis (e.g., detecting transmissions originating from the target), and the like.

Following is a description of active visor 142. The level of dichroism of the variable polarizer dictates the polarization level of the variable polarizer at that time. Dichroism level is defined with respect to a specific direction of the variable polarizer. For example, assume that $A_x$ and $A_y$ are the amplitudes of the X and Y components, respectively, of the electromagnetic wave of a light beam entering a variable polarizer, and $A'_x$ and $A'_y$ are the magnitudes of the respective components of the electromagnetic wave of that light beam as it exits the variable polarizer. Then a measure of the dichroism level $D_x$ may be given with respect to the X axis as:

$$D_x = (T_x - T_y)/(T_x + T_y) \quad (1)$$

wherein $$T_y = \frac{A'_y}{A_y} \quad (2)$$

$$T_x = \frac{A'_x}{A_x} \quad (3)$$

and wherein it is assumed that $$T_x > T_y \geq 0. \quad (4)$$

Similarly, $$D_y = (T_y - T_x)/(T_x + T_y) \quad (5)$$

when $$T_y > T_x \geq 0. \quad (6)$$

It is noted that in the description herein below, the relative and absolute values of different parameters, such as luminance, electric field, voltage, dichroism, polarization level, direction, orientation angle, and the like, are approximate values and not precise values.

An "optical phase shifter" is an optical element which either retards or advances the phase of at least one linearly polarized component of an incoming light beam relative to another linearly polarized component thereof or to a reference light beam. It is noted that any monochromatic light beam, may be represented as a combination of two linearly polarized components, whose electromagnetic fields oscillate in orthogonal directions. The phase change can be any value between zero and $2\pi$ radians, and integer multiples thereof.

One type of optical phase shifter, which is called a wave plate, retards one linearly polarized component of an incoming light beam, with respect to the other linearly polarized component of that incoming light beam, by a fraction of a wavelength (e.g., $\lambda/8, \lambda/4, 3\lambda/8, \lambda/n$, and the like). A $\lambda/4$ wave plate is an example of such a wave plate, also known as a quarter-wave plate. A $\lambda/4$ wave plate retards one linearly polarized component of an incoming light beam having a certain wavelength $\lambda$, by a quarter of wavelength $\lambda/4$, with respect to the other linearly polarized component of that incoming light beam. As a result, a linearly polarized incoming light beam which is linearly polarized at 45 degrees relative to the axes of the $\lambda/4$ wave plate, shall exit circularly polarized. Similarly, a circularly polarized incoming light beam shall exit the $\lambda/4$ wave plate, linearly polarized at $\lambda/4$ degrees relative to the axes of the $\lambda/4$ wave plate.

The disclosed technique is applicable for monochromatic light as well as for polychromatic light. It is noted that a wave plate is generally intended for a specific wavelength $\lambda$. However, the wave plate still provides approximately the same effect for wavelengths near $\lambda$. For example, if the device is intended for sunlight, a wave plate intended for a 550-nm wavelength (i.e., approximately the average wavelength of the sunlight spectrum) can be used.

The term "variable polarizer" herein below, refers to an optical element, whose polarization level can be varied between zero and a predetermined level of polarization, by varying the electric field applied thereto. Such a variable polarizer includes a light affecting substance, which is a combination of an optically active substance and anisotropic light absorbing particles. In the description herein below, the term "light affecting substance" refers to a substance which applies a polarization level to the incoming light, depending on the direction (i.e., the director) along which the anisotropic light absorbing particles are aligned. An optically active substance is one which affects the polarization direction or components of the incoming light, while having substantially no effect on the intensity of the incoming light. Such an optically active substance can be for example, liquid crystal, liquid crystal polymer, birefringent crystal, bireferingent polymer, bireferingent plastic, and the like.

The anisotropic light absorbing particles can be for example, dichroic dye molecules, dichroic microcrystals, pleochroic dye stuff, and the like. Each of dichroic or pleochroic dyes is composed of linear, rod-shaped molecules having large anisotropic absorbance, wherein the anisotropic absorbance depends on the orientation of the rod-shaped molecules relative to the direction of the incident light and the incident light polarization. The anisotropic light absorbing particles are aligned along the director (i.e., the direction of the molecules of the optically active substance) at all times.

Preferably, the liquid crystal (i.e., the host) is coupled with the dichroic or pleochroic dye (i.e., the guest), by mixing the dye in the liquid-crystal phase, referred to herein below as "guest-host liquid crystal (GHLC) phase". In the description herein below, the guest molecules and the host molecules are assumed to be rod-shaped. When these dye molecules are mixed within a nematic liquid crystal phase, the dye molecules are aligned along the liquid crystal phase director, and as a result, the dye molecules exhibit switchable absorbance, switchable polarization and switchable reflectance or transmittance.

The variable polarizer can be either a continuously powered device or an intermittently powered device. In case of the continuously powered device, the orientation of the rod-shaped molecules (i.e., the dye molecules) is set at a predetermined direction, by continuously applying an electric field at a respective predetermined value, thereby setting the continuously powered device at a predetermined polarization level.

For example, when the electric field is applied, the rod-shaped molecules are uniformly aligned perpendicular to the boundary surfaces of the variable polarizer (i.e., the variable polarizer is in a homeotropic state). On the contrary, when no electric field is applied, the rod-shaped molecules are uniformly aligned parallel with the boundary surfaces of the variable polarizer (i.e., the variable polarizer is in a planar state). Thus, by applying different electric fields to the light affecting substance of the variable polarizer, the variable polarizer applies different polarization levels to the incident light. A homeotropic alignment layer aligns the rod-shaped molecules in a direction perpendicular to the boundary surfaces of the variable polarizer, while a planar alignment layer aligns the rod-shaped molecules in a direction parallel with the boundary surfaces of the variable polarizer.

In case of an intermittently powered device, the variable polarizer can be set at the homeotropic, planar, or at at least one stable intermediate state, by applying a momentary electric field pulse having a predetermined pulse shape. A multi-stable liquid crystal cell has at least two stable states, each stable state having a predetermined liquid crystalline structure. Each structure has a predetermined ground state energy (i.e., energy well). Thus, by applying an electric field at a predetermined activation energy, which exceeds a respective predetermined energy barrier, the multi-stable cell transfers from one structure to another.

The multi-stable cell can be manufactured by applying a mixed planar and homeotropic surface alignment procedure. Each stable state corresponds to a predetermined anchoring strength respective of the rod-shaped molecules (i.e., at each stable state the rod-shaped molecules are anchored to the boundary surface of the cell, at a predetermined strength). When the structure of the light affecting substance is in the homeotropic state, the incident light passes there through without being affected in any manner. When the structure of the light affecting substance is in the planar state, only the component of light, which is linearly polarized in the direction of the rod-shaped molecules, passes through.

A "controllable optical phase shifter" is a device, which can operate in a plurality of phase shifting states, which may include a non-phase shift state as well (i.e., applying no phase shift to light).

A controllable optical phase shifter can be in the form of a multi-stable optical phase shifter, having a plurality of stable states (i.e., states which are maintained, without the application of an electric field or any other form of energy). It is noted that a multi-stable optical phase shifter may further be maintained at a plurality of unstable states, by applying different electric fields, thereto.

For example, the controllable optical phase shifter can be in the form of a bi-stable (i.e., having two stable states) twisted nematic liquid crystal, a bi-stable polymer stabilized liquid crystal, a bi-stable surface stabilized liquid crystal, and the like, having a selected thickness, and herein below referred to as "bi-stable optical phase shifter". The structure of the bi-stable optical phase shifter can be switched between an untwisted (or uniform) state and a twisted state, by applying a momentary-electric field having a predetermined pulse shape. The type of the bi-stable optical phase shifter (e.g., $\lambda/4$ wave plate, $\lambda/2$ wave plate, and the like), depends on the thickness thereof. Alternatively, a controllable optical phase shifter can be in the form of a switchable optical phase shifter, as described herein below in conjunction with FIG. 4.

For example, when the structure of the twisted nematic liquid crystal is in the untwisted state, the bi-stable optical phase shifter operates as a $\lambda/2$ wave plate. When the structure of the twisted nematic liquid crystal is in the twisted state, the bi-stable optical phase shifter passes the incident light without having any effect thereon. The twisted nematic liquid crystal can be switched from the untwisted state to the twisted state, by applying a short duration pulse of electric field and from the twisted state to the untwisted state, by applying a slowly decreasing or a stepwise decreasing pulse of electric field.

The phase distribution of the light affecting substance is divided to two classes. Class 1 (or dispersed phase) is a liquid phase which consists of randomly dispersed and randomly oriented microphases such as GHLC droplet (GH-PDLC) or GHLC microdomains, which are embedded in polymer matrices. Class 2 (or homogeneous phase) is another liquid phase which consists of a homogeneous GHLC phase, which can be derived from liquid crystal materials and phases of nematic, twisted nematic, supertwisted nematic, cholesteric, smectic phases, other phases, and combinations or mixtures thereof.

Each of class 1 and class 2 GHLC phase distributions, can be either in form of a mixture or a chemical compound. In a mixture, the dichroic dye molecules (i.e., the guest molecules) are mixed at a small concentration (approximately 1-3%), in the liquid crystal (i.e., the host molecules). In a chemical compound, the anisotropic light absorbing particles and the light affecting substance molecules are coupled together in a chemical bond, such as covalent bonds, van der Waals bonds, Hydrogen bonds, electrostatic bonds, ionic bonds, and the like.

The various types of class 1 light affecting substances used in the disclosed technique, may include Guest-Host Polymer Dispersed Liquid Crystal (GH-PDLC), Dichroic Polymer Dispersed Liquid Crystal and their subclasses such as Polymer Stabilized Cholesteric Texture (PSCT) Liquid Crystal, and Nematic Curved Aligned Polymeric (NCAP) Liquid Crystal.

Class 1 GHLC structures usually exhibit inherent light scattering due to refractive index anisotropy of the liquid crystal phase relative to the surrounding phase. Accordingly, in class 1 GHLC, the inherent light scattering has to be eliminated or reduced to negligible levels, especially for visor-type applications. This may be accomplished by applying the GHLC phase to a liquid crystal material of very small birefringence, based on small dielectric anisotropy, with the average liquid crystal index being close to the surrounding polymer phase. In such cases, the refractive index anisotropy between the ordinary index and the extraordinary index is substantially small (e.g., smaller than 0.1), so that light scattering is greatly reduced. The reduction in light scattering may also be accomplished by defining the size of the microdroplets or microdomains, to be significantly smaller than the wavelength of the interacting light. The systems are dominantly absorption-modulated, leading to the desired ADM and VTO characteristics.

The structure of the microphase or droplet distribution of class 1 GH-PDLC is preferably non-spherical, having an anisotropic geometry, such as elliptical, sheared geometry, elongated geometry, and the like. In this manner it is possible to render the liquid crystal phase in the droplets at a preferred orientation, which may be further employed in the context of the disclosed technique, for increasing the contrast of single or multiple layers of variable polarizers, as described herein below.

A class 2 structure can be a Guest-Host (GH) dichroic liquid crystal incorporating a homogeneous nematic phase (Heilmeier), a cholesteric phase (White-Taylor), a multi-stable phase, and the like. In class 2 variable polarizers, dichroic dye guests are mixed with the homogenous liquid crystal phase hosts. Media utilizing these kinds of materials usually have the property of pure absorption-modulated images, without any light scattering. A normally closed GHLC can be formed for example, by mixing dichroic dyes of suitable dipole moments in a positive dielectric anisotropy twisted nematic GHLC cell. This cell has the liquid crystal phase in the twisted planar texture in the absence of an electric field, producing a normally closed type variable polarizer. This cell can be switched, by the application of an electric field, to the homeotropic phase, thus yielding an open state.

In a similar fashion, mixing suitable dichroic dyes in a GHLC cell of negative dielectric anisotropy, shall produce a normally open type variable polarizer. However, this type of cell conventionally yields poor contrast, and therefore it is impractical for some applications due to the fact that the liquid crystal phase obtained under the electric field is not a pure planar texture, and therefore yields negligible polarization.

A normally open variable polarizer can be constructed by adding a small amount of cholesteric liquid crystal to the nematic GHLC mixture, and applying a mixed homeotropic and planar surface alignment process. This surface alignment process allows the rod-shaped molecules to align substantially in the same direction, when an electric field is applied to the liquid crystal (i.e., the guest-host director is well defined when an electric field is applied). Thus, significant contrast is obtained, especially in a double cell configuration, together with a normally clear (open) VTO.

Figure 19A:
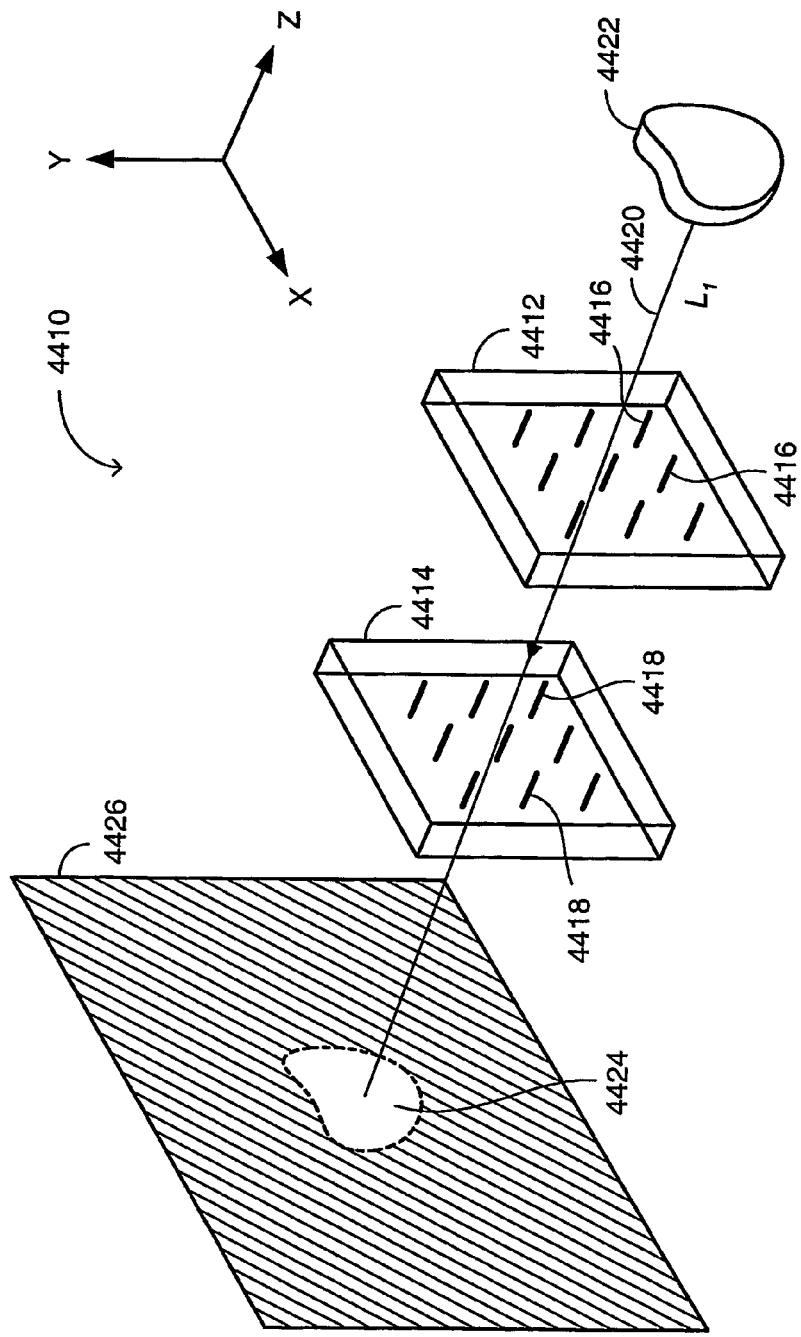
FIG. 19A is a schematic perspective view of a variable transmitter, constructed and operative in accordance with a further embodiment of the disclosed technique.
Figure 19B:
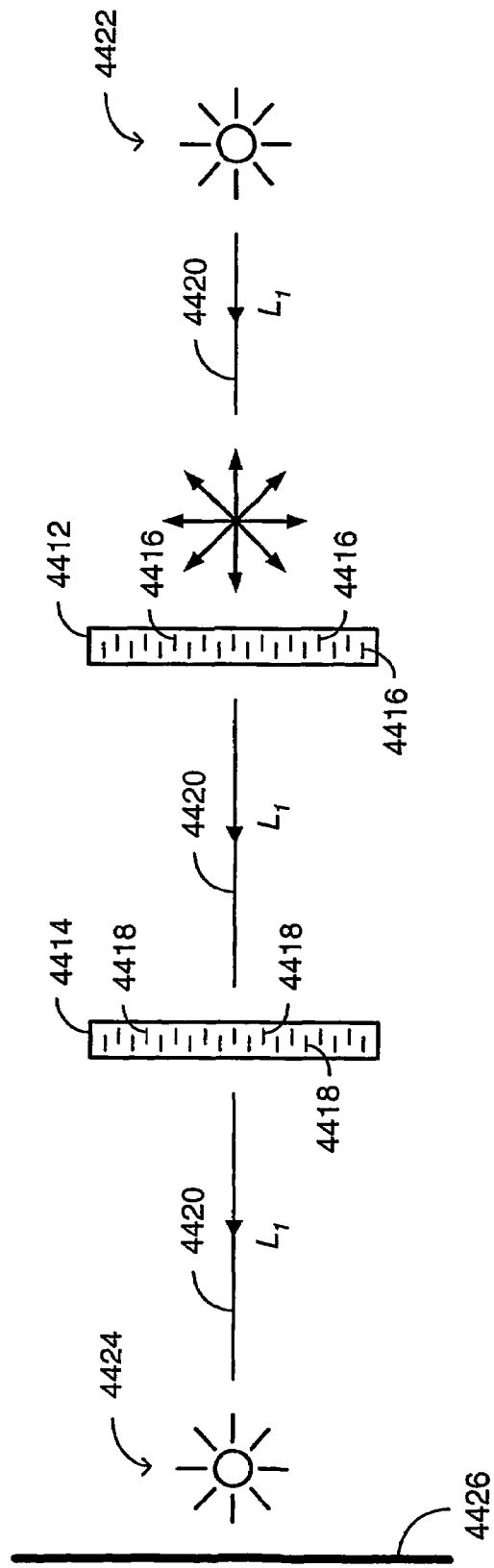
FIG. 19B is a schematic illustration of a side view of the variable transmitter of FIG. 19A.
Figure 19C:
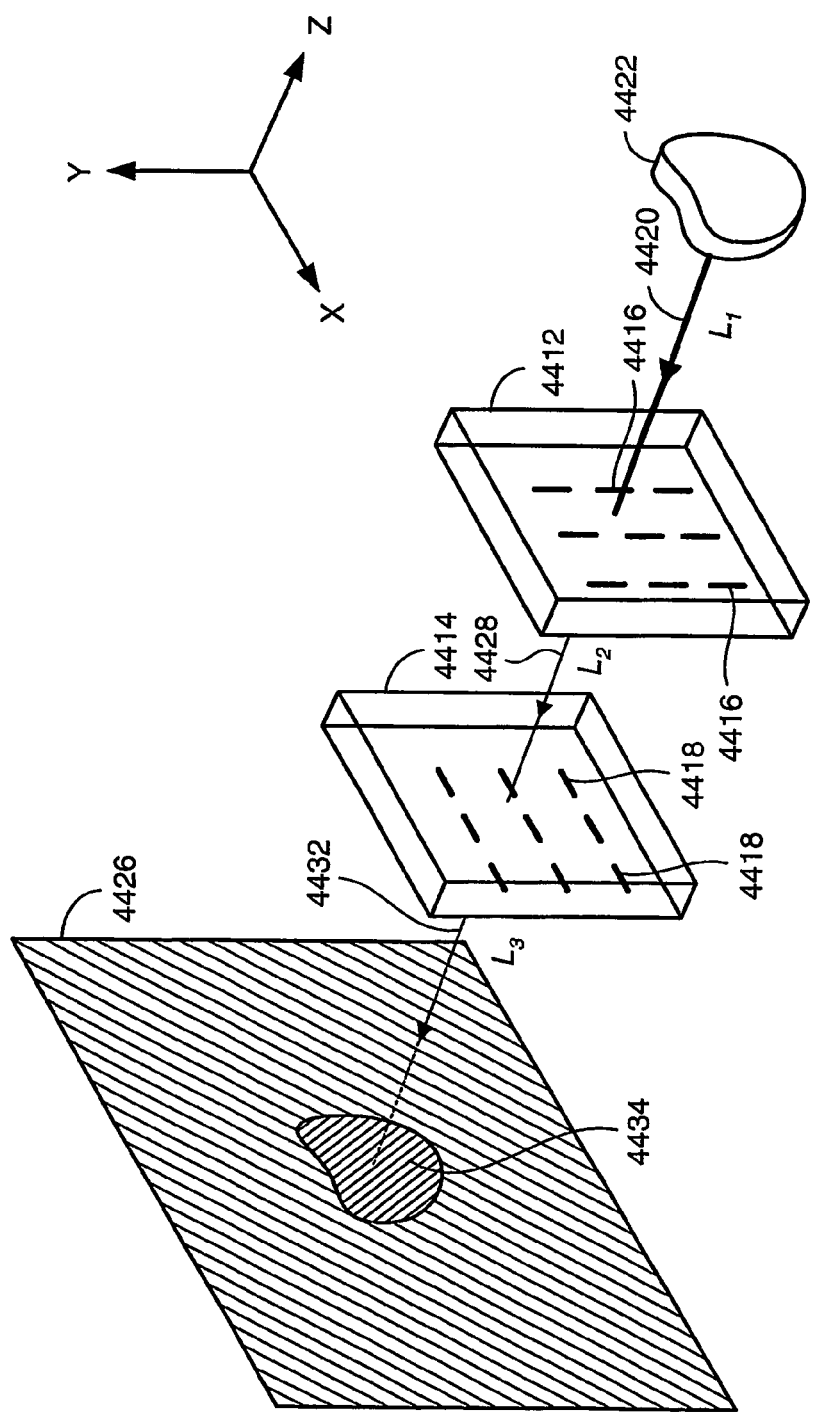
FIG. 19C is a schematic perspective view of the variable transmitter of FIG. 19A, in another mode of operation.
Figure 19D:
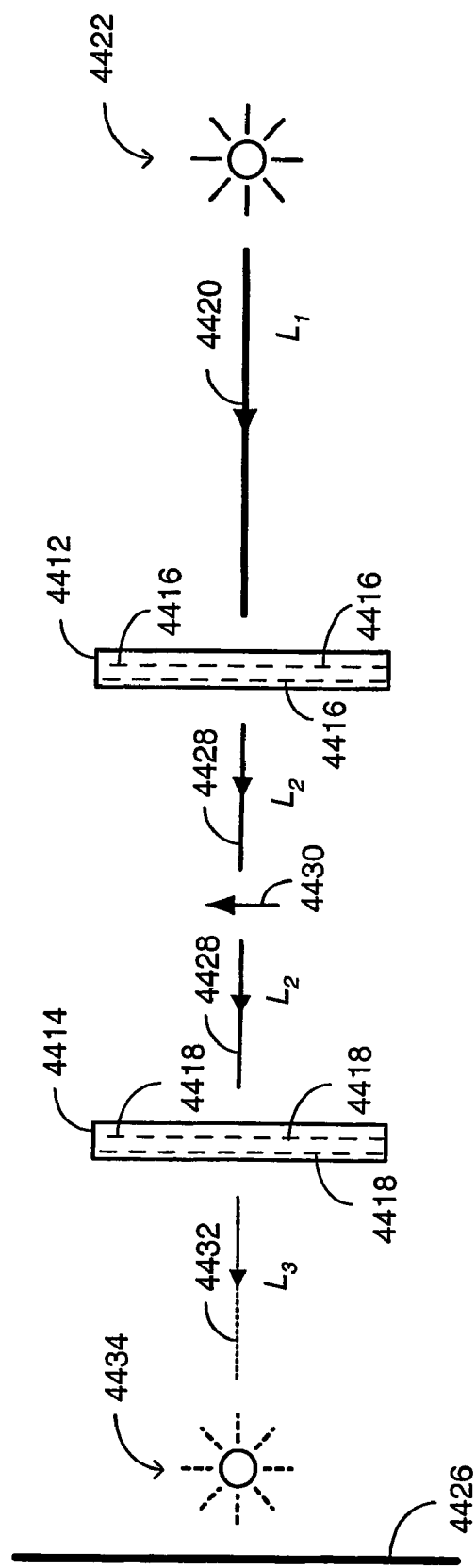
FIG. 19D is a schematic illustration of a side view of the variable transmitter of FIG. 19C.

Reference is now made to FIGS. 19A, 19B, 19C and 19D. FIG. 19A is a schematic perspective view of a variable transmitter, generally referenced 4410, constructed and operative in accordance with a further embodiment of the disclosed technique. FIG. 19B is a schematic illustration of a side view of the variable transmitter of FIG. 19A. FIG. 19C is a schematic perspective view of the variable transmitter of FIG. 19A, in another mode of operation. FIG. 19D is a schematic illustration of a side view of the variable transmitter of FIG. 19C.

Variable transmitter 4410 includes variable polarizers 4412 and 4414. Each of variable polarizers 4412 and 4414 is similar to variable polarizer 102 as described herein above in connection with FIG. 1A. Each of variable polarizers 4412 and 4414 is a normally open variable polarizer. Variable polarizers 4412 and 4414 are positioned relative to each other in a cross-polarized manner (i.e., when in a polarizing mode, the polarization of one is perpendicular to the polarization of the other), as shall be further described in FIG. 19C. It is noted that the difference in the polarization direction of variable polarizer 4412 and variable polarizer 4414 can be any value, however the preferred value in order to provide maximum dynamic range, is $\pi/2$ radians.

With reference to FIGS. 19A and 19B, when no electric field is applied across variable polarizer 4412, the direction of rod-shaped molecules 4416 thereof, is parallel to the Z axis (i.e., perpendicular to the plane of variable polarizer 4412). Likewise, when no electric field is applied across variable polarizer 4414, the direction of rod-shaped molecules 4418 thereof, is parallel to the Z axis (i.e., perpendicular to the plane of variable polarizer 4414). Thus, when no electric field is applied across each of variable polarizers 4412 and 4414, the respective variable polarizer transmits the incoming light, without having any effect on the incoming light and without affecting the luminance of the incoming light. Variable polarizers 4412 and 4414 transmit a light beam 4420 of an object 4422 having a luminance $L_1$, without affecting the value of luminance $L_1$ and an observer (not shown) views an image 4424 of object 4422, on a viewing plane 4426.

With reference to FIGS. 19C and 19D, when an electric field is applied across variable polarizer 4412, rod-shaped molecules 4416 tend to be aligned along the Y axis, wherein variable polarizer 4412 operates as a linear polarizer and thus reduces the luminance of the incoming light. In like manner, when an electric field is applied across variable polarizer 4414, rod-shaped molecules 4418 tend to be aligned along the X axis, wherein variable polarizer 4414 operates as a linear polarizer and thus reduces the luminance of the incoming light. Variable polarizer 4412 linearly polarizes light beam 4420 along the Y axis and as a result a light beam 4428 emerges from variable polarizer 4412 whose luminance $L_2$ is less than luminance $L_1$. The direction of polarization of light beam 4428 is represented by an arrow 4430. Variable polarizer 4414 linearly polarizes light beam 4428 along the X axis and as a result a light beam 4432 emerges from variable polarizer 4414 whose luminance $L_3$ is less than luminance $L_2$. The observer views an image 4434 of object 4422 on viewing plane 4426, wherein the luminance $L_3$ of image 4434 is less than luminance $L_1$ of object 4422.

Variable transmitter 4410 can include a set of electrically conducting layers (not shown) and a set of electrically insulating layers (not shown). Each of the electrically conducting layers is made of a thin, transparent and electrically conductive material, such as a conductive polymer, glass coated by indium-tin-oxide, tin-oxide, a metal (e.g., gold and silver), and the like. Each of the electrically insulating layers is made of a thin, transparent and electrically insulating material, such as a polymer, inorganic silicon dioxide, silicon oxide, silicon nitride, and the like.

One pair of the electrically conducting layers applies an electric field across variable polarizer 4412 and another pair of the electrically conducting layers applies an electric field across variable polarizer 4414. It is noted that each of the pairs of the electrically conducting layers can apply a different electric field to the respective variable polarizer. For example, variable transmitter 4410 can include a sequence of layers as follows: a protective layer, an electrically conducting layer, an electrically insulating layer, a variable polarizer, an electrically insulating layer, an electrically conducting layer, an electrically insulating layer, an electrically conducting layer, an electrically insulating layer, a variable polarizer, an electrically insulating layer, an electrically conducting layer and a protective layer.

Alternatively, one pair of electrically conducting layers simultaneously applies an electric field across variable polarizers 4412 and 4414. For example, variable transmitter 4410 can include a sequence of layers as follows: a protective layer, an electrically conducting layer, an electrically insulating layer, a variable polarizer, an LC separating layer, another variable polarizer, an electrically insulating layer, an electrically conducting layer and a protective layer. The LC separating layer is made of a transparent polymer, such as nylon, and the like, which separates two adjacent variable polarizers and prevents the LC phases of these two variable polarizers to intermix. Additionally, a controller (not shown) can be coupled with the electrically conducting layers and a photocell (not shown) can be coupled with the controller.

It is further noted that variable transmitter 4410 can be employed in various optical devices, such as spectacles, helmet visor, welding visor, periscope, telescope, microscope, binoculars, ground vehicle window, aircraft window, spacecraft window, marine vehicle window, grazing, greenhouse window, and the like. In case each of the variable polarizers is in form of a bi-stable twisted nematic GHLC cell, during power failure an electric field in a predetermined pulse shape can be applied to the variable polarizers, thereby enabling the variable transmitter to transmit light at the maximum intensity. It is noted that the user can set the polarization level of variable polarizers 4412 and 4414, thereby setting the contrast level and the brightness of image 4424.

Reference is now made to FIG. 20, which is a schematic illustration of a variable transmitter, generally referenced 4490, constructed and operative in accordance with another embodiment of the disclosed technique. Variable transmitter 4490 can be a helmet visor, a welding visor, and the like. Variable transmitter 4490 includes a plurality of transmitting regions 4492, 4494 and 4496. Each of regions 4492, 4494 and 4496 is similar to variable transmitter 4410 as described herein above in connection with FIG. 19A. Thus, a controller (not shown) coupled with regions 4492, 4494 and 4496 can control the applied electric voltage and hence, the applied electric field across each of the regions 4492, 4494 and 4496, in order to transmit incoming light at a different luminance in each region. Such a controller can be further coupled with a camera, light sensors, and the like, to be operated by a user. In the example set forth in FIG. 20, region 4492 is set to high transmittance, and hence appears highly transparent and regions 4494 and 4496 are set at low transmittance, and hence regions 4494 and 4496 appear dimmer than region 4492.

It is further noted that each of the front variable polarizer and the rear variable polarizer in divided into a plurality of regions, similar to regions 4492, 4494 and 4496, wherein each region of the front variable polarizer is spatially compatible with another region of the rear variable polarizer. The controller sets one region of the front variable polarizer, to the same polarization level as that of the respective region of the rear variable polarizer. Thus, the controller enables the variable transmitter to transmit light through a selected region, at a selected luminance.

Figure 21:
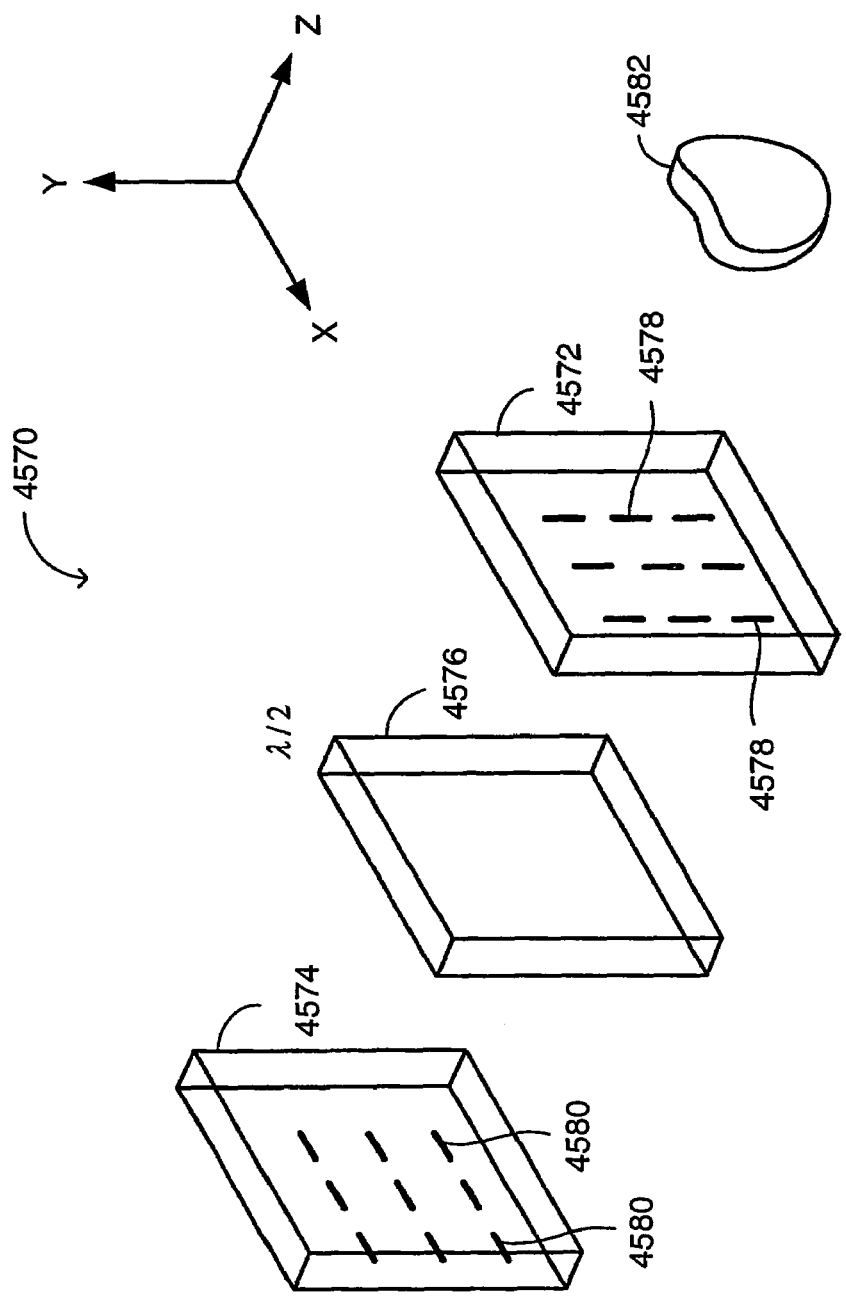
FIG. 21 is a schematic illustration of a variable transmitter, constructed and operative in accordance with a further embodiment of the disclosed technique.

Reference is now made to FIG. 21, which is a schematic illustration of a variable transmitter, generally referenced 4570, constructed and operative in accordance with a further embodiment of the disclosed technique. Variable transmitter 4570 includes variable polarizers 4572 and 4574 and a bi-stable optical phase shifter 4576. Variable polarizers 4572 and 4574 are similar to variable polarizers 4412 and 4414 (FIG. 19A), respectively, as described herein above.

Each of variable polarizers 4572 and 4574 is a normally closed variable polarizer. Thus, when electric fields are applied to variable polarizers 4572 and 4574, rod-shaped molecules 4578 and 4580 of variable polarizers 4572 and 4574, respectively, are aligned along the Z axis. When no electric field is applied to variable polarizers 4572 and 4574, rod-shaped molecules 4578 are aligned along the Y axis and rod-shaped molecules 4580 are aligned along the X axis. Phase shifter 4576 is a bi-stable optical phase shifter, which can operate either as a transparent optical element or a half-wave plate.

Variable polarizers 4572 and 4574 are positioned relative to each other in a cross-polarized manner (i.e., when in a polarizing mode, the polarization of one is perpendicular to the polarization of the other), as described herein above in connection with FIG. 19C. Bi-stable optical phase shifter 4576 is located between variable polarizers 4572 and 4574.

During normal operation of variable transmitter 4570, bi-stable optical phase shifter 4576 operates as a transparent optical element. It is noted that bi-stable optical phase shifter 4576 may be set to the transparent state thereof, by applying a pulse of predetermined shape to bi-stable optical phase shifter 4576 when variable transmitter 4570 is turned on, and further during the operation thereof. At this mode of operation, each of variable polarizers 4572 and 4574 can be set at different polarization levels, by applying electric fields of respective values.

At power failure, when variable polarizers 4572 and 4574 switch to the closed mode, an electric field of a predetermined pulse shape is applied to bi-stable optical phase shifter 4576, so that bi-stable optical phase shifter 4576 operates as a half-wave plate. Bi-stable optical phase shifter 4576 retards the component of light incident there through, having an optical axis direction of 45 degrees relative to rod-shaped molecules 4578 and rod-shaped molecules 4580. Thus, bi-stable optical phase shifter 4576 rotates the polarization angle of the light received from variable polarizer 4572 and transmits this polarized light to variable polarizer 4574. Since the polarization angle of the light that strikes variable polarizer 4574, matches the direction of rod-shaped molecules 4580, this light passes through variable polarizer 4574 without a reduction in intensity. Thus, during power failure, variable transmitter 4570 transmits there through approximately 50% of the (unpolarized) light arriving from an object 4582 located in front of variable polarizer 4572.

Figure 22:
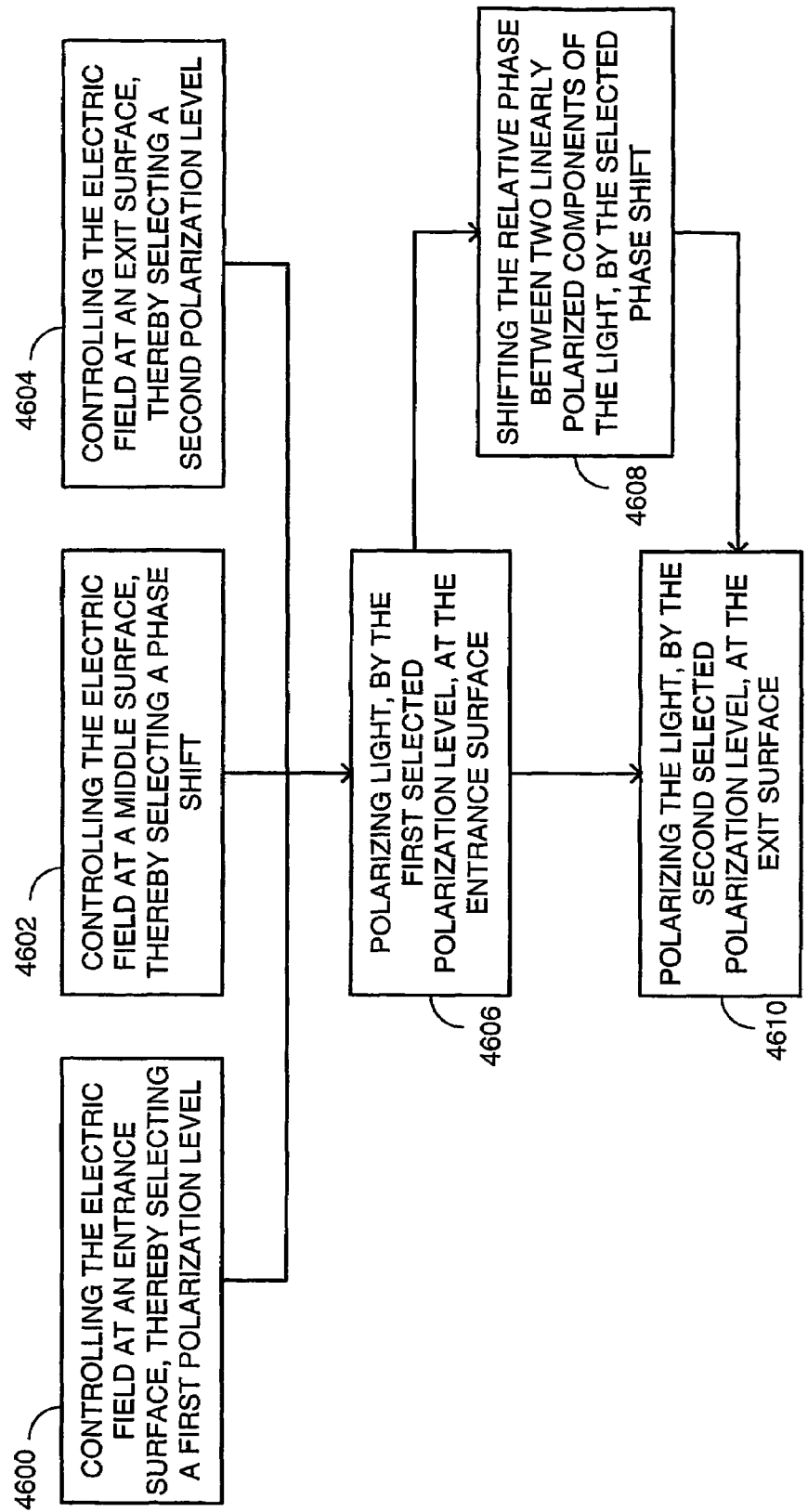
FIG. 22 is a schematic illustration of a method for transmitting light at a variable reflectance, operative in accordance with another embodiment of the disclosed technique.

Reference is now made to FIG. 22, which is a schematic illustration of a method for transmitting light at a variable reflectance, operative in accordance with another embodiment of the disclosed technique. In procedure 4600, the electric field at an entrance surface is controlled, thereby selecting a first polarization level. In the example set forth in FIGS. 19A and 19C, variable polarizer 4416 is set to either a homeotropic state (i.e., a zero polarization level), as shown in FIG. 19A, or a planar state (i.e., a non-zero polarization level), as shown in FIG. 19C.

In procedure 4602, the electric field at a middle surface is controlled, thereby selecting a phase shift. In the example set forth in FIG. 21, bi-stable optical phase shifter 4576 can operate either as a transparent optical element (i.e., applying a zero phase shift) or a half-wave plate (i.e., applying a phase shift of π radians).

In procedure 4604, the electric field at an exit surface is controlled, thereby selecting a second polarization level of the exit surface. In the example set forth in FIGS. 19A and 19C, variable polarizer 4418 is set to either a homeotropic state, as shown in FIG. 19A, or a planar state, as shown in FIG. 19C.

In procedure 4606, light is polarized by the first selected polarization level. In the example set forth in FIG. 19A, variable polarizer 4416 transmits light beam 4420 (i.e., applies a zero level polarization). In the example set forth in FIG. 19C, variable polarizer 4416 polarizes light beam 4420 in the direction of the Y axis (i.e., applies a non-zero level polarization).

In procedure 4608, the relative phase between two linearly polarized components of the light, is shifted by the selected phase shift. In the example set forth in FIG. 21, bi-stable optical phase shifter 4576 either operates as a transparent optical element (i.e., applies a zero phase shift to light) or as a half-wave plate (i.e., shifts the phase of one of the linearly components of light by π radians).

In procedure 4610, the light is polarized by the second selected polarization level. In the example set forth in FIG. 19A, variable polarizer 4418 transmits light beam 4420 (i.e., applies a zero level polarization). In the example set forth in FIG. 19C, variable polarizer 4418 polarizes light beam 4428 in the direction of the X axis (i.e., applies a non-zero level polarization).

It is noted that the method does not necessarily apply procedures 4602 and 4608. For example, variable transmitter 4410 (FIG. 19A) can be operated by applying a sequence of procedures 4600, 4604, 4606 and 4610. It is further noted that procedures 4600, 4602 and 4604 may be performed in any order or concurrently.

According to another aspect of the disclosed technique, the variable polarizer includes two protective layers enclosing a liquid crystal, a homeotropic surface alignment layer and an electrical insulating layer, wherein one of the protective layers is coated with a pair of interdigitating electrodes. When no electric voltage is applied across the pair of electrodes, the homeotropic surface alignment layer causes the rod-shaped molecules of the liquid crystal to be aligned perpendicular to the surface of the protective layers, wherein the variable polarizer applies no polarization to the incident light. When an electric voltage is applied across the pair of electrodes, the electric field generated between the electrodes, causes the rod-shaped molecules to be aligned with respect to the generated electric field (i.e., with components parallel to the surface of the protective layers), wherein the variable polarizer applies polarization to the incident light.

Figure 23G:
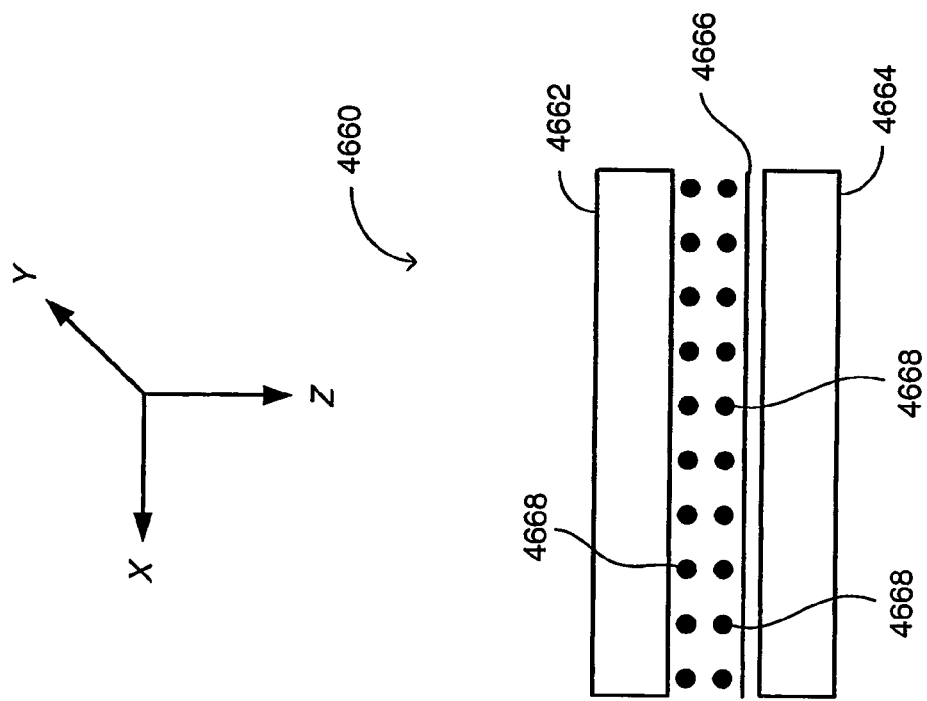
FIG. 23G is a schematic illustration of view II (top view) of a variable polarizer similar to the variable polarizer of FIG. 23A in an assembled form, constructed and operative in accordance with another embodiment of the disclosed technique.

Reference is now made to FIGS. 23A, 23B, 23C, 23D, 23E, 23F and 23G. FIG. 23A is a schematic blown-up illustration in perspective of a variable polarizer, generally referenced 4630, constructed and operative in accordance with a further embodiment of the disclosed technique. FIG. 23B is a schematic illustration of view I (front view) of one of the protective layers of the variable polarizer of FIG. 23A, when no electric voltage is applied across the pair of electrodes of the protective layer. FIG. 23C is a schematic illustration of view II (top view) of the variable polarizer of FIG. 23A in an assembled form and when no electric field is applied across the pair of electrodes of the protective layer of the variable polarizer of FIG. 23A. FIG. 23D is a schematic illustration of view I (front view) of one of the protective layers of the variable polarizer of FIG. 23A, when an electric voltage is applied across the pair of electrodes of the protective layer. FIG. 23E is a schematic illustration of cross section III of the pair of electrodes of FIG. 23D. FIG. 23F is a schematic illustration of view II (top view) of the variable polarizer of FIG. 23A in an assembled form, having an LC material of positive dielectric anisotropy and a guest material of positive optical anisotropy, and when an electric field is applied across the pair of electrodes of the protective layer of the variable polarizer of FIG. 23A. FIG. 23G is a schematic illustration of view II (top view) of a variable polarizer similar to the variable polarizer of FIG. 23A in an assembled form, generally referenced 4660, constructed and operative in accordance with another embodiment of the disclosed technique.

With reference to FIG. 23A, variable polarizer 4630 includes protective layers 4632 and 4634, an alignment layer 4636 and a light affecting substance (e.g., GHLC). Each of protective layers 4632 and 4634 is similar to protective layer 302 (FIG. 5), as described herein above. Alignment layer 4636 is made of an inorganic dielectric material, such as silicon dioxide or an organic dielectric material, such as polyvinyl alcohol, polyimide, photopolymerized substance, and the like. The molecules (not shown) of these types of alignment layers have side-branches (as in grafted polymers), which as a result of congestion (steric hindrance) move out of the plane of the molecular layer, thereby protruding from this plane and giving a homeotropic effect to alignment layer 4636. A photopolymerized self alignment layer can be constructed by polymerizing the molecules of an alignment layer, thereby forming either a homeotropic or a planar alignment layer. In the example set forth in FIGS. 23A, 23B, 23C, 23D, 23E, 23F and 23G, alignment layer 4636 is a homeotropic alignment layer.

The liquid crystal can be either of class 1 (dispersed) or class 2 (homogenous) and each class can be either in form of a mixture or a chemical compound, as described herein above.

A surface 4640 of protective layer 4632 facing alignment layer 4636 is coated with an electrically conductive and transparent material, similar to the electrically conductive layer as described herein above in connection with FIG. 19C. Surface 4640 is then etched by photolithography, into the shape of a pair of electrodes 4642 and 4644. Electrodes 4642 and 4644 possess a plurality of prongs 4646 and 4648, respectively, wherein prongs 4646 and 4648 intermingle. Electrodes 4642 and 4644 are coupled with a power source (not shown) and the output of the power source is controlled by a controller (not shown). Electrode 4642 is coupled with one pole of the power source and electrode 4644 is coupled with the other pole of the power source. The arrangement of electrodes 4642 and 4644 in this manner, is referred to herein below, as "in-plane configuration".

Alignment layer 4636 is located between protective layers 4632 and 4634. Electrodes 4642 and 4644 are located on surface 4640 of protective layer 4632 and electrodes 4642 and 4644 are located between protective layer 4632 and alignment layer 4636. After assembly of protective layers 4632 and 4634, and alignment layer 4636, the edges (not shown) of variable polarizer 4630 are sealed with an adhesive and the gaps between protective layers 4632 and 4634, and alignment layer 4636 are filled with the liquid crystal, or preferably with a suitable spacer material.

With reference to FIGS. 23B and 23C, no electric voltage is applied across electrodes 4642 and 4644 (i.e., an un-powered condition). Due to the presence of alignment layer 4636, rod-shaped molecules 4650 of the liquid crystal are aligned along the Z axis (i.e., perpendicular to surface 4640 and the surfaces—not shown—of variable polarizer 4630). Thus, when no electric voltage is applied across electrodes 4642 and 4644, variable polarizer 4630 transmits the incident light without affecting the incident light (i.e., variable polarizer 4630 is of the normally open type). In this case, the anisotropic light absorbing particles (i.e., the dye molecules) align along the direction of the molecules of the optically active substance (e.g., the liquid crystal molecules), and the anisotropic light absorbing particles do not affect the incident in any way.

Thus, when alignment layer 4636 is a homeotropic alignment layer, the dielectric anisotropy of the host molecules is positive and the optical anisotropy of the guest molecules is positive, variable polarizer 4630 is normally open (N.O.) (i.e., variable polarizer 4630 transmits the incoming light, when no electric field is applied across electrodes 4642 and 4644). Accordingly, using the in-plane electrode configuration in conjunction with homeotropic alignment and a positive-positive GH material combination, provides a new cell driving variant of the N.O. (clear) type.

With reference to FIG. 23D, the controller controls the operation of the power source to apply a voltage $V_1$ across electrodes 4642 and 4644 (i.e., a powered condition). With reference to FIG. 23E, an electric field is generated by every pair of contiguous prongs 4646 and 4648, in direction of −X. With reference to FIG. 23F, rod-shaped molecules 4650 having positive dielectric anisotropy, are aligned along the generated electric fields (i.e., along the X axis and parallel with surface 4640 and the surfaces of protective layers 4632 and 4634). Thus, when an electric voltage is applied across electrodes 4642 and 4644, variable polarizer 4630 applies a polarization to the incident light, at a level which corresponds to the value of the applied electric voltage.

Variable polarizer 4630 can have either a positive radius of curvature (i.e., being convex), a negative radius of curvature (i.e., being concave), or a combination of positive and negative radii of curvature (i.e., an arbitrary curved plane), as well as being substantially flat. Variable polarizer 4630 can be used in a liquid environment as well as in a gaseous one. Variable polarizer 4630 can be flexible as well as being rigid.

It is noted that the liquid crystal of variable polarizer 4630 can be a multi-stable GHLC. For example, the liquid crystal can be in the form of a bi-stable (i.e., having two stable states) twisted nematic liquid crystal, a bi-stable polymer stabilized liquid crystal, a bi-stable surface stabilized liquid crystal, and the like. In this case, the application of a predetermined electric pulse across electrodes 4642 and 4644, causes rod-shaped molecules 4650 to be aligned either along the Z axis or the X axis.

A pair of variable polarizers 4630 can be employed as a variable transmitter, similar to variable transmitter 4410 (FIG. 19A). In this case, different voltages can be applied across the electrodes of the two variable polarizers, thereby allowing control of the intensity of the incident light passing through the variable transmitter. It is further noted that since each of these variable polarizers is of the normally open type, the variable transmitter which employs these variable polarizers is a fail-safe type variable reflector or variable transmitter, respectively, (i.e., the variable transmitter transmits the incident light, without affecting the intensity of the incident light, in case of power failure).

It is further noted that the dielectric anisotropy of the host molecules (i.e., rod-shaped molecules) of the variable polarizer, wherein the electrodes are arranged in an in-plane configuration, can be either positive or negative. Likewise, the optical anisotropy of the guest molecules (e.g., dichroic or pleochroic dye molecules), can be either positive or negative. By constructing the variable polarizer from different combinations of host molecules and guest molecules, the variable polarizer can operate in the following manners, as summarized in Table I. The parallel-plane mode of operation as summarized in Table I, is described herein below in connection with FIG. 24A.

TABLE I

GH-LC cell parameters for homeotropic aligned cells for two electrode structures and four GH anistropy combinations.

| | Cell parameters and operation | | | | | |
|---|---|---|---|---|---|---|
| GH-Material + | | | Power on | | | |
| Electrode | Power off | | | Di- | | |
| Structure | Phase | Director | T-state | Phase | rector | T-state |
| 1. In-plane | | | | | | |
| LC-p + G-p | Homeo-tr. | Z | open | Q-planar | X | Closed |
| LC-p + G-n | | | closed | Q-planar | X | Semi |
| LC-n + G-p | | | open | Q-planar* | Y | Closed |
| LC-n + G-n | | | closed | Q-planar* | Y | Semi |
| 2. Parallel plane | | | | | | |
| LC-p + G-p | Homeo-tr. | Z | open | Homeo-tr. | Z | Open |
| LC-p + G-n | | | closed | Homeo-tr. | Z | Closed |
| LC-n + G-p | | | open | Planar | Y (or X) | Closed |
| LC-n + G-n | | | closed | Planar | Y (or X) | Semi |

Figure 24A:
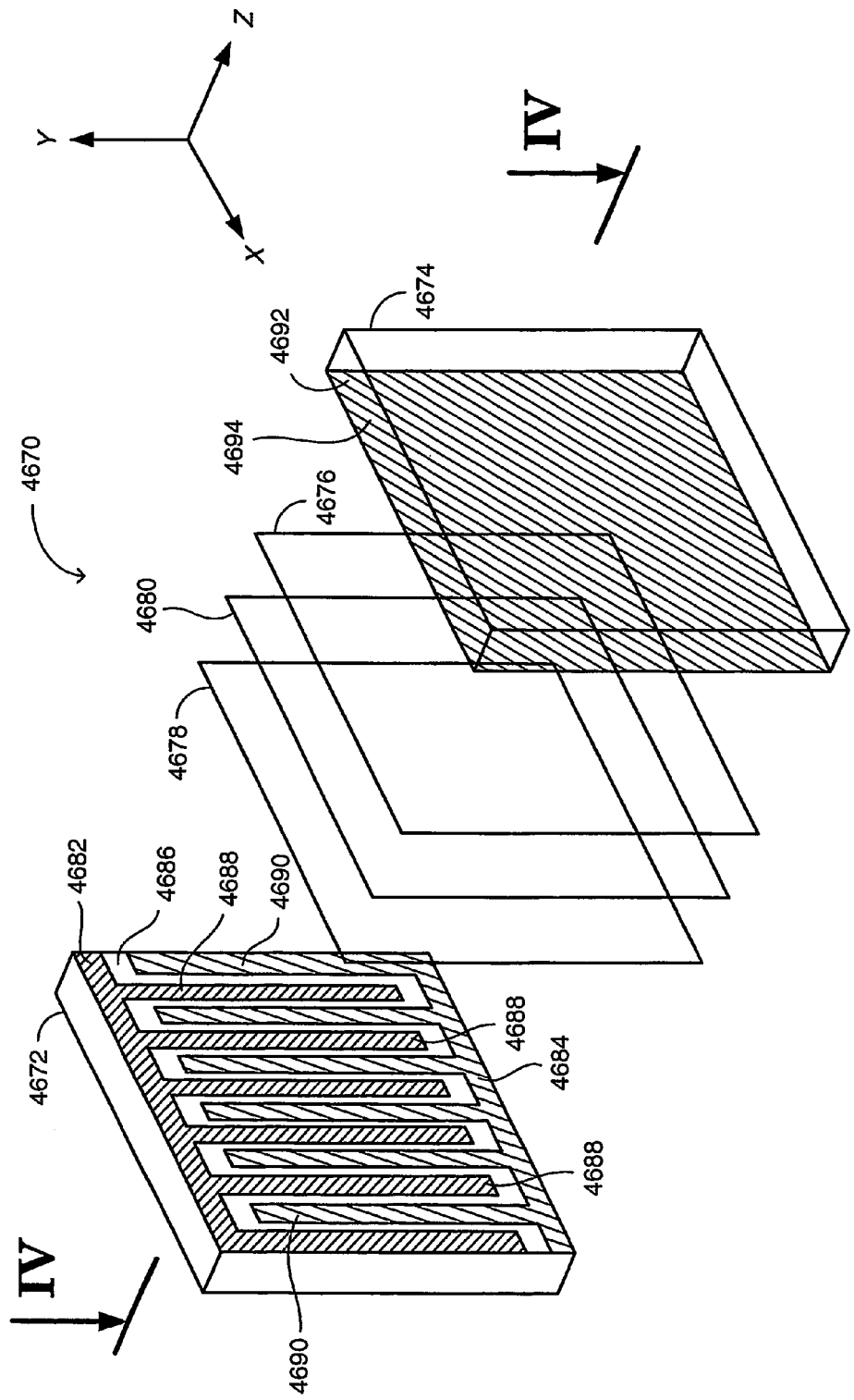
FIG. 24A is a schematic blown-up illustration in perspective of a variable polarizer, constructed and operative in accordance with a further embodiment of the disclosed technique.

Wherein: -p—positive
-n—negative
G—guest dye molecule
T-state—transmittance state
Homeo-tr.—homeotropic phase which has vertical (Z) alignment
Q-planar—quasi planar phase which has some out-of-plane components
*most probable alignment; less energetically favored would be a quasi homeotropic phase
Semi—means semitransparent due to out-of-plane components The combinations of LC-p and LC-n refer to positive or negative dielectric anisotropy of liquid crystal, respectively, whereas the combinations of G-p and G-n refer to positive or negative optical anisotropy of the guest dye molecule, respectively The directors correspond to the axes of the coordinate system illustrated in FIG. 23A, and FIG. 24A as described herein below.

With reference to FIG. 23G, variable polarizer 4660 includes protective layers 4662 and 4664 and an alignment layer 4666. Alignment layer 4666 is a homeotropic alignment layer and is located between protective layers 4662 and 4664. The host molecules of variable polarizer 4660 have negative dielectric anisotropy, the guest molecules thereof have positive optical anisotropy. When an electric field is applied across a pair of electrodes similar to electrodes 4642 (FIG. 23D) and 4644, rod-shaped molecules 4668 of variable polarizer 4660 are aligned along the Y direction (see Table I herein above for in-plane electrode structure and LC-n+G-p GH material).

It is noted that since rod-shaped molecules 4668 align along the pair of electrodes similar to electrodes 4642 and 4644, the contrast of a polarized image (not shown) which variable polarizer 4660 polarizes, is greater than that of variable polarizer 4630. Both configurations illustrated in FIGS. 23F and 23G, as described herein above, exhibit simple homogenous homeotropic alignment, electrical uniformity, and are highly reproducible in manufacturing. It is noted that variable polarizer 4630 can be incorporated with variable transmitter 4410 (FIG. 19A), replacing variable polarizers 4412 and 4414.

Figure 24D:
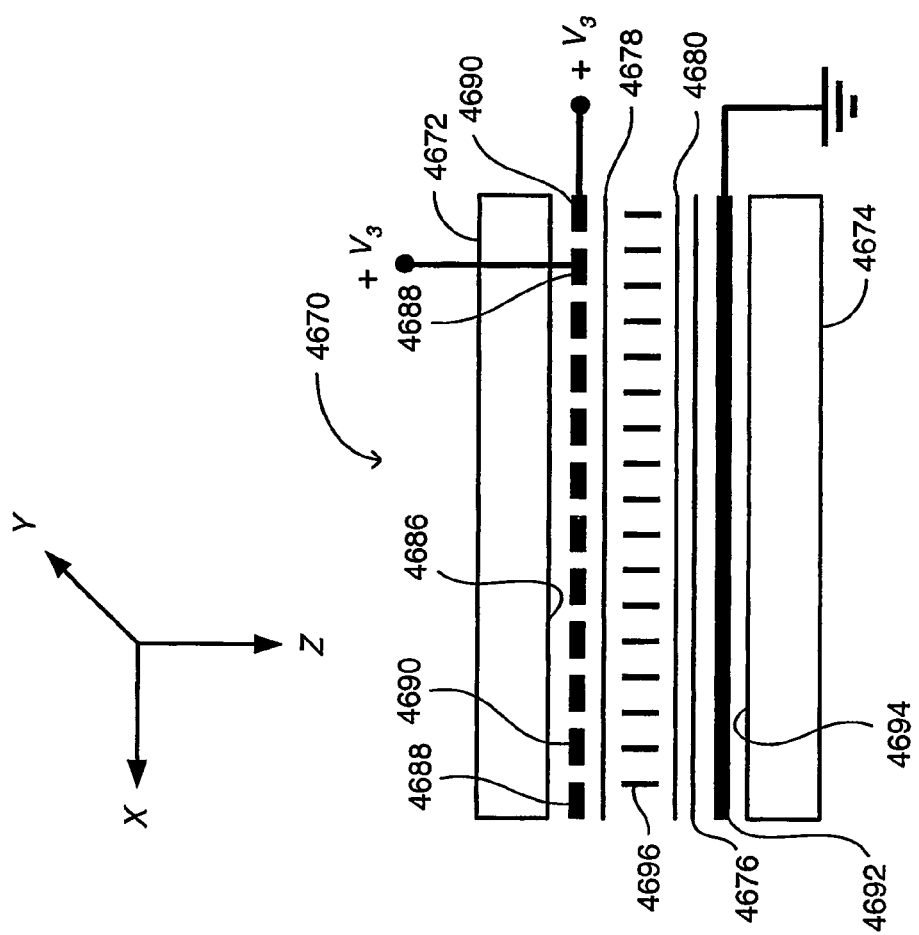
FIG. 24D is a schematic illustration of cross section IV of the variable polarizer of FIG. 24A, operating in a parallel-plane mode.

Reference is now made to FIGS. 24A, 24B, 24C and 24D. FIG. 24A is a schematic blown-up illustration in perspective of a variable polarizer, generally referenced 4670, constructed and operative in accordance with a further embodiment of the disclosed technique. FIG. 24B is a schematic illustration of cross section IV of the variable polarizer of FIG. 24A, when no electric voltage is applied across the interdigitating electrodes and the planar electrode of the protective layers of the variable polarizer of FIG. 24A. FIG. 24C is a schematic illustration of cross section IV of the variable polarizer of FIG. 24A, operating in an in-plane mode. FIG. 24D is a schematic illustration of cross section IV of the variable polarizer of FIG. 24A, operating in a parallel-plane mode.

With reference to FIG. 24A, variable polarizer 4670 includes protective layers 4672 and 4674, electrically insulating layers 4676 and 4678, an alignment layer 4680 and a light affecting substance (not shown). Each of protective layers 4672 and 4674 is made of a transparent material which transmits a large portion of light without distorting the image, such as glass, crystal, polymer, plastic, and the like. Each of electrically insulating layers 4676 and 4678, is similar to the electrically insulating layers as described herein above in connection with FIG. 19C. Alignment layer 4680 is similar to alignment layer 4636 (FIG. 23A), as described herein above. In the example set forth in FIGS. 24A, 24B, 24C and 24D, alignment layer 4680 is a homeotropic alignment layer. In the example set forth in FIGS. 24A, 24B, 24C and 24D, the LC host molecules have a positive dielectric anisotropy and the guest molecules have a positive optical anisotropy. The light affecting substance can be either of class 1 (dispersed) or class 2 (homogenous) and each class can be either in form of a mixture or a chemical compound, as described herein above.

Protective layer 4672 is coated with a pair of interdigitating electrodes 4682 and 4684 on a surface 4686 of protective layer 4672. Interdigitating electrodes 4682 and 4684 are constructed in a manner similar to the construction of electrodes 4642 (FIG. 23A) and 4644, as described herein above. Interdigitating electrodes 4682 and 4684 include a plurality of prongs 4688 and 4690, respectively. Protective layer 4674 is coated with a planar electrode 4692 on a surface 4694 thereof. Planar electrode 4692 is made of an electrically conductive and transparent material, such as the electrically conducting layers as described herein above in connection with FIG. 19C.

Electrically insulating layer 4676 is located between protective layer 4674 and alignment layer 4680. Alignment layer 4680 is located between electrically insulating layer 4676 and electrically insulating layer 4678. Electrically insulating layer 4678 is located between alignment layer 4680 and protective layer 4672. Interdigitating electrodes 4682 and 4684 are located on surface 4686 of protective layer 4672 and interdigitating electrodes 4682 and 4684 are located between protective layer 4672 and electrically insulating layer 4678. Planar electrode 4692 is located on surface 4694 of protective layer 4674 and planar electrode 4692 is located between protective layer 4674 and electrically insulating layer 4676.

Interdigitating electrodes 4682 and 4684 and planar electrode 4692 are coupled with a power source (not shown) and the output of the power source is controlled by a controller (not shown). The controller controls the coupling between the poles of the power source and interdigitating electrodes 4682 and 4684 and planar electrode 4692, thereby allowing operation of variable polarizer 4670, either in the in-plane mode (as described herein above in connection with FIG. 23A), or the parallel-plane mode (as described herein above in connection with FIG. 19C). The controller controls also the power output of the power source, thereby allowing variable polarizer 4670 to apply various levels of polarization and absorbance to the incoming light.

With reference to FIG. 24B, no electric voltage is applied across interdigitating electrodes 4682 and 4684 and planar electrode 4692. Due to the presence of alignment layer 4680, rod-shaped molecules 4696 of the light affecting substance are aligned along the Z axis (i.e., perpendicular to surface 4686 and 4694). Thus, when no electric voltage is applied across interdigitating electrodes 4682 and 4684 and planar electrode 4692, variable polarizer 4670 transmits the incident light without affecting the incident light (i.e., variable polarizer 4670 is of the normally open type).

With reference to FIG. 24C, the controller couples prongs 4688 of interdigitating electrodes 4682 to one pole of the power source and prongs 4690 of interdigitating electrode 4684 to the other pole of the power source, thereby applying a voltage $V_2$ across prongs 4688 and 4690. In this case, variable polarizer 4670 operates in the in-plane mode as described herein above in connection with FIG. 23A. The electric field generated between prongs 4688 and 4690 causes rod-shaped molecules 4696 to be aligned along the X axis (see Table I herein above, for in-plane electrode structure and LC-p+G-p GH material). Thus, variable polarizer 4670 applies a polarization level to the incoming light, thereby switching to the closed state.

With reference to FIG. 24D, the controller couples interdigitating electrodes 4682 and 4684 with one pole of the power source and planar electrode 4692 with the other pole of the power source. The power source applies a voltage $V_3$ between interdigitating electrodes 4682 and 4684 on one hand and planar electrode 4692 on the other hand. In this case, variable polarizer 4670 operates in the parallel-plane mode, wherein the electric field generated between interdigitating electrodes 4682 and 4684 on one hand and planar electrode 4692 on the other, causes rod-shaped molecules 4696 to be aligned along the Z axis (see Table I for parallel-plane electrode structure and LC-p+G-p GH material). Thus, variable polarizer 4670 reverts back to the open state.

It is noted that the switch from closed state back to the open state, by switching off the electric power in the in-plane mode of operation (i.e., FIG. 24B), takes an order of magnitude longer than switching on the electric power in the parallel-plane mode of operation (i.e., FIG. 24D). This switching time depends on the magnitude of the electric field, the pulse shape, the thermal molecular movements and the materials and parameters of variable polarizer 4670. The conservation in switching time applies to other combinations of dielectric anisotropy and optical anisotropy of the host molecules and the guest molecules, respectively, in a variable polarizer with homeotropic alignment (Table I, herein above), as well as planar alignment (Table II, herein below).

Thus, the combination of in-plane mode and parallel-plane mode of operation in variable polarizer 4670, allows a more flexible operation, and a more rapid switching between different illumination levels. Furthermore, the combination of in-plane mode and parallel-plane mode of operation in variable polarizer 4670, provides an image with improved contrast and allows to control the spatial molecular anisotropy, more efficiently.

Additional multi-drive schemes using the simultaneous in-plane and parallel-plane configuration may be derived from Tables I and II. Table II summarizes the various possible combinations of GH material anisotropy in conjunction with the planar alignment and the two different electrode configurations (i.e., in-plane configuration and parallel-plane configuration).

TABLE II

GH-LC cell parameters for planar aligned cells for two
electrode structures and four GH anistropy combinations.

| GH-Material + Electrode Structure | Cell parameters and operation | | | | | |
|---|---|---|---|---|---|---|
| | Power off | | | Power on | | |
| | Phase | Director | T-state | Phase | Director | T-state |
| 1. In-plane | | | | | | |
| LC-p + G-p | planar | Y* (or X) | Closed | Q-planar | X | Closed* |
| LC-p + G-n | | | Open | Q-planar | X | open* |
| LC-n + G-p | | | Closed | Q-planar* | Y (or X) | Closed* |
| LC-n + G-n | | | Open | Q-planar* | Y (or X) | open* |
| 2. Parallel plane | | | | | | |
| LC-p + G-p | Planar | Y* (or X) | Closed | Homeo-tr. | Z | Open |
| LC-p + G-n | | | Open | Homeo-tr. | Z | Closed |
| LC-n + G-p | | | Closed | Planar | X* (or Y) | Closed |
| LC-n + G-n | | | Open | Planar | X* (or Y) | Open |

Figure 25:
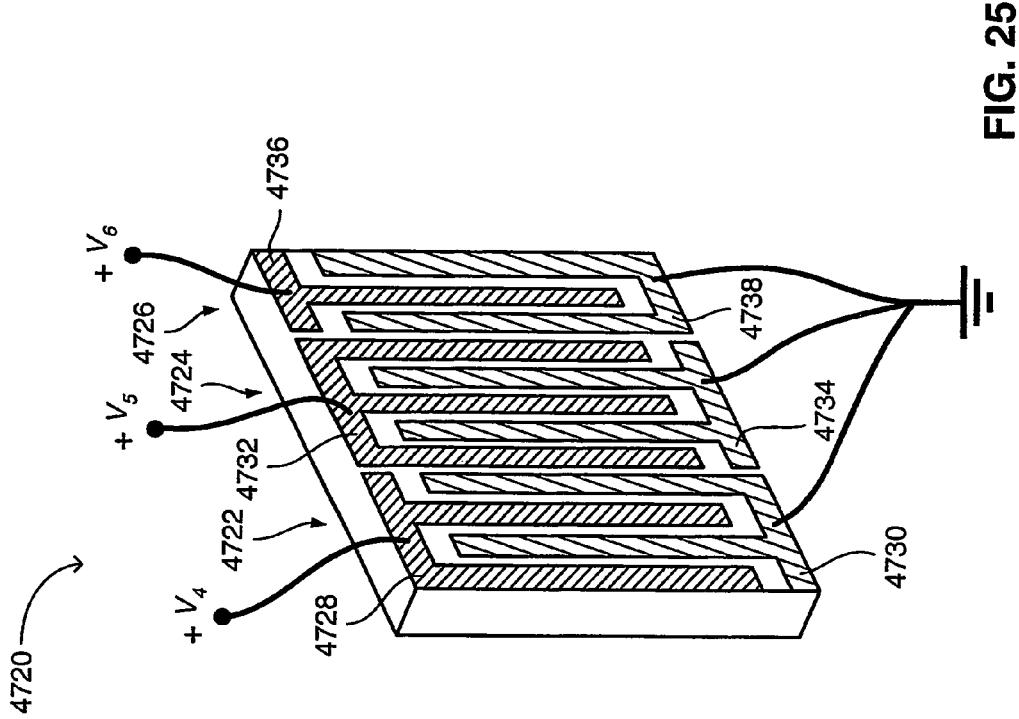
FIG. 25 is a schematic illustration in perspective of a protective layer of a variable polarizer, constructed and operative in accordance with another embodiment of the disclosed technique.

Wherein: -p—positive
-n—negative
G—guest dye molecule
T-state—transmittance state
Homeo-tr.—homeotropic phase which has vertical (Z) alignment
Q-planar—quasi planar phase which has some out-of-plane components
*most probable alignment; less energetically favored would be a quasi homeotropic phase
Semi—means semitransparent due to out-of-plane components The combinations of LC-p and LC-n refer to positive or negative dielectric anisotropy of liquid crystal, respectively, whereas the combinations of G-p and G-n refer to positive or negative optical anisotropy of the guest dye molecule, respectively The directors correspond to the axes of the coordinate system illustrated in FIGS. 23A and 24A Reference is now made to FIG. 25, which is a schematic illustration in perspective of a protective layer, generally referenced 4720, of a variable polarizer, constructed and operative in accordance with another embodiment of the disclosed technique. Protective layer 4720 is divided into a plurality of sections 4722, 4724 and 4726.

A pair of electrodes 4728 and 4730 are etched on section 4722. A pair of electrodes 4732 and 4734 are etched on section 4724. A pair of electrodes 4736 and 4738 are etched on section 4726. A voltage $V_4$ is applied across electrodes 4728 and 4730. A voltage $V_5$ is applied across electrodes 4732 and 4734. A voltage $V_6$ is applied across electrodes 4736 and 4738. When protective layer 4720 is incorporated in a variable polarizer (not shown), similar to variable polarizer 4630 (FIG. 23A), voltages $V_4$, $V_5$ and $V_6$ can be controlled individually, such that each section of the variable polarizer (such as sections 4722, 4724 and 4726), applies a different polarization level to the incident light.

A protective layer similar to protective layer 4720 can be incorporated in a variable polarizer similar to variable polarizer 4670, wherein a protective layer similar to protective layer 4674 includes a plurality of separate planar electrodes similar to planar electrode 4692. The controller switches electric power to one pair of electrodes similar to electrodes 4728 and 4730 on one hand and a respective planar electrode on the other hand, thereby enabling the variable polarizer to apply a polarization level to the incident light at the respective section thereof, similar to section 4722. In this case too, the variable polarizer can be operated either in the in-plane mode or the parallel-plane mode.

Figure 26:
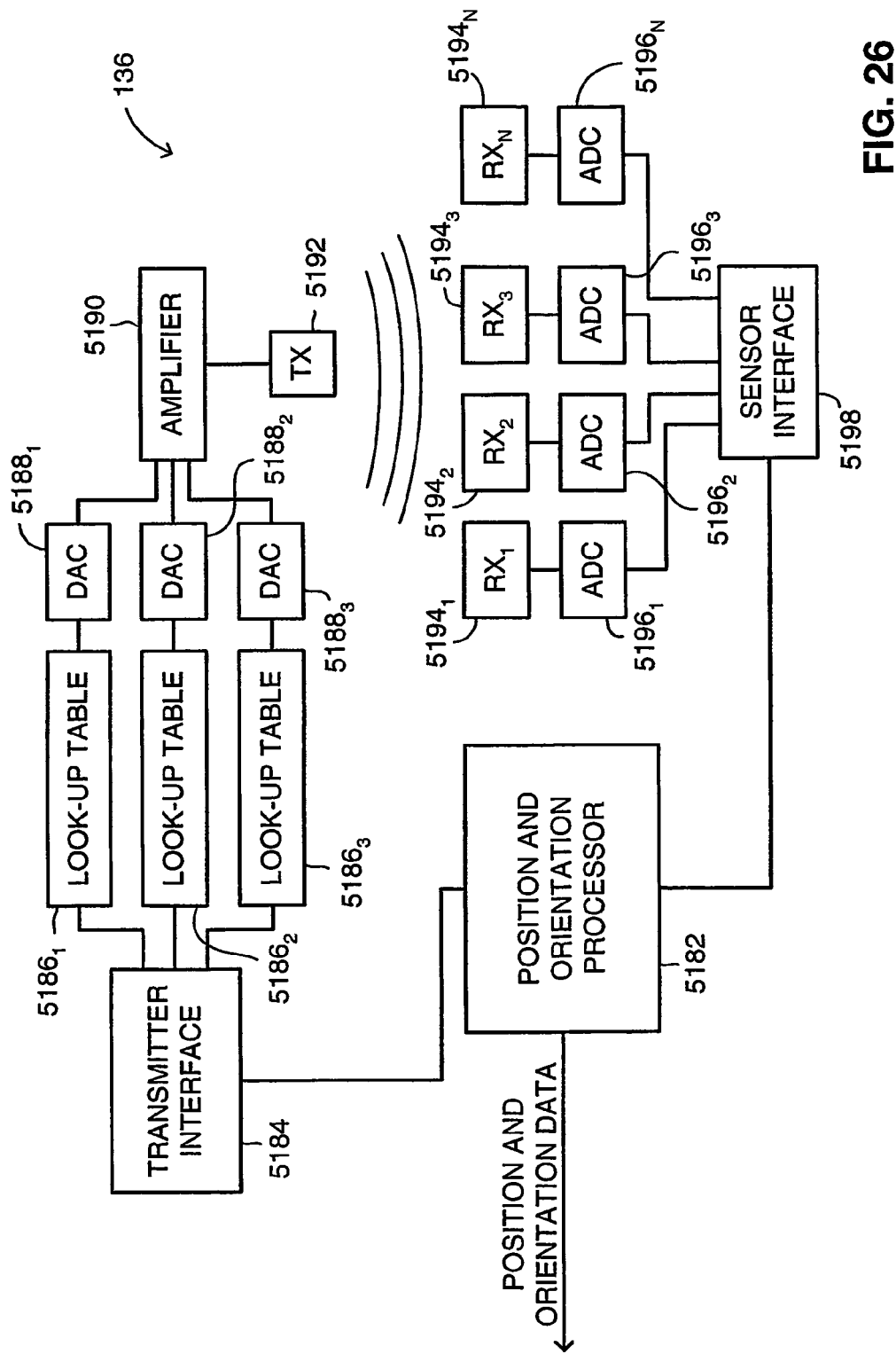
FIG. 26 is a schematic illustration of the head tracking system of FIG. 1A, constructed and operative in accordance with a further embodiment of the disclosed technique.

Reference is now made to FIG. 26, which is a schematic illustration of the head tracking system of FIG. 1A, constructed and operative according to a further embodiment of the disclosed technique. Head tracking system 136 includes a position and orientation processor 5182, a transmitter interface 5184, a plurality of look-up table units $5186_1$, $5186_2$ and $5186_3$, a plurality of digital to analog converters (DAC) $5188_1$, $5188_2$ and $5188_3$, an amplifier 5190, a transmitter 5192, a plurality of sensors $5194_1$, $5194_2$, $5194_3$ and $5194_N$ (i.e., position and orientation detectors), a plurality of analog to digital converters (ADC) $5196_1$, $5196_2$, $5196_3$ and $5196_N$ and a sensor interface 5198.

Transmitter interface 5184 is coupled with position and orientation processor 5182 and with look-up table units $5186_1$, $5186_2$ and $5186_3$. DAC units $5188_1$, $5188_2$ and $5188_3$ are coupled with a respective one of look-up table units $5186_1$, $5186_2$ and $5186_3$ and with amplifier 5190. Amplifier 5190 is further coupled with transmitter 5192. Transmitter 5192 is also marked TX. Sensors $5194_1$, $5194_2$, $5194_3$ and $5194_N$ are further marked $RX_1$, $RX_2$, $RX_3$ and $RX_N$, respectively.

Analog to digital converters (ADC) $5196_1$, $5196_2$, $5196_3$ and $5196_N$ are respectively coupled with sensors $5194_1$, $5194_2$, $5194_3$ and $5194_N$ and with sensor interface 5198. Sensor interface 5198 is further coupled with position and orientation processor 5182.

Each of look-up table units $5186_1$, $5186_2$ and $5186_3$ produces a cyclic sequence of numbers and provides it to the respective DAC unit $5188_1$, $5188_2$ and $5188_3$, which in turn translates it to a respective analog signal. Each of the analog signals is respective of a different spatial axis. In the present example, look-up table $5186_1$ and DAC unit $5188_1$ produce a signal for the X axis, look-up table $5186_2$ and DAC unit $5188_2$ produce a signal for the Y axis and look-up table $5186_3$ and DAC unit $5188_3$ produce a signal for the Z axis.

DAC units $5188_1$, $5188_2$ and $5188_3$ provide their respective analog signals to amplifier 5190, which amplifies and provides the amplified signals to transmitter 5192. Transmitter 5192 provides a multiple axis electromagnetic field, which can be detected by sensors $5194_1$, $5194_2$, $5194_3$ and $5194_N$. Each of sensors $5194_1$, $5194_2$, $5194_3$ and $5194_N$ detects an electromagnetic field, produces a respective electrical analog signal and provides it to the respective ADC unit $5196_1$, $5196_2$, $5196_3$ and $5196_N$ coupled therewith. Each of the ADC units $5196_1$, $5196_2$, $5196_3$ and $5196_N$ digitizes the analog signal fed thereto, converts it to a sequence of numbers and provides it to sensor interface 5198, which in turn provides it to position and orientation processor 5182.

Position and orientation processor 5182 analyzes the received sequences of numbers, thereby determining the position and orientation of each of sensors $5194_1$, $5194_2$, $5194_3$ and $5194_N$. Position and orientation processor 5182 further determines distortion events and updates look-up tables $5186_1$, $5186_2$ and $5186_3$, accordingly.

It will be appreciated by persons skilled in the art that the disclosed technique is not limited to what has been particularly shown and described hereinabove. Rather the scope of the disclosed technique is defined only by the claims, which follow.

The invention claimed is:

1. System for improving audiovisual communication, the system comprising:
   a line-of-sight determining system for determining a user line-of-sight of at least one eye of a user; and
   an image display system coupled with said line-of-sight determining system, said image display system configured to display a first scene image including at least one object within said line of sight of the user, and at least one supplementary image for said at least one eye, according to said user line of sight, said supplementary image including information relating to said at least one object being directly viewed by the user and included in the first scene image, wherein said image display system is further configured to control at least one property of said at least one supplementary image and of said scene image, according to said determined user line-of-sight.

2. The system according to claim 1, further comprising a multi-dimensional audio system coupled with said line-of-sight determining system, said multi-dimensional audio system producing multi-dimensional sound to be heard by said user, according to the location of at least one input signal relative to the position and orientation of the head of said user.

3. The system according to claim 1, further comprising a directional voice system for processing the voice of said user according to said determined user line-of-sight.

4. The system according to claim 1, wherein a microphone receives an interrogation respective of said scene image from said user, respective of said object at which said user is looking directly at.

5. The system according to claim 4, wherein said microphone is directional and is located inside a conical volume which defines a dissipation geometry of sound waves generated by the speech of said user.

6. The system according to claim 4, wherein a loudspeaker produces a verbal sound for said user, according to said interrogation, said verbal sound being respective of said object and associated with said determined user line-of-sight.

7. The system according to claim 4, wherein said image display system displays said at least one supplementary image, according to said interrogation, said at least one supplementary image being respective of said scene image and associated with said determined user line-of-sight, and
   wherein said image display system displays said at least one supplementary image on a location on a visor of a head-mounted device, which is on a current line-of-sight of said user and said scene image.

8. The system according to claim 4, wherein said image display system displays said at least one supplementary image, according to said interrogation, said at least one supplementary image being respective of said scene image and associated with the position and orientation of the head of said user, said position and orientation being determined by a head tracking system, and
   wherein said image display system displays said at least one supplementary image on a location on a visor of a head-mounted device, which is substantially aligned with said position and orientation and said scene image.

9. The system according to claim 4, wherein said image display system displays said at least one supplementary image, according to said interrogation, said at least one supplementary image being respective of said scene image and associated with said determined user line-of-sight, and
   wherein said image display system displays said at least one supplementary image on a location on a windshield of a vehicle, which is on a current line-of-sight of said user and said scene image.

10. The system according to claim 4, wherein said image display system displays said at least one supplementary image, according to said interrogation, said at least one supplementary image being respective of said scene image and associated with the position and orientation of the head of said user, said position and orientation being determined by said line-of-sight determining system, and
    wherein said image display system displays said at least one supplementary image on a location on a windshield of a vehicle, which is substantially aligned with said position and orientation and said scene image.

11. The system according to claim 1, wherein a memory records verbal information provided by said user via a microphone, while said user is gazing at said scene image, said verbal information being respective of said scene image and associated with said determined user line-of-sight.

12. The system according to claim 1, further comprising:
    a directional camera coupled with said line-of-sight determining system; and
    at least one moving mechanism coupled with said directional camera,
    wherein said at least one moving mechanism moves said directional camera according to said determined user line-of-sight.

13. The system according to claim 1, wherein said line-of-sight determining system comprises and eye tracker, said eye tracker is coupled with a head-mounted device of said user, said eye tracker determining said user line-of-sight in a first coordinate system.

14. The system according to claim 13, wherein said line-of-sight determining system further includes a head tracking system, said head tracking system being coupled with said eye tracker and with said head-mounted device,
    wherein said head tracking system determines the position and orientation of said user in a second coordinate system, and
    wherein said eye tracker determines said user line-of-sight in said second coordinate system, according to said position and orientation.

15. The system according to claim 14, further comprising:
    a back-up positioning system; and
    a processor coupled with said back-up positioning system, said line-of-sight determining system and with said image display system,
    wherein said back-up positioning system determines said position and orientation in said second coordinate system, and
    wherein said processor controls the operation of said line-of-sight determining system and of said image display system.

16. The system according to claim 14, further comprising:
    a back-up positioning system; and
    a processor coupled with said back-up positioning system, said line-of-sight determining system and with said image display system.

17. The system according to claim 1, further comprising an audio communication noise reduction system, wherein said audio communication noise reduction system produces a substantially noise-free signal of an acoustic sound, said audio communication noise reduction system produces at least one sound, said at least one sound including a desired sound and an anti-phase noise sound, said anti-phase noise sound being in anti-phase relative to a noise, said audio communication noise reduction system comprising:
    an acoustoelectric transducer for producing a noise bearing sound signal by detecting said acoustic sound and said noise;

a reference-acoustoelectric transducer for producing a reference noise signal by detecting said noise in a noisy environment; and an audio controller coupled with said reference-acoustoelectric transducer and said acoustoelectric transducer, wherein said audio controller produces said substantially noise-free signal, according to said reference noise signal and said noise bearing sound signal.

18. The system according to claim 1, wherein said audio communication noise reduction system, said line-of-sight determining system and said image display system are coupled together via a processor and further coupled with a head-mounted device.

19. The system according to claim 1, further comprising:
a communication interface coupled with said processor;
a network coupled with said communication interface; and
at least one stationary computer coupled with said network, wherein said processor controls the operation of said line-of-sight determining system and of said image display system, according to signals received from said communication interface.

20. The system according to claim 19, wherein said at least one stationary computer is selected from the list consisting of:
local on-board computer;
remote on-board computer;
ground based computer; and
satellite based computer.

21. The system according to claim 1, wherein said at least one property is selected from the list consisting of:
location of said at least one supplementary image relative to said determined user line-of-sight;
light intensity of said at least one supplementary image; and
light intensity of said scene image.

22. The system according to claim 1, wherein said supplementary image is configured to include text relating to said at least one object being directly viewed by the user and included in the first scene image.

23. Method for improving audiovisual communication, the method comprising the procedures of:
determining the user line-of-sight of at least one eye of a user
displaying a first scene image including at least one object within said line of sight of the user, and at least one supplementary image for said at least one eye, according to said user line of sight, said supplementary image including information relating to said at least one object directly viewed by the user and included in the first scene image, and
controlling at least one property of said at least one supplementary image and of said scene image, according to said determined user line-of-sight.

24. The system according to claim 23, wherein said supplementary image is configured to include text relating to said at least one object being directly viewed by the user and included in the first scene image.

* * * * *

UNITED STATES PATENT AND TRADEMARK OFFICE
CERTIFICATE OF CORRECTION

| | |
|---|---|
| PATENT NO. | : 7,710,654 B2 |
| APPLICATION NO. | : 10/556322 |
| DATED | : May 4, 2010 |
| INVENTOR(S) | : Asaf Ashkenazi et al. |

Page 1 of 1

It is certified that error appears in the above-identified patent and that said Letters Patent is hereby corrected as shown below:

Claim 13, column 58, line 26, please remove the "d" from the word "and" in the following sentence:

"...wherein said line-of-sight determining system comprises and eye tracker..."

Signed and Sealed this
Eighteenth Day of October, 2011

David J. Kappos
*Director of the United States Patent and Trademark Office*